United States Patent
Louch et al.

(10) Patent No.: US 7,546,543 B2
(45) Date of Patent: Jun. 9, 2009

(54) WIDGET AUTHORING AND EDITING ENVIRONMENT

(75) Inventors: John O. Louch, San Luis Obispo, CA (US); Andrew M. Grignon, Campbell, CA (US); Timothy Wayne Bumgarner, Sharpsburg, MD (US); Eric Steven Peyton, Lisle, IL (US); Max Drukman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 459 days.

(21) Appl. No.: 11/145,577

(22) Filed: Jun. 3, 2005

(65) Prior Publication Data

US 2006/0005207 A1 Jan. 5, 2006

Related U.S. Application Data

(60) Provisional application No. 60/642,025, filed on Jan. 7, 2005.

(51) Int. Cl.
*G06F 3/00* (2006.01)
*G06F 3/048* (2006.01)

(52) U.S. Cl. .................. 715/762; 715/763; 715/764; 715/767; 715/768; 715/802; 715/808; 715/810; 715/866

(58) Field of Classification Search .............. 715/802, 715/762, 763, 764, 767, 768, 808, 810, 866
See application file for complete search history.

(56) References Cited

U.S. PATENT DOCUMENTS 4,752,893 A 6/1988 Guttag et al.
5,168,441 A 12/1992 Ornaheim et al.
5,289,574 A 2/1994 Sawyer
5,297,250 A 3/1994 Leroy et al.
5,351,995 A 10/1994 Booker
5,357,603 A 10/1994 Parker
5,388,201 A 2/1995 Hourvitz et al.
5,481,665 A 1/1996 Okada et al.
5,490,246 A 2/1996 Brotsky et al.
5,522,022 A 5/1996 Rao et al.
5,537,630 A 7/1996 Berry et al.
5,602,997 A 2/1997 Carpenter et al.
5,638,501 A 6/1997 Gough et al.
5,644,739 A 7/1997 Moursund
5,651,107 A 7/1997 Frank et al.

(Continued)

FOREIGN PATENT DOCUMENTS

EP 548586 A2 6/1993

(Continued)

OTHER PUBLICATIONS

Stardock et al. "DesktopX General Guide" Aug. 2000.*

(Continued)

*Primary Examiner*—Steven B Theriault
(74) *Attorney, Agent, or Firm*—Fenwick & West LLP

(57) ABSTRACT

An authoring environment for creating and/or editing user interface elements such as widgets used in a unified interest layer. The authoring environment facilitates creation of widgets that have a consistent appearance and mechanism, and allows third-party developers to easily create widgets that have a look and feel that is consistent with a predefined set of widgets.

50 Claims, 47 Drawing Sheets

U.S. PATENT DOCUMENTS

| | | | |
|---|---|---|---|
| 5,657,049 A * | 8/1997 | Ludolph et al. | 715/856 |
| 5,671,343 A | 9/1997 | Kondo et al. | |
| 5,708,764 A | 1/1998 | Borrel et al. | |
| 5,721,848 A * | 2/1998 | Joseph | 715/764 |
| 5,742,285 A | 4/1998 | Ueda | |
| 5,754,174 A | 5/1998 | Carpenter et al. | |
| 5,764,229 A | 6/1998 | Bennett | |
| 5,764,238 A | 6/1998 | Lum et al. | |
| 5,790,120 A | 8/1998 | Lozares et al. | |
| 5,793,376 A | 8/1998 | Tanaka et al. | |
| 5,796,402 A | 8/1998 | Ellison-Taylor | |
| 5,801,703 A | 9/1998 | Bowden et al. | |
| 5,838,316 A | 11/1998 | Arruza | |
| 5,877,741 A | 3/1999 | Chee et al. | |
| 5,877,762 A | 3/1999 | Young et al. | |
| 5,878,219 A | 3/1999 | Vance et al. | |
| 5,883,639 A | 3/1999 | Walton et al. | |
| 5,920,659 A | 7/1999 | Iverson et al. | |
| 5,933,148 A | 8/1999 | Oka et al. | |
| 5,949,409 A | 9/1999 | Tanaka et al. | |
| 5,963,191 A | 10/1999 | Jaaskelainen | |
| 5,974,253 A | 10/1999 | Nahaboo et al. | |
| 5,978,579 A | 11/1999 | Buxton et al. | |
| 5,999,948 A * | 12/1999 | Nelson et al. | 715/207 |
| 6,005,568 A | 12/1999 | Simonoff et al. | |
| 6,006,231 A | 12/1999 | Popa | |
| 6,011,562 A | 1/2000 | Gagne et al. | |
| 6,031,937 A | 2/2000 | Graffagnino | |
| 6,075,543 A | 6/2000 | Akeley | |
| 6,128,010 A | 10/2000 | Baxter et al. | |
| 6,166,748 A | 12/2000 | Van Hook et al. | |
| 6,167,533 A * | 12/2000 | Potterveld et al. | 714/25 |
| 6,191,797 B1 | 2/2001 | Politis | |
| 6,195,664 B1 | 2/2001 | Tolfa | |
| 6,211,890 B1 | 4/2001 | Ohba | |
| 6,246,418 B1 | 6/2001 | Oka | |
| 6,266,053 B1 | 7/2001 | French et al. | |
| 6,266,430 B1 | 7/2001 | Rhoads | |
| 6,272,484 B1 | 8/2001 | Martin et al. | |
| 6,272,558 B1 | 8/2001 | Hui et al. | |
| 6,278,448 B1 * | 8/2001 | Brown et al. | 715/866 |
| 6,278,450 B1 | 8/2001 | Arcuri et al. | |
| 6,304,684 B1 | 10/2001 | Niczyporuk et al. | |
| 6,307,574 B1 | 10/2001 | Ashe et al. | |
| 6,321,314 B1 | 11/2001 | Van Dyke | |
| 6,333,753 B1 | 12/2001 | Hinckley | |
| 6,369,823 B2 | 4/2002 | Ohba | |
| 6,369,830 B1 | 4/2002 | Brunner et al. | |
| 6,396,520 B1 * | 5/2002 | Ording | 715/798 |
| 6,411,301 B1 | 6/2002 | Parikh et al. | |
| 6,412,021 B1 | 6/2002 | Nguyen | |
| 6,421,058 B2 | 7/2002 | Parikh et al. | |
| 6,424,348 B2 | 7/2002 | Parikh | |
| 6,452,600 B1 | 9/2002 | Parikh et al. | |
| 6,456,290 B2 | 9/2002 | Parikh et al. | |
| 6,457,034 B1 | 9/2002 | Morein | |
| 6,466,218 B2 | 10/2002 | Parikh et al. | |
| 6,469,714 B2 | 10/2002 | Buxton et al. | |
| 6,483,524 B1 | 11/2002 | Petchenkine et al. | |
| 6,489,963 B2 | 12/2002 | Parikh et al. | |
| 6,512,522 B1 | 1/2003 | Miller et al. | |
| 6,526,174 B1 | 2/2003 | Graffagnino | |
| 6,542,160 B1 | 4/2003 | Abgrall | |
| 6,542,166 B1 | 4/2003 | Washington et al. | |
| 6,544,295 B1 * | 4/2003 | Bodnar | 709/219 |
| 6,571,328 B2 | 5/2003 | Liao et al. | |
| 6,577,317 B1 | 6/2003 | Duluk, Jr. et al. | |
| 6,580,430 B1 | 6/2003 | Hollis | |
| 6,590,592 B1 | 7/2003 | Nason et al. | |
| 6,609,977 B1 | 8/2003 | Shimizu et al. | |
| 6,614,444 B1 | 9/2003 | Duluk, Jr. et al. | |
| 6,618,048 B1 | 9/2003 | Leather | |
| 6,636,214 B1 | 10/2003 | Leather et al. | |
| 6,639,595 B1 | 10/2003 | Drebin et al. | |
| 6,661,426 B1 | 12/2003 | Jetha et al. | |
| 6,664,958 B1 | 12/2003 | Leather et al. | |
| 6,664,962 B1 | 12/2003 | Komsthoeft et al. | |
| 6,674,438 B1 | 1/2004 | Yamamoto et al. | |
| 6,697,074 B2 | 2/2004 | Parikh et al. | |
| 6,707,462 B1 | 3/2004 | Peercy et al. | |
| 6,714,201 B1 | 3/2004 | Grinstein et al. | |
| 6,715,053 B1 | 3/2004 | Grigor | |
| 6,717,599 B1 | 4/2004 | Olano | |
| 6,724,403 B1 | 4/2004 | Santoro et al. | |
| 6,734,864 B2 | 5/2004 | Abgrall | |
| 6,738,804 B1 | 5/2004 | Lo | |
| 6,741,242 B1 | 5/2004 | Itoh et al. | |
| 6,760,046 B2 | 7/2004 | I'Anson et al. | |
| 6,765,592 B1 | 7/2004 | Pletcher et al. | |
| 6,788,318 B2 | 9/2004 | Chen | |
| 6,806,892 B1 | 10/2004 | Plow et al. | |
| 6,906,720 B2 | 6/2005 | Emberling et al. | |
| 6,910,000 B1 | 6/2005 | Yedidia et al. | |
| 6,911,984 B2 | 6/2005 | Sabella et al. | |
| 6,918,091 B2 * | 7/2005 | Leavitt et al. | 715/765 |
| 6,931,633 B1 | 8/2005 | Vazquez et al. | |
| 6,944,829 B2 | 9/2005 | Dando | |
| 6,993,721 B2 | 1/2006 | Rosin et al. | |
| 7,016,011 B2 | 3/2006 | De Haan | |
| 7,024,381 B1 | 4/2006 | Hastings et al. | |
| 7,027,055 B2 | 4/2006 | Anderson et al. | |
| 7,028,264 B2 * | 4/2006 | Santoro et al. | 715/765 |
| 7,050,955 B1 | 5/2006 | Carmel et al. | |
| 7,085,994 B2 * | 8/2006 | Gvily | 715/234 |
| 7,107,546 B2 | 9/2006 | Coulthard | |
| 7,127,713 B2 * | 10/2006 | Davis et al. | 717/177 |
| 7,174,512 B2 * | 2/2007 | Martin et al. | 715/719 |
| 7,194,743 B2 * | 3/2007 | Hayton et al. | 719/315 |
| 7,249,327 B2 * | 7/2007 | Nelson et al. | 715/782 |
| 7,281,202 B2 | 10/2007 | Croney et al. | |
| 7,293,034 B2 | 11/2007 | Paya et al. | |
| 7,315,848 B2 * | 1/2008 | Pearse et al. | 707/1 |
| 7,328,435 B2 | 2/2008 | Trifon | |
| 2001/0030647 A1 | 10/2001 | Sowizral et al. | |
| 2001/0035885 A1 | 11/2001 | Iron et al. | |
| 2002/0065946 A1 | 5/2002 | Narayan et al. | |
| 2002/0067418 A1 | 6/2002 | Hiroaki | |
| 2002/0085037 A1 * | 7/2002 | Leavitt et al. | 345/765 |
| 2002/0089526 A1 | 7/2002 | Buxton et al. | |
| 2002/0093516 A1 | 7/2002 | Brunner et al. | |
| 2002/0099678 A1 * | 7/2002 | Albright et al. | 706/45 |
| 2002/0105548 A1 | 8/2002 | Hayton et al. | 345/764 |
| 2002/0118217 A1 | 8/2002 | Fujiki | |
| 2002/0120673 A1 | 8/2002 | Tolson et al. | |
| 2002/0129092 A1 | 9/2002 | Tolson et al. | |
| 2002/0140740 A1 | 10/2002 | Chen | |
| 2002/0171682 A1 | 11/2002 | Frank et al. | |
| 2002/0174003 A1 * | 11/2002 | Redmann et al. | 705/8 |
| 2002/0174181 A1 | 11/2002 | Wei | |
| 2002/0186257 A1 | 12/2002 | Cadiz et al. | |
| 2003/0009267 A1 * | 1/2003 | Dunsky et al. | 701/4 |
| 2003/0020671 A1 | 1/2003 | Santoro et al. | |
| 2003/0046316 A1 | 3/2003 | Geric et al. | |
| 2003/0076369 A1 | 4/2003 | Resner et al. | |
| 2003/0080995 A1 | 5/2003 | Tenenbaum et al. | |
| 2003/0101046 A1 | 5/2003 | Krasnov | |
| 2003/0123739 A1 | 7/2003 | Graffagnino | |
| 2003/0146934 A1 | 8/2003 | Bailey et al. | |
| 2003/0154239 A1 * | 8/2003 | Davis et al. | 709/201 |
| 2003/0158975 A1 * | 8/2003 | Frank et al. | 709/331 |
| 2003/0164862 A1 | 9/2003 | Cadiz et al. | |
| 2003/0169306 A1 | 9/2003 | Makipaa et al. | |
| 2003/0174136 A1 | 9/2003 | Emberling et al. | |
| 2003/0174154 A1 | 9/2003 | Yukie et al. | |

| | | | |
|---|---|---|---|
| 2003/0184552 A1 | 10/2003 | Chadha | |
| 2003/0184584 A1 | 10/2003 | Vachuska et al. | |
| 2003/0189597 A1 | 10/2003 | Anderson et al. | |
| 2003/0191799 A1* | 10/2003 | Araujo et al. | 709/203 |
| 2004/0012626 A1 | 1/2004 | Brookins | |
| 2004/0032409 A1 | 2/2004 | Girard | |
| 2004/0036711 A1 | 2/2004 | Anderson | |
| 2004/0039934 A1 | 2/2004 | Land et al. | |
| 2004/0179019 A1 | 9/2004 | Sabella et al. | |
| 2004/0194020 A1 | 9/2004 | Beda et al. | |
| 2004/0212640 A1 | 10/2004 | Mann et al. | |
| 2004/0215740 A1* | 10/2004 | Frank et al. | 709/217 |
| 2004/0223003 A1 | 11/2004 | Heirich et al. | |
| 2004/0255253 A1 | 12/2004 | Marcjan | |
| 2004/0261012 A1 | 12/2004 | Balsiger | |
| 2004/0261037 A1 | 12/2004 | Ording et al. | |
| 2004/0261038 A1 | 12/2004 | Ording et al. | |
| 2005/0010419 A1 | 1/2005 | Pourhamid | |
| 2005/0010634 A1 | 1/2005 | Henderson et al. | |
| 2005/0021935 A1 | 1/2005 | Schillings et al. | |
| 2005/0022139 A1 | 1/2005 | Gettman et al. | |
| 2005/0039144 A1 | 2/2005 | Wada et al. | |
| 2005/0057497 A1* | 3/2005 | Kawahara | 345/157 |
| 2005/0060655 A1 | 3/2005 | Gray et al. | |
| 2005/0060661 A1 | 3/2005 | Kawahara et al. | |
| 2005/0088447 A1 | 4/2005 | Hanggie et al. | |
| 2005/0088452 A1 | 4/2005 | Hanggie et al. | |
| 2005/0091571 A1 | 4/2005 | Leichtling | |
| 2005/0144563 A1 | 6/2005 | Hough et al. | |
| 2005/0160368 A1 | 7/2005 | Liu et al. | |
| 2005/0168471 A1 | 8/2005 | Paquette | |
| 2005/0168476 A1 | 8/2005 | Levene et al. | |
| 2005/0172239 A1 | 8/2005 | Liu et al. | |
| 2005/0240857 A1 | 10/2005 | Benedict et al. | |
| 2005/0243373 A1 | 11/2005 | Silverbrook et al. | |
| 2005/0256940 A1 | 11/2005 | Henderson et al. | |
| 2005/0278651 A1 | 12/2005 | Coe et al. | |
| 2005/0283734 A1 | 12/2005 | Santoro et al. | |
| 2006/0015846 A1 | 1/2006 | Fraleigh et al. | |
| 2006/0075141 A1 | 4/2006 | Boxenhorn | |
| 2006/0123356 A1 | 6/2006 | Sobeski et al. | |
| 2006/0136843 A1 | 6/2006 | Shafron | |
| 2006/0206835 A1* | 9/2006 | Chaudhri et al. | 715/781 |
| 2006/0271637 A1 | 11/2006 | McKeon et al. | |
| 2006/0274086 A1* | 12/2006 | Forstall et al. | 345/629 |
| 2006/0277469 A1* | 12/2006 | Chaudhri et al. | 715/709 |
| 2006/0277481 A1* | 12/2006 | Forstall et al. | 715/764 |
| 2007/0038934 A1 | 2/2007 | Fellman | |
| 2007/0044039 A1 | 2/2007 | Amadio et al. | |
| 2007/0061724 A1 | 3/2007 | Slothouber et al. | |
| 2007/0101146 A1* | 5/2007 | Louch et al. | 713/176 |
| 2007/0101279 A1* | 5/2007 | Chaudhri et al. | 715/762 |
| 2007/0101288 A1* | 5/2007 | Forstall et al. | 715/781 |
| 2007/0101291 A1* | 5/2007 | Forstall et al. | 715/805 |
| 2007/0101297 A1* | 5/2007 | Forstall et al. | 715/841 |
| 2007/0101433 A1* | 5/2007 | Louch et al. | 726/25 |
| 2007/0118813 A1* | 5/2007 | Forstall et al. | 715/805 |
| 2007/0130541 A1* | 6/2007 | Louch et al. | 715/804 |
| 2007/0162850 A1* | 7/2007 | Adler et al. | 715/700 |
| 2007/0203984 A2 | 8/2007 | AlHusseini et al. | |
| 2007/0209013 A1 | 9/2007 | Ramsey et al. | |
| 2007/0233736 A1* | 10/2007 | Xiong et al. | 707/104.1 |
| 2007/0266093 A1* | 11/2007 | Forstall et al. | 709/204 |

FOREIGN PATENT DOCUMENTS

| | | |
|---|---|---|
| EP | 0694879 A2 | 1/1996 |
| EP | 1383080 A1 | 1/2004 |
| EP | 0972273 B1 | 3/2004 |
| WO | WO 98/45815 A1 | 10/1998 |
| WO | WO 02/09039 A2 | 1/2002 |
| WO | WO 2004/027707 A2 | 4/2004 |

OTHER PUBLICATIONS

Stardock et al "DesktopX WhitePaper" Aug. 2000.*
Stardock et al. "DesktopX Tutorial" Aug. 2000.*
Stardock et a. "DesktopX user guide version 2" 2000.*
Wikipedia.org et al. "List of Widget Toolkits" Jan. 2009.*
Akeley, Kurt et al., "Real-Time Graphics Architecture," The OpenGL® Graphics System, CS448 Lecture 15 [online] Fall, 2001Retrieved from the Internet: <URL: http://www.graphics.stanford.edu/courses/cs448a-01-fall>, pp. 1-20.
Elliott, Conal, "Programming Graphics Processors Functionally," 11 pages.
Fried, Ina, "Developer Calls Apple's Tiger a Copycat," CNET News.com, Jun. 28, 2004 [online] [Retrieved on Jul. 1, 2004] Retrieved from the Internet<URL:http://zdnet.com.com/2102-1104_2-250692.html?tag=printthis>.
Fried, Ina, "For Apple's Tiger, the Keyword is Search," CNET News.com, Jun. 28, 2004 [online] [Retrieved on Jul. 1, 2004] Retrieved from the Internet<URL:http://zdnet.com.com/2102-1103_2-250346.html?tag=printthis>.
Haeberli, P. et al., "The Accumulation Buffer: Hardware Support for High-Quality Rendering," Computer Graphics, Aug. 1990, pp. 309-318, vol. 24, No. 4.
International Search Report, PCT/US2005/008804, Jul. 27, 2005, 3 pages.
International Search Report, PCT/US2005/008805, Aug. 8, 2005, 3 pages.
Konfabulator, "Cupertino, Start Your Photocopiers!," [online] [Retrieved on Jul. 1, 2004] Retrieved from the Internet<URL: http://www.konfabulator.com>.
Konfabulator, Konfabulator & Widget Basics, [online] [Retrieved on Jul. 1, 2004] Retrieved from the Internet<URL: http://www.konfabulator.com/info/basics.html>.
Konfabulator, "Screenshots," [online] [Retrieved on Jul. 1, 2004] Retrieved from the Internet<URL:http://www.konfabulator.com/info/screenshots.html>.
Konfabulator, "What is Konfabulator?," [online] [Retrieved on Jul. 1, 2004] Retrieved from the Internet<URL:http://www.konfabulator.com/info/>.
Notification of Transmittal of the International Search Report and the Written Opinion of the International Search Authority, PCT/US2005/022579, 14 pages.
Nvidia, "Cg—Teaching Cg," Power Point Presentation, Author and date unknown, pp. 1-16.
Puder, A., "Extending Desktop Applications to the Web," ACM International Conference Proceedings Series, Proceedings of the 2004 International Symposium on Information And Communication Technologies, 2004, vol. 90, 6 pages.
Rochkind, M. et al., "Common Elements in Today's Graphical User Interfaces: The Good, the Bad, and the Ugly," INTERCHI '93, ACM, Apr. 24-29, 1993, pp. 470-473.
Segal, Mark et al., "The OpenGL® Graphics System: A Specification (Version 1.5)," Silicon Graphics, Inc., Oct. 30, 2003, 334 pages.
Shantzis, Michael A., "A Model for Efficient and Flexible Image Computing," Computer Graphics Proceedings, Annual Conference Series, Jul. 24-29, 1994, pp. 147-154, Orlando, FL.
Shiozawa, Hidekazu et al., "Perspective Layered Visualization of Collaborative Workspaces," Proceedings of the International ACM SIGGROUP conference on Supporting Group Work Publisher, Nov. 1999.
Staples, Loretta, "Representation in Virtual Space: Visual Convention in the Graphical User Interface," Proceedings of the SIGCHI Conference on Human Factors in Computing Systems, Apr. 1993.
Tang, J.C. et al., "ConNexus to Awarenex: Extending Awareness to Mobile Users," SIGCHI '01, ACM, Mar. 31-Apr. 4, 2001, 8 pages.
Van Gelder, Allen et al., "Direct Volume Rendering with Shading Via Three-Dimensional Textures," University of California, Santa Cruz, CA, 9 pages.

Wardell, Brad, Konfabulator for Windows, Jan. 10, 2004; [online]Retireved from the Internet Mar. 6, 2006] Retrieved from the Internet:<URL: http://www.xpthemes.com/forums.asp?MID=19&CMID=19&AID=4472>.

"Writing a Desk Accessory," Developer Connection, Apple Computer, Inc. Jul. 3, 1996, [online] [Retrieved on Jan. 3, 2006] Retrieved from the Internet<URL:http://developer.apple.com/documentation/mac/Devices/Devices-16>.

Cadiz, JJ et al., "Sideshow: Providing Peripheral Awareness of Important Information," Technical Report MSR-TR-2001-83, (Sep. 14, 2001), 9 pages. Microsoft Corporation, Redmond, WA.

International Search Report and Written Opinion, PCT/US2005/022152, Jul. 10, 2006, 8 pages.

Archive of "Objects, Images and Applets," W3C Recommendation, Feb. 10, 2003, [online] [Archived by http://archive.org; Retrieved on Apr. 13, 2006] Retrieved from the Internet<URL:http://web.archive.org/web/20030210154019/http://www.w3.org/TR/REC-html140/struct/objects.html>.

Ullenboom, C., "Java is auch eine Insel," 2003, [online] [Retrieved on Apr. 13, 2006] Retrieved from the Internet<URL:http://www.galileocomputing.de/openbook/javainsel2//java_140000.htm#Xxx998138>.

Microsoft Corporation, User's Guide Microsoft® Windows™ and MS-Dos® 6, 1993, Pages Cover-xvi, 11-28, 47-57, 91-101.

Microsoft Corporation, Microsoft® Windows™ User's Guide for the Windows Graphical Environment, Version 3.0 for the MS-DOS® or PC-DOS Operating System, 1990, Document No. SY06851-0290, Pages Cover-vii, 15-76, 355-424.

Altman, R. B., "Visual QuickStart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.

Conner, D., et al. "Three-Dimensional Widgets," ACM, 1992, pp. 183-231.

"Stardock News: DesktopX User Manual On-line," 1999, 2003, [online] [Retrieved on May 11, 2007] Retrieved from the Internet <URL:http://www.stardock.com/newsitem.asp?id=538>.

"Comparison of widget engines" Wikipedia, 2007 [online] [Retrieved on Sep. 28, 2007] Retrieved from the Internet <URL: http://en.wikipedia.org/wiki/Comparison_of_widget_engines>.

"Dashboard Blog," Dec. 2003 [online] [Retrieved on May 11, 2007] Retrieved from the Internet <URL:http://www.nat.org/dashboard/blog.php3>.

Stardock.com, et al., "DesktopX Whitepaper and Users Guide," Stardock.com, et al., 1999 [online] [Retrieved on May 14, 2007] Retrieved from the Internet <URL:http://www.stardock.net/media/whitepaper_desktopx.html>.

"Windows Sidebar" Wikipedia, 2007 [online] [Retrieved on May 29, 2007] Retrieved from the Internet <URL:http://en.wikipedia.org/wiki/Windows-Sidebar>.

Gruber, J., et al., "Dashboard vs. Konfabulator," Daring Fireball, Jun. 2004, [online] [Retrieved on May 11, 2007] Retrieved from the Internet <URL:http://daringfireball.net/2004/06/dashboard_vs._konfabulator>.

"Snippets Software Platform," Snippet Software Inc., Jun. 2001, [online] [Retrieved on Jun. 11, 2001] Retrieved from the Internet <URL:http://www.snippets.com/products/>.

Snippet Software Inc. et al., "Product Spotlight Non-browser based portal solution from Snippets Software, Inc.," Corporate Portal Letter, Oct. 2000, 3 Pages, vol. 1, No. 10.

Snippets Software et al., "Products: Overview," Feb. 2002, [online] [Retrieved on Feb. 5, 2008] Retrieved from the Internet URL:http://web.archive.org/web/20020206061508/http://www.snippets.com/products/>.

Stardock et al., "What Can It Do? Making Objects," DesktopX Tutorial, 2001, [online] [Retrieved on Apr. 11, 2008] Retrieved from the Internet <URL:http://web.archive.org/web/20011019222825/http://www.stardock.com/products/desktopx/...>.

Rist, T., et al., "Customizing Graphics for tiny Displays of Mobile Devices," Personal and Ubiquitous Computing, 2002, pp. 260-268, vol. 6.

Archive of "BabelFish.com®," 1995-2003, The Babel Fish Corporation, [Online] [Archived by http://archive.org on Oct. 2, 2003; Retrieved on Dec. 8, 2008] Retrieved from the Internet<URL:http://web.archive.org/web/20031002115902/www.babelfish.com/en/index.html>.

Archive of Movies.com, 2001, Disney Enterprises, Inc., [Online] [Archived by http://archive.org on Jan. 18, 2002; Retrieved on Dec. 8, 2008] Retrieved from the Internet<URL:http://web.archive.org/web/20020118102516/movies.go.com/>.

Archive of "Welcome to the Gigaplex!(tm)," Lazar Productions, [Online] [Archived by http://archive.org on Nov. 5, 1996; Retrieved on Dec. 8, 2008] Retrieved from the Internet<URL:http://web.archive.org/web/19961105081827/http://www.gigaplex.com/>.

"Software Widget—Wikipedia, the free encyclopedia," last modified Dec. 4, 2008, Wikipedia®, [Online] [Retrieved on Dec. 8, 2008] Retrieved from the Internet<URL:http://en.wikipedia.org/wiki/Software_widget>.

"Starfish Software Introduces Starfish Internet Sidekick; Starfish Internet Sidekick is the best way for Internet users to manage their calendar, contacts and communications," Business Wire, Sep. 23, 1996, [Online] [Retrieved on Dec. 8, 2008], Retrieved from the Internet<URL:http://findarticles.com/p/articles/mi_m0EIN/is_1996_Sept_23/ai_18704672?tag=rel.res.l>.

Baratz, A., et al., "DesktopX 3.1," Ars Technica, Nov. 17, 2005, [online] [Retrieved on Aug. 1, 2008] Retrieved from the internet <URL:http://arstechnica.com/reviews/apps/desktopx.ars>.

"Convert just about Anything to Anything else," Online Conversion.com, 2000, [online] [Archived by http://webarchive.org on Aug. 15, 2000; Retrieved on Jun. 22, 2008] Retrieved from the Internet <URL:http://webarchive.org/web/20000815055422/http:www.onlineconversion.com/>.

Siracusa, J., et al., "Mac OA 10.4 Tiger: Dashboard," Apr. 28, 2005, [online] [Retrieved on Aug. 1, 2008] Retrieved from the internet <URL:http://arstechnica.com/reviews/os/macosx-10-4.ars/17>.

Wardell, B., et al., "Apple's Dashboard vs. Konfabulator vs. DesktopX," Skinning the frog, Jul. 1, 2004, [online] [Retrieved on Aug. 1, 2008] Retrieved from the internet <URL:http://frogboy.joeuser.com/article/19800>.

First Office Action Of The Patent Office Of The People's Republic Of China, Chinese Patent Application No. 200580016349.3, Jul. 25, 2008.

* cited by examiner

WIDGET AUTHORING AND EDITING ENVIRONMENT

CROSS-REFERENCE TO RELATED APPLICATIONS

This patent application claims priority under 35 U.S.C. § 120 as a continuation-in-part of co-pending U.S. patent application Ser. No. 10/877,968, filed on Jun. 25, 2004, entitled "Unified Interest Layer for a User interface," by Chaudhri et al., the disclosure of which is incorporated herein by reference.

This patent application further claims priority from U.S. Provisional Patent Application No. 60/642,025, filed on Jan. 7, 2005, for "Unified Interest Layer Widgets", by Chaudhri et al., the disclosure of which is incorporated herein by reference.

This patent application is related to U.S. Provisional Patent Application 60/583,125, filed on Jun. 25, 2004, for "Procedurally Expressing Graphic Objects for Web Pages," filed on Jun. 25, 2004, and U.S. patent application Ser. No. 11/144,384, entitled "Procedurally Expressing Graphic Objects for Web Pages" to Williamson, et al., filed on Jun. 2, 2005, the disclosures of which are incorporated herein by reference.

FIELD OF THE INVENTION

The present invention relates generally to graphical user interface elements, and more particularly to authoring and editing graphical user interface elements.

BACKGROUND OF THE INVENTION

A hallmark of modern graphical user interfaces is that they allow a large number of items to be displayed on a screen at the same time. The leading personal computer operating systems, such as Apple MacOS X and Microsoft Windows XP, provide user interfaces in which a number of windows can be displayed, overlapped, resized, moved, configured, and reformatted according to the needs of the user. Taskbars, menus, and other UI elements provide mechanisms for accessing and activating windows even when they are hidden behind other windows.

Although many users appreciate the ability of such user interfaces to present such a wealth of information on the screen simultaneously, the resulting "information overload" can be somewhat overwhelming. Users often find that it is difficult to navigate to a particular UI element or window, or to even locate a desired element, among a large number of onscreen elements. The problem is further compounded when user interfaces allow users to position the on-screen elements in any desired arrangement, including overlapping, minimizing, maximizing, and the like. Such flexibility may be useful to some users but may result in chaos for other users. Having too many items on the screen simultaneously leads to information overload, and can act as an inhibiting factor in the effective use of the computer equipment.

Some user interfaces dedicate certain areas of the screen for holding certain user interface elements that are commonly used (such as a menu bar, or icons that activate commonly-used programs or files). However, such areas are generally limited in size, so as not to occupy too much valuable screen real estate that could otherwise be devoted to the main workspace area of the display screen. Although small elements, such as a digital clock element or taskbar, may be well suited for display in such dedicated screen areas, other types of elements cannot be usably presented in such a small screen area; thus they must be activated, or enlarged, before they can be used or viewed. This causes yet another level of confusion, since the items need to be activated and dismissed. Furthermore, the items may overlap or otherwise add to the number of onscreen elements that must be dealt with and organized by the user.

These problems cause many users to fail to use their computers to their full potential, and can further result in frustration or confusion, particularly in novice users.

What is needed is an authoring environment for creating light-weight, focused easy-to-use user interface elements (widgets) that can be activated or deactivated as part of a unified layer overlaying or replacing the standard desktop user interface. What is further needed is an authoring environment that facilitates creation of widgets that have a consistent appearance and mechanism. What is further needed is an authoring environment that allows third-party developers to easily create widgets that have a look and feel that is consistent with a predefined set of widgets.

SUMMARY OF THE INVENTION

According to the techniques of the present invention, an authoring environment is provided for creating and/or editing widgets for use in a user-activatable dashboard (also referred to as a unified interest layer). Widgets created using the techniques of the invention can have any or all of various characteristics selectable by the widget author, including for example: the ability to expand and/or collapse; two-sided appearance, allowing a user to flip the widget over to see additional user interface elements; scrolling regions; and the like.

In one aspect, the present invention allows a widget author to select a theme; the invention then provides functionality for consistently applying the themes to elements of the widget being created.

The dashboard can contain any number of widgets for quick access by a user, including widgets created using the authoring environment of the present invention. In response to a command from a user, the dashboard is invoked and the widgets are shown on the screen.

Once the dashboard has been activated, the user can interact with any or all of the widgets, and can configure the dashboard by adding, deleting, moving, or configuring individual widgets as desired. When the user wishes to return to the normal user interface, the user issues a command causing the dashboard to be dismissed. Once the dashboard has been dismissed, the previous user interface state is restored, allowing the user to resume normal interactions with the operating system.

In one aspect, the dashboard, when activated, temporarily replaces the existing user interface display. In another aspect, the dashboard partially obscures the existing user interface display, but allows some part of the existing display to be visible so as to remind the user of its presence. In another aspect, the existing user interface display is faded, blurred, and/or darkened while the dashboard is active.

Widgets can be of any type. They can communicate with a remote server to provide information to the user (for example, a weather report), or they can provide commonly needed functionality (for example, a calculator), or they can act as an information repository (for example, a notepad or calendar). Some widgets can provide a combination of these types of functions.

In one aspect, the present invention is implemented as an application programming interface (API) to allow third-party developers to create and distribute additional widgets that provide different types of functionality.

In one aspect, the present invention includes functionality for selecting and applying a template for a widget, and for configuring and testing operation of a widget as it is being developed.

BRIEF DESCRIPTION OF THE DRAWINGS

The accompanying drawings illustrate several embodiments of the invention and, together with the description, serve to explain the principles of the invention.

One skilled in the art will recognize that these Figures are merely examples of the operation of the invention according to one embodiment, and that other user interface arrangements and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

Hardware Architecture

Figure 1:
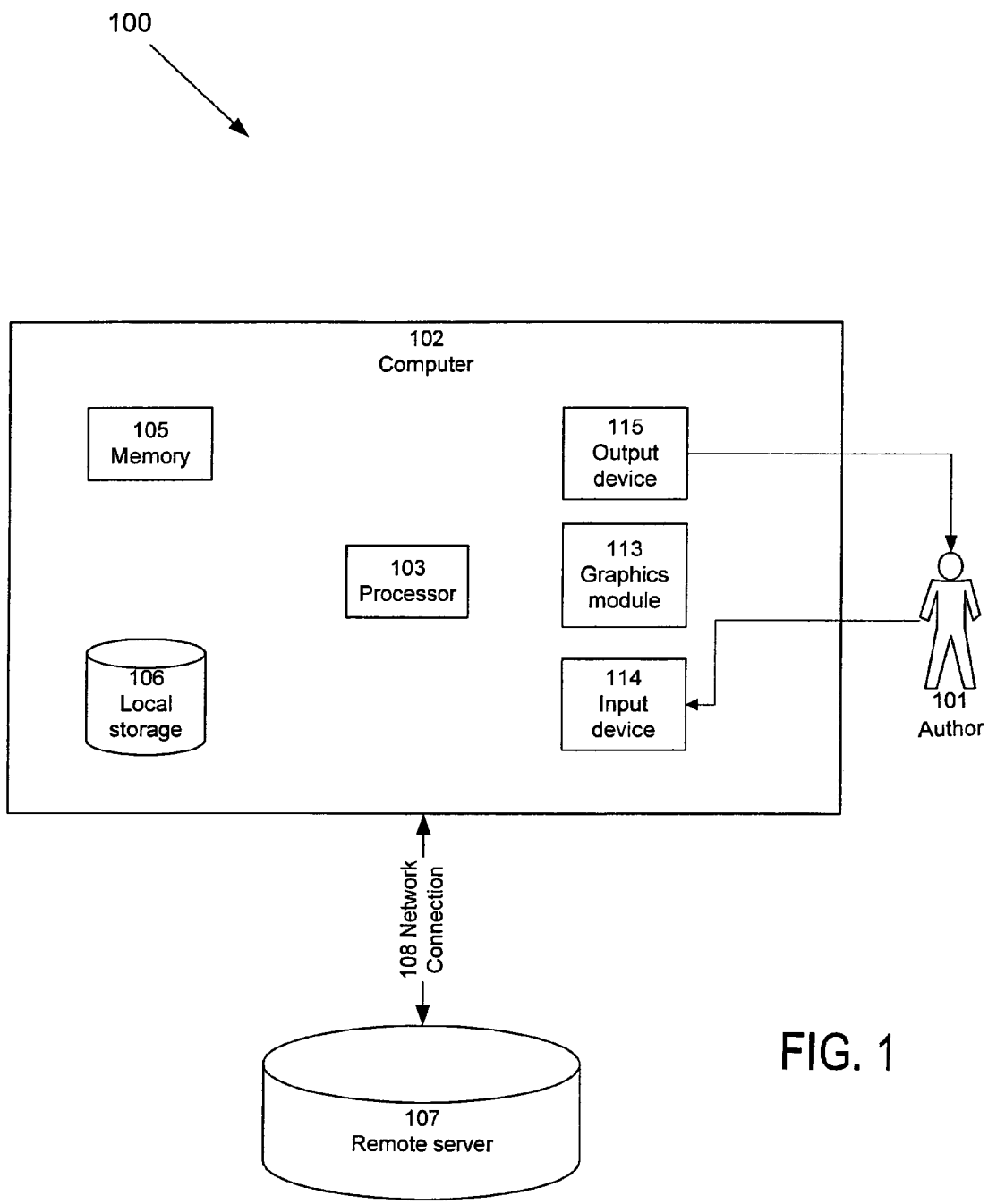
FIG. 1 is a block diagram depicting an overall architecture for implementing the present invention according to one embodiment.

In one embodiment, the present invention is implemented as an authoring environment that runs on a personal computer, workstation, handheld computer, mobile device, consumer electronics device, or the like. One example of an implementation of the present invention is in a Macintosh personal computer running the MacOS X operating system. Referring now to FIG. 1, there is shown an example of an architecture for a system 100 for implementing the present invention. Personal computer 102 includes processor 103, memory 105, input devices 114 such as keyboard and mouse, and output device 115 such as a display screen. A graphics module 113, such as a graphics card, may be provided for generating output for output device 115. Author 101 interacts with system 100 by providing input via device 114 and viewing output via device 115. Computer 102 also includes local storage 106, such as a hard drive, and can also include network connection 108 for accessing remote server 107. These components are well-known hardware components commonly used for running software applications. In one embodiment, software embodying the invention is provided on a computer-readable medium such as local storage 106.

The personal computer 102 used to run the authoring functionality of the present invention may be the same computer that is used for displaying and using widgets in a dashboard, or it may be a different computer. For example, the authoring functionality can be implemented on a development machine, while the dashboard and widgets are installed and run on a user's machine.

Dashboard and Widgets

The dashboard (also referred to herein as a "unified interest layer") includes a number of user interface elements, also referred to herein as "widgets." These user interface elements, or widgets, generally include software accessories for performing useful, commonly needed functions. Examples of widgets include, without limitation, a calendar, a calculator, an address book, a package tracker, a weather module, and the like. In one embodiment, some widgets may interact with remote sources of information, such as servers, to provide information; for example, a weather module may retrieve live weather data from a remote server. Widgets may be interactive, so that a user performs common input operations (such as clicking a mouse or typing on a keyboard) to utilize the functionality of a widget.

Users interact with and/or configure widgets as desired. In one embodiment, users can move widgets around the screen, and can resize widgets if applicable. Some widgets may be resizable, and some may be of fixed size; the widget author may specify whether a widget can be resized. Some widgets may automatically resize themselves based on the amount or nature of the data being displayed. In one embodiment, widgets may overlap one another. In another embodiment, widgets do not overlap one another; if the user attempts to move one widget to the position occupied by another widget, one of the widgets may automatically move out of the way to make room. In one embodiment, the position, configuration, and size of widgets are saved when the dashboard is dismissed, so that the same state can be restored the next time the dashboard is invoked.

In one embodiment, some or all widgets are associated with related, fully functional applications providing expanded versions of the functionality of the corresponding widgets. These widgets include a button, or icon, or other element, for quickly launching the associated application. When a user clicks on the button, the dashboard is dismissed, the normal desktop user interface is reactivated, and the associated application is automatically launched. For example, as will be described in more detail below, a music player widget can include a button for launching a fully functional music player application containing additional features beyond what is available in the widget.

In one embodiment, a button can be provided for accessing a website, web page, or web-based application having functionality or information related to a widget. When a user clicks on the button, the dashboard is dismissed, the normal desktop user interface is reactivated, a web browser is launched, and the web page (or the like) associated with the widget is automatically launched. For example, a stock quote widget may include a button for accessing a website that includes more detailed information on a portfolio or on a particular stock. In another embodiment, related fully functional applications, websites, web pages, or web-based applications can be accessed by other means than a button within the widget. For example, such functionality can be launched via an onscreen icon or menu, or via a keystroke or key combination.

In one embodiment, the fully functional application or related website provides context for a launched widget. For example, if the user has highlighted a word in a document before activating a dictionary widget, the dictionary widget's text field is automatically populated with the highlighted word. In one embodiment, a word search is automatically activated, and the results automatically displayed, so that activating the dictionary widget causes a definition to be displayed without any further user interaction. Similarly, if an email message is open on the user's screen when an address book widget is launched, the address book is automatically opened to a page corresponding to the contact information for the sender of the email message. In one embodiment, such pre-population or automatic opening is not performed under certain situations, such as for example if the widget is already open to another page or entry. In one embodiment, the user can configure the operation of the widget, including whether or not such prepopulation or automatic opening occurs and under what circumstances it should occur. One skilled in the art will recognize that there are many other situations where a widget can use context information from a currently-running application or website.

In one embodiment, some or all widgets have rollover elements; these are user interface elements that appear when the onscreen cursor is moved over the widget. The rollover elements disappear when the onscreen cursor is moved so that it is no longer over the widget. In one embodiment, rollover elements only appear if the cursor is held over the widget for at least a predetermined period of time, such as half a second. An example of a rollover element is a volume ring (not shown) for music player application.

Widget Installation

In one embodiment, widgets are preinstalled on the user's computer, so that dragging them onto the dashboard merely makes them active. In another embodiment, widgets are not preinstalled, but are installed in response to the user dragging them onto the dashboard. In another embodiment, dragging a widget onto the desktop causes code for the widget to be downloaded from a remote server and installed on the user's machine. In another embodiment, installing a widget in this manner also causes a fully functional application containing related functionality to be automatically installed as well (although the user can be given the option to decline such an installation); for example, installing a music player widget can cause a fully functional music player application to be installed as well. Authentication and payment may be prerequisites for such operations in some embodiments. Additional description of widget installation mechanisms is provided in related U U.S. patent application Ser. No. 10/877,968, filed on Jun. 25, 2004, entitled "Unified Interest Layer for a User interface," by Chaudhri et al., the disclosure of which is incorporated herein by reference.

Software Architecture

Figure 2:
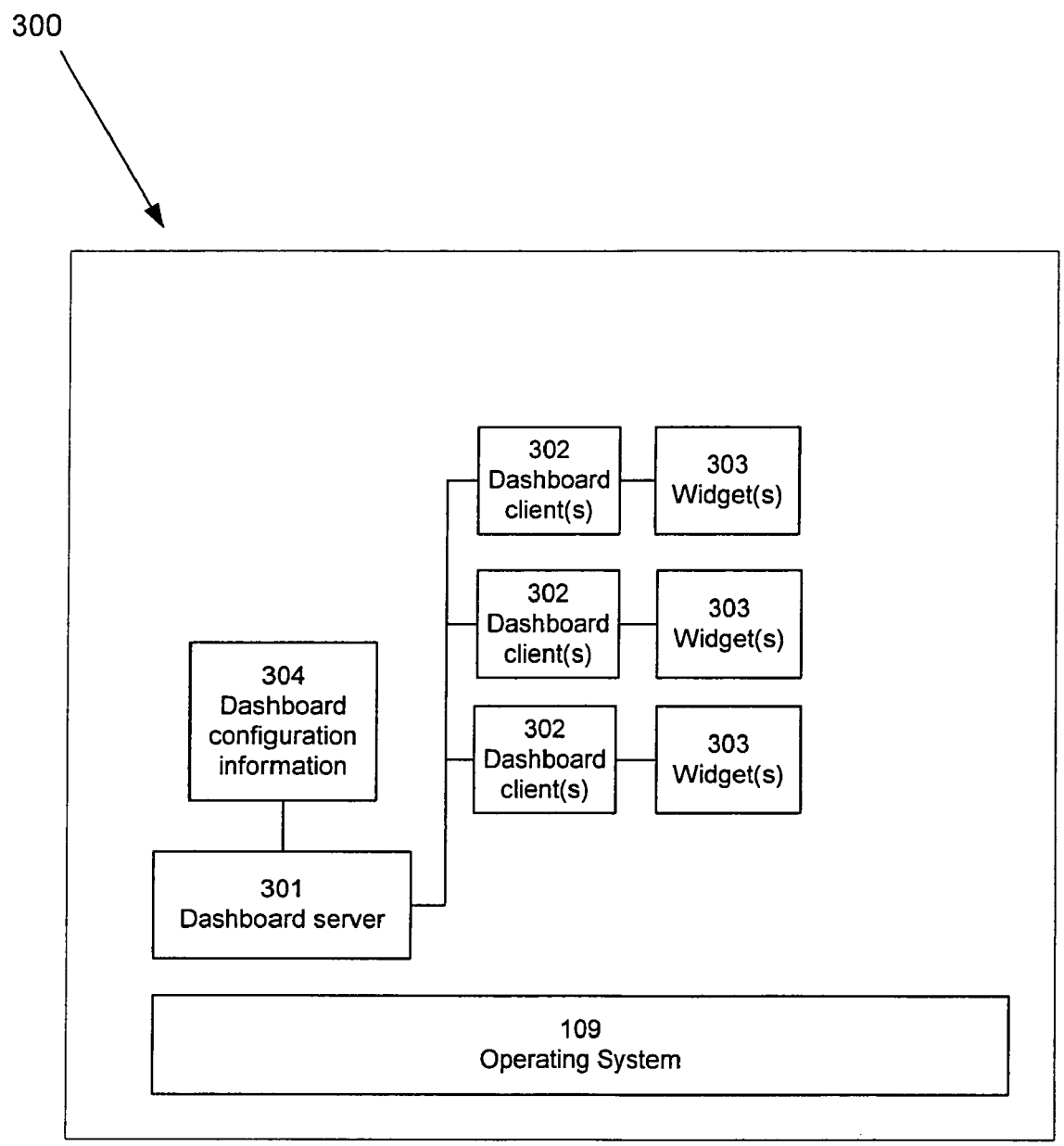
FIG. 2 is a block diagram depicting a software architecture for implementing the present invention according to one embodiment.

Referring now to FIG. 2, there is shown an example of a software architecture 300 for implementing widget functionality according to one embodiment. Operating system 109 is a conventional operating system for a personal computer, such as MacOS X from Apple Computer, Inc. of Cupertino, Calif.

In one embodiment, software architecture 300 includes dashboard server 301, dashboard client(s) 302, and widget(s) 303. Dashboard configuration information 304 is used by server 301 and/or clients 302 to specify the configuration options for displaying widgets 303. All of the dashboard configuration information, including access levels and the like (if applicable), is stored in dashboard configuration information 304. As described above, such information may include dashboard configuration information for two or more dashboards configured by the same user or by different users.

In one embodiment, widgets 303 are displayed using HTML and related web technology. Dashboard server 301 manages and launches dashboard client 302 processes. Each dashboard client 302 loads a widget 303, which in one embodiment is an HTML webpage and related resources needed to display the page. In one embodiment, a client 302 is initiated for each widget 303 to be displayed. In one embodiment, clients 302 display widgets 303 without a conventional window frame, menu bar, or other components typically associated with on-screen windows; this provides a clean, straightforward display of the overall dashboard that avoids confusion and clutter. Clients 302 display widgets 303 by rendering web pages into a "WebView"; the size of each WebView is defined as metadata associated with the corresponding widget 303. Server 301 is a window server that provides data for rendering a layer that can be overlaid on the normal desktop of the user interface. Widgets 303 are rendered into the separate layer, and then that layer is drawn on top of the normal desktop, so as to partially or completely obscure the desktop while the dashboard is active.

Dashboard Server 301

Dashboard server 301 is a lightweight process that can stand alone or be imbedded in another process. Server 301 can be located at computer 102, or at remote server 107. Server 301 provides the following functionality:

Non-widget UI. In one embodiment, server 301 handles user interface functionality that is not directly related to widgets. This includes, for example: activation; deactivation; dashboard background; background animations; and the like.

Window management. In one embodiment, server 301 acts as a lightweight window server for the dashboard client 302 processes. Windows are created in server 301 process and then passed to dashboard clients 302. Operations performed on windows go through dashboard server 301. Such operations include, for example: resizing; moving; fetching of position and size; and the like. One advantage to having window operations pass through server 301 is that server 301 can then react to widget 303 changes and update the overall environment. For example, server 301 can cause displayed widgets 303 to bounce off of each other, stick to sides of the screen, snap to grids, or the like.

Fast login. In one embodiment, dashboard clients 302 are launched and then rendered into a window from dashboard server 301. Since this can take some time, dashboard server 302 provides an initial image to be rendered in the window while client 302 is launched, so as to improve visual feedback and to make initial activation animation appear instantaneous. As dashboard clients 302 load and render, they take over the window and draw their content.

Event management. In one embodiment, server 301 acts as an event server as well as a window server. Events come from the operating system window server to dashboard server 301 and are routed to the appropriate dashboard client 302. This indirection allows for a variety of features, including: server-side dragging (even if a dashboard client 302 is hung); filtering of events; insertion of server-generated events; and the like. Dashboard clients 302 communicate with server 301 to describe control regions, so that server 301 can initiate server-side drags correctly.

Loading widgets 303. In one embodiment, server 301 is responsible for loading widgets 303. It maintains the list of widgets 303 to load when starting up. In one embodiment, the dashboard client 302 corresponding to a particular widget 303 is not launched until the first time the dashboard is activated.

Arbitration of widgets 303. In one embodiment, server 301 is the arbitrator of dashboard clients 302. It controls the process and passes information to and from each widget 303. If a widget 303 crashes, dashboard server 301 re-launches the process automatically. It also prevents crash loops where a widget 303 crashes repeatedly at startup. In one embodiment, all communication to a widget 303 goes through dashboard server 301 first.

CoreImage integration. In one embodiment, server 301 uses CoreImage technology, as described in related U.S. Utility patent applications cross-referenced above. Filters are applied to the background window of the server to provide spotlight and ripple effects.

Widget 303 preference management. In one embodiment, server 301 stores, in configuration information 304 that is stored according to a conventional file system, preferences associated with widgets 303, and vends those preferences to widgets 303.

Dashboard Client 302

In one embodiment, each client 302 is a lightweight process that uses, for example, objects defined as part of a development environment such as Cocoa Application Framework (also referred to as the Application Kit, or AppKit), described for example at *Mac OS X Panther Release Notes Cocoa Application Framework*, available at "http://developer.apple.com/documentation/ReleaseNotes/Cocoa/AppKit.html").

Clients 302 can be implemented as simplified browser screens that omit conventional interface features such as a menu bar, window frame, and the like. In one embodiment, clients 302 provide the following functionality in implementing the present invention:

Control of the WebView. Client 302 creates a WebView and attaches the HTML of widget 303 to the WebView. Client 302 acts as the delegate for user interface requests made by the WebView. In one embodiment, client 302 overrides much of AppKit's default behavior as it regards to communication to server 301 and event handling. WebViews are generic controls for viewing and manipulating HTML and XHTML; they are described, for example, at *Web Kit Reference for Objective-C*, available at "http://developer.apple.com/documentation/Cocoa/Reference/WebKit/ObjC_classic/index.html".

JavaScript extensions. In one embodiment, client 302 inserts a custom object in the JavaScript runtime of the WebView. This allows for a variety of extensions for widgets 303, including without limitation: copy/cut/paste; getting/setting preferences; notifications when preferences have changed; opening a linked application (for example, a widget 303 may include a button or other trigger that causes a corresponding application to be launched); quitting; moving/resizing; and the like.

Managing Plug-ins. Some widgets 303 use native code as part of their implementations. In one embodiment, client 302 includes the capability to interface with such native code and/or with databases and data stores available locally or remotely. In one embodiment, widgets 303 also have the ability to create a custom AppKit NSView. A widget developer can use a custom view to enable other types of animations, such as OpenGL views, plug-ins such as Flash, and the like.

In one embodiment, plug-ins are implemented as follows. An ObjC bundle is loaded from a resources folder associated with widget 303. The bundle has two methods on its Principal Class:

(id) initWithWebView:(WebView*)webview;
(void) windowScriptObjectAvailable:(WebScriptObject*) windowScriptObject (this allows the plugin to add JavaScript extensions before the web page has loaded);
initWithWebView is called when the Dashboard Client starts up, and webViewLoaded is called when the page finishes loading. The developer of a plug-in can use the WebKit's scripting APIs to extend the JavaScript for a particular widget 303.

Widget 303 Format

In one embodiment, each widget 303 is implemented as an HTML file. The HTML file can reference other local and remote resources such as style sheets, other HTML files, JavaScript files, images, and the like. Widgets 303 can be implemented using, for example, a flat bundle file format or a packaged HTML file format.

Flat Bundle. The Flat Bundle format has the following directory structure:
My.widget (directory/Bundle)
Info.plist (file)
My.html (file)

My.png (file)
English.lproj (optional directory)
Localizable.strings (file)

The Info.plist describes widget 303. It also provides an identifier for widget 303, and points to the main HTML file and default PNG file. The default PNG file is used as a temporary display while dynamic elements are loaded from server 301. An example of a structure for Info.plist is as follows:

| Key | Type | Description/Value |
| --- | --- | --- |
| CFBundleIdentifier | CFString. | com.apple.widget <widget name> |
| CFBundleName | CFString | name of the widget |
| MainHTML | CFString | name of main HTML resource |
| Width | CFNumber | default width of the widget |
| Height | CFNumber | default height of the widget |
| DefaultImage | CFString | resource name of default PNG |
| Plugin (optional) | CFString | resource name of native plugin |

My.html can reference any other local resource as well. In one embodiment, the resources are specified relative to the HTML file's location.

My.png can have any name, based on the "DefaultImage" key in the Info.plist. This image is rendered by server 301 if there is no cached representation.

The English.lproj and other localizable directories are for localizable strings.

In another embodiment, widgets 303 include any or all of the following components: an HTML file containing the structure of the widget; a cascading style sheet (CSS) file containing style elements; a default portable network graphics (PNG) file containing the image shown as initial background for widget 303, an icon file, and other PNG files as desired or appropriate. In one embodiment, an operating system component known as "dashboard" uses these elements to generate a view of a widget 303 on-screen.

Widget 303 Location

In one embodiment, widgets 303 are stored locally in storage device 106 such as a hard drive. Per-machine widgets 303 are stored at, for example:

/Library/Widgets/
/Applications/Widgets/

Widgets 303 can also be made available on a per-user basis, particularly in situations where more than one user uses the same computer 102. Per-user widgets 303 are stored, for example, at:

~/Widgets
~/Library/Widgets/

One skilled in the art will recognize that these configurations are merely exemplary, and that any other file format or directory structure can be used.

Widget 303 Development

In one embodiment, widgets 303 can be developed using WebKit, described, for example, at Web Kit Reference for Objective-C, available at "http://developer.apple.com/documentation/Cocoa/Reference/WebKit/ObjC_classic/index.html". Additional functionality can also be provided, such as the ability to drag to and from web pages, detect control regions, stop plug-ins and timers from firing when the dashboard is hidden, and the like. In one embodiment, such additional functionality is provided using an enhanced Canvas architecture, as described in related U.S. Provisional Patent Application 60/583,125, filed on Jun. 25, 2004, for "Procedurally Expressing Graphic Objects for Web Pages," filed on Jun. 25, 2004, and U.S. patent application Ser. No. 11/144,384, entitled "Procedurally Expressing Graphic Objects for Web Pages" to Williamson, et al., filed on Jun. 2, 2005, the disclosures of which are incorporated herein by reference. In addition, web extensions that are well known in the art can be used for providing additional functionality such as drag-and-drop capability, detection of control regions, and the like.

For widgets that involve additional, more detailed rendering than is available from WebKit/HTML, a <canvas> tag is provided. A CoreGraphics context is fetchable from the <canvas> tag, and JavaScript is then used to draw into the context and effectively the HTML page. Detailed description of this implementation can be found in the related applications.

Remote Server 107 Access

In one embodiment, some or all widgets 303 communicate with a remote server 107 in order to perform their functions. For example, a weather widget requests current weather data from a remote server 107, while a package tracking widget requests current data regarding package locations from a remote server 107. Such communication takes place according to well-known techniques for requesting and receiving information across a network such as the Internet: widget 303 or client 302 forms a request for data, and transmits the request according to HTTP or some other network protocol; server 107 responds to the request with the information; and widget 303 uses the information in forming the output that will be displayed to the user. In one embodiment, these operations take place in response to JavaScript code within widget 303. Server 107 can be a resource that is available generally to the public, or it can be a proprietary source of information to which the user has been given access. Where appropriate, authorization and/or user verification can be required before server 107 transmits requested information. If desired, the information can be transmitted across a secure channel and/or encrypted prior to transmission, according to techniques that are well known in the art.

Widget Authoring Environment

In one embodiment, the present invention provides an environment for authoring and editing widgets 303. The environment provides easy-to-use tools that allow an author to create new widgets 303, debug their functionality, and edit existing widgets 303.

In one embodiment, the widget authoring environment is implemented as a document-based editor of widgets. The author opens a new document within the authoring environment, sets or changes widget parameters as desired, saves the changes. Widget 303 files (including .html, .css, .js, .png, and the like) are then automatically generated based on the author-selected parameters. In one embodiment, these files are saved into a bundle specified by the author.

In one embodiment, documents within the authoring environment have a unique file extension, such as .wdgt. Thus, the user can edit existing widgets 303 previously created within the authoring environment by opening a .wdgt file.

The following is a description of a software architecture and user interface of implementing such a widget authoring environment according to one embodiment.

Figure 3A:
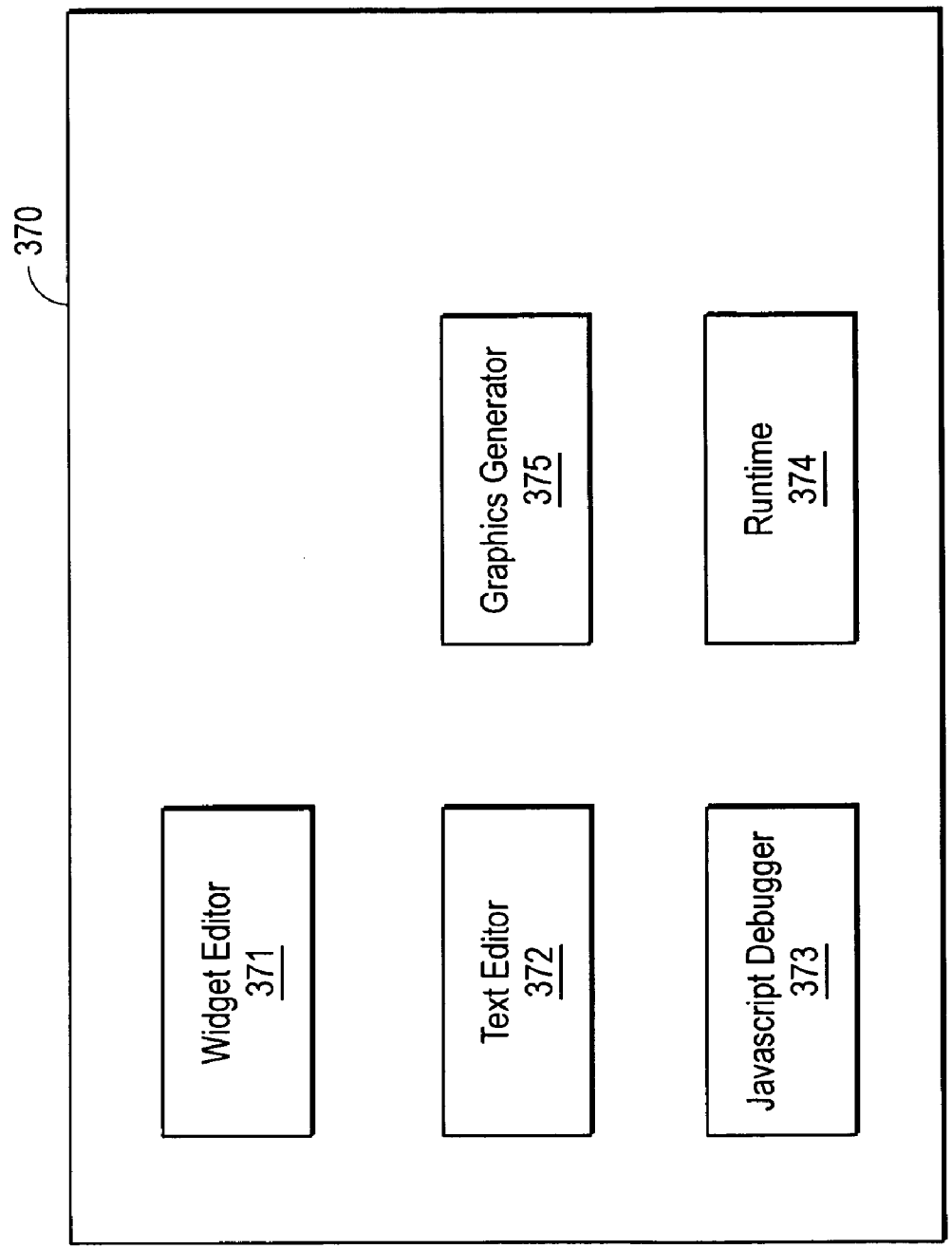
FIG. 3A is a block diagram depicting components of a widget authoring environment according to one embodiment.

Referring now to FIG. 3A, there is shown a block diagram depicting components of a widget authoring environment 370 according to one embodiment.

In one embodiment, the authoring environment 370 includes the following components:

Widget editor 371: In one embodiment, widget editor 371 contains a subclass of the WebView core class, as is known in the art. This subclass receives user input within the authoring environment 370, and is thereby able to show selection state and support user input operations such as drag and drop, move, resize, and the like. In one embodiment, the widget editor 371 class of objects employs Document Object Model (DOM) to manipulate and edit the structure and parameters of widgets 303. Adding, editing, deleting, or changing objects within the authoring environment 370 causes the DOM to be directly manipulated so that the change is reflected accordingly. DOM is used to generate the various files associated with a widget 303.

Text editor 372: Many components of a widget 303 are text-based files, such as .html, .css, and JavaScript. Text editor 372 supports editing of these text-based components from within authoring environment 370. In one embodiment, text editor 372 provides appropriate syntax highlighting as needed, and leverages text editing functionality found in Xcode, as is well known in the art. In addition, support is provided, in one embodiment, for users to designate third-party text editors for use in connection with authoring environment 370.

Runtime/debugger UI 374: Widgets 303 can be run within runtime module 374 of authoring environment 370 for testing purposes. In one embodiment, runtime module 374 includes debugger functionality that provides visibility into variables and environmental conditions, and allows the author to control execution on a step-by-step basis in order to evaluate and correct bugs.

JavaScript debugger 373: In one embodiment, a separate JavaScript debugger 373 is provided.

Graphics generator 375: In one embodiment, a graphics generator is provided which is capable of automatically generating widget 303 elements. Graphics generator 375 supports themes, primary and secondary color usage, and the like. In one embodiment, graphics generator 375 employs CoreImage and CoreGraphics software code bases in implementing its functionality.

Figure 3B:
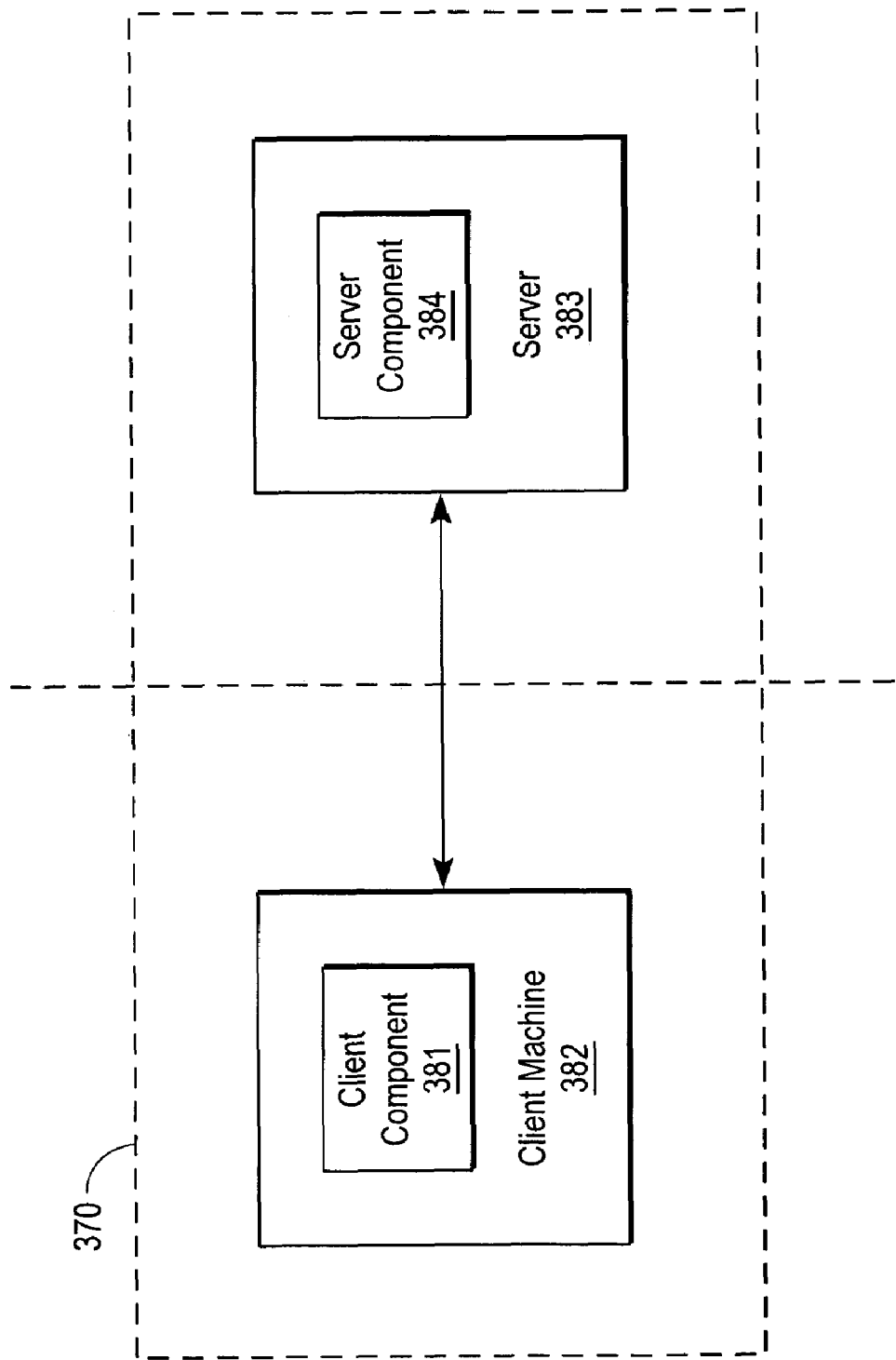
FIG. 3B is a block diagram depicting a software architecture for implementing a widget authoring environment according to one embodiment.

In one embodiment, as shown in FIG. 3B authoring environment 370 is implemented in a client/server environment including a client component 381 running on client machine 382 and a server component 384 running on a server 383. This arrangement protects the authoring environment 370 from the running of a widget 303 that could cause crashing or problems during runtime. The authoring environment 370 is server-based; when a widget 303 is run, a client application is spawned and the client communicates to the server using, for example, Mach messages.

Figure 4:
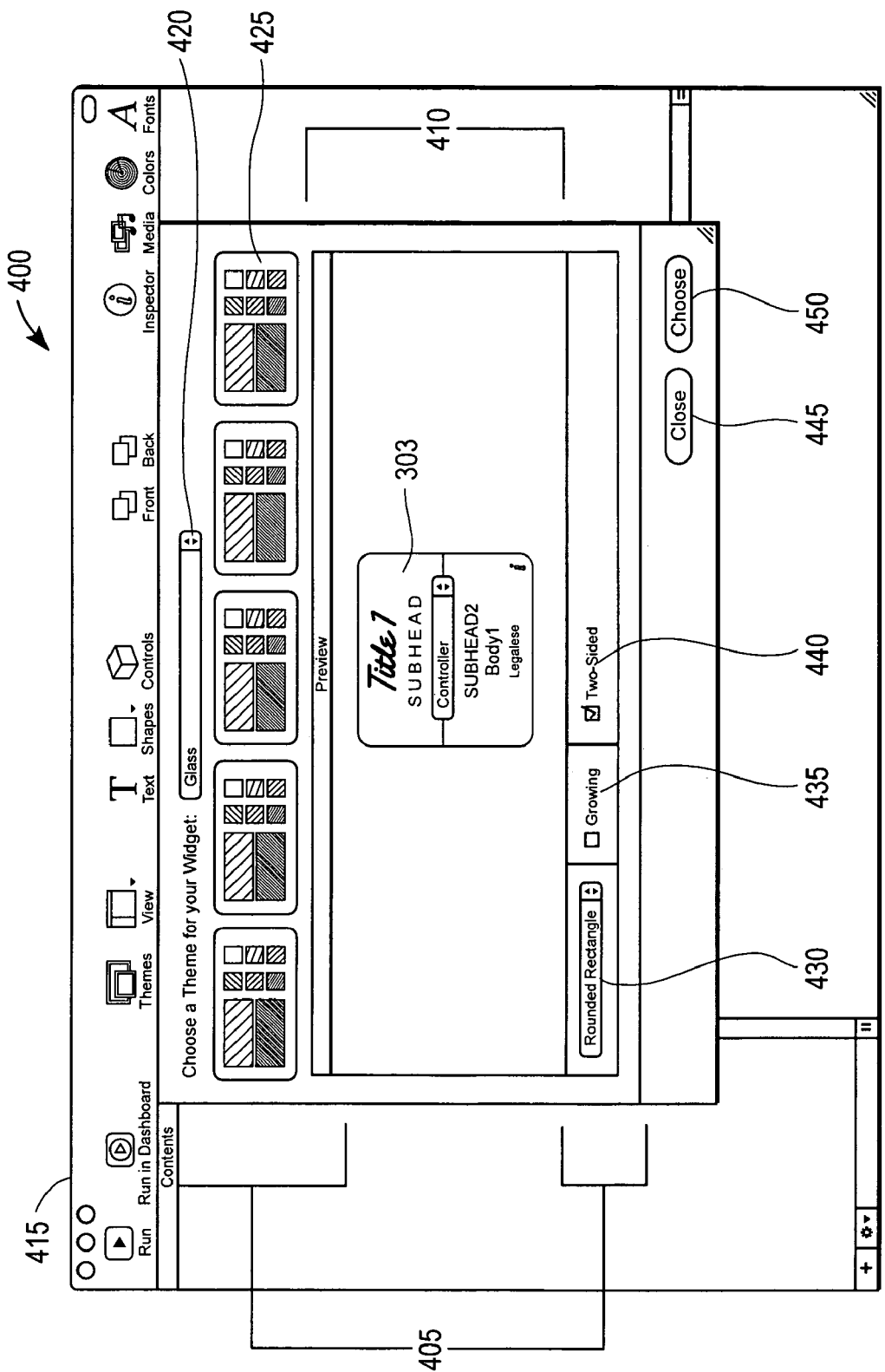
FIG. 4 is a screen shot showing a user interface for selecting attributes for a new widget, according to one embodiment.

FIG. 4 shows a create user interface 400 for creating a user interface element, or widget 303, according to one embodiment of the present invention. The create user interface 400 includes an attribute area 405 and a preview area 410. In one embodiment, a universal area 415 may be displayed as well.

When a widget author is ready to begin creating a new widget, he or she chooses from a palette of themes, colors and functionality in attribute area 405 that can be accessed at any time to change theme, color, and the like, for a widget 303.

The attribute area 405 displays a set of predetermined attributes for the user interface element 303. The attribute area 405 is comprised of configurable attributes, using a theme selector 420, a color scheme selector 425, a shape selector 430, an expandability selector 435, and a sidedness selector 440. The theme selector 420 allows the author to select a theme for the user interface element 330. In the depicted example, the theme is "glass." The color scheme selector 425 allows the author to select a color scheme for the user interface element 303. In the depicted example, five different predetermined color scheme are shown, with the one on the far left selected, as indicated by the outline around the color scheme. The shape selector 430 allows the author to select the shape of the user interface element 303. In the depicted example, the author has chosen "rounded rectangle." An example of another shape can be seen in FIG. 14. The expandability selector 435 allows the author to choose whether or not the user interface element 303 will include the ability to expand and collapse via a collapsible region, as discussed further in conjunction with FIG. 5A. The sidedness selector 440 allows the author to choose whether the user interface element 303 will be one-sided or two-sided, as described in conjunction with FIGS. 5A and 5B.

The preview area 410 displays the user interface element 303. As the author selects one or more of the predetermined attributes 420-440, the user interface element 303 display is updated to incorporate the selected attributes.

The universal area 415, if present, provides functionality for manipulating other aspects of the user interface element 303. The user interface 400 also includes a close button 445 for closing out of the create screen, and choose button 450 for choosing to create the user interface element 303 designed therein. After selecting choose 450, the author can edit the user interface element 303, for example as described in conjunction with FIGS. 5A and 5B.

In one embodiment, widgets 303 can be created that have a front side and a back side. Initially, the front side is shown. The author can click on an icon or activate a command to flip the widget 303 over in order to reveal the back side, and can click again (or activate the command again) to flip it to its front side. Thus, auxiliary functionality such as preference controls can be made easily accessible without occupying excess screen real estate.

Figure 5A:
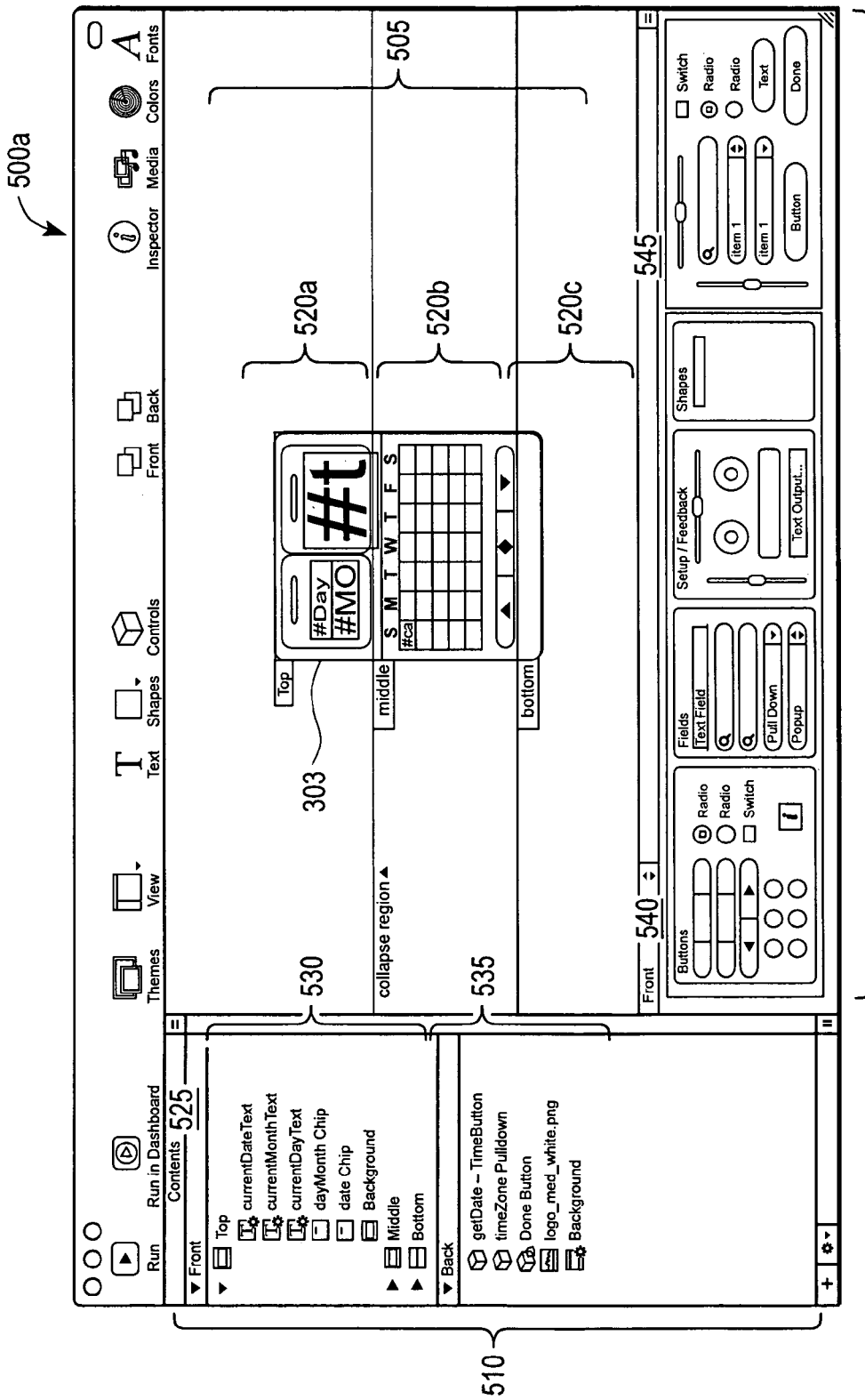
FIG. 5A is a screen shot showing a user interface for editing a front side of a widget, according to one embodiment.

FIG. 5A shows a document user interface 500a for editing the front side of a user interface element, or widget 303, according to one embodiment of the present invention. The document user interface 500a is displayed when an author finishes creating a new widget 303 in the create user interface 400, or opens an existing widget 303. The document user interface 500a includes a user interface element display area 505, a contents area 510, and a library area 515.

The user interface element display area 505 displays the user interface element 303 being edited in design mode. Three regions 520a-c of the user interface element 303 are shown, if the user interface element 303 is collapsible. The dividers 503 separating the regions 520 may be repositioned by the author. The user interface element 303 displayed in FIG. 5A is similar to the calendar widget 1801 of FIG. 10.

Figure 5B:
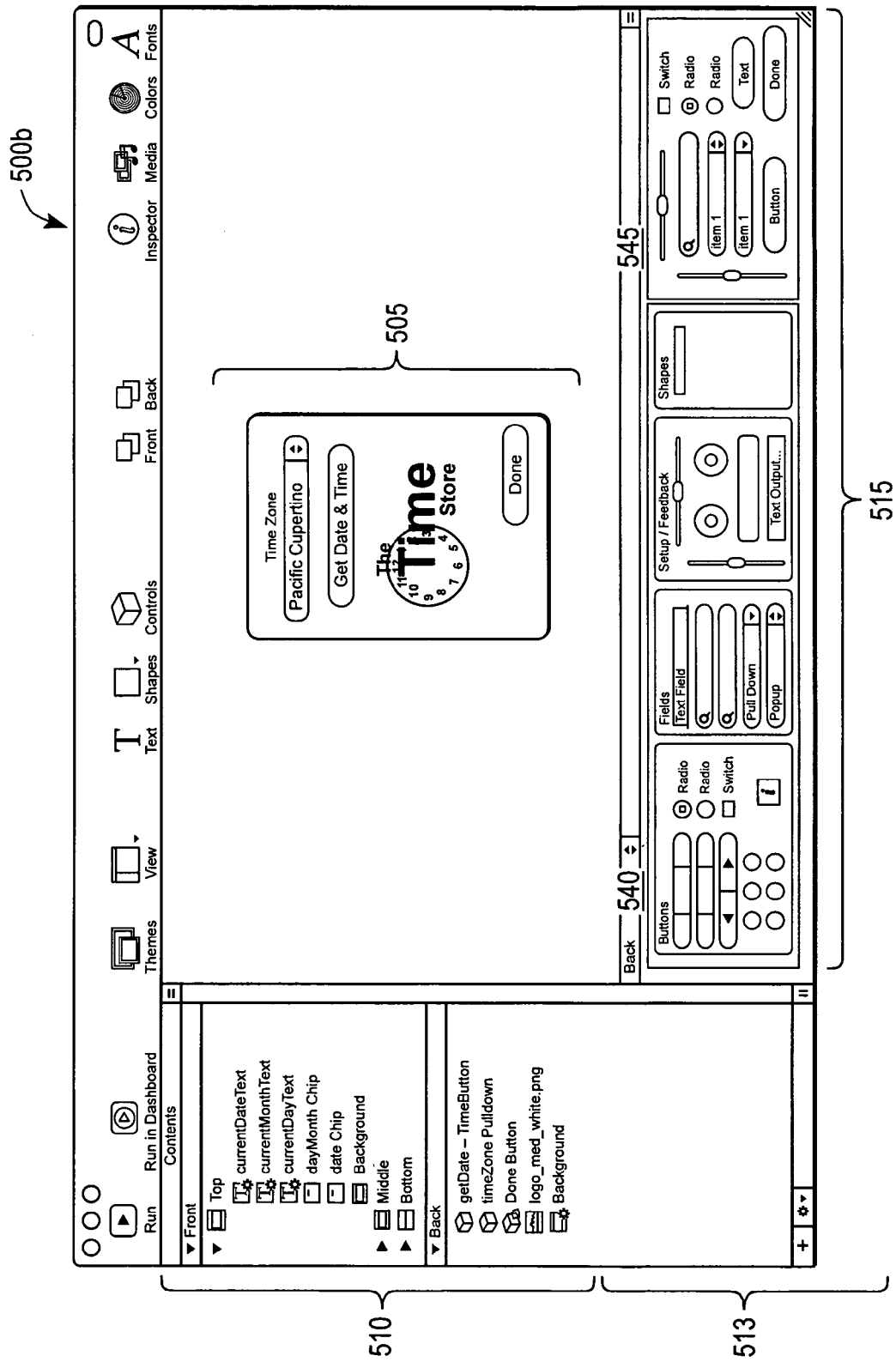
FIG. 5B is a screen shot showing a user interface for editing a back side of a widget, according to one embodiment.

The contents area 510 shows the various objects 507 included in the widget 303, including those for the front 530 and back 535 sides of the widget, and may also include a files area 513 (described in conjunction with FIG. 5B). The objects may include text objects, input fields, images, and the like.

The library area 515 includes various objects that can be added to the widget 303, such as various buttons and controls. The library area 515 is separated into objects for the front side 540 and back side 545 of the widget 303. As the document user interface 500a displays the front side of the widget 303, the back side are 545 of the library 515 is grayed out, or otherwise shown as inactive. To add an object to the widget 303, the author can drag the object into the contents area 510 or the user interface display area 505.

FIG. 5B shows a document user interface 500a for editing the back side of a user interface element, or widget 303, according to one embodiment of the present invention. Like the front side document user interface 500A, the back side document user interface 500B includes a user interface element display area 505, a contents area 510, and a library area 515.

In addition to the contents area 510 described in conjunction with FIG. 5A, a files area 513 is displayed. The files area 513 inlcudes the files that make up the widget 303, such as code-containing files in .html, .css, or .js format. Objects are further editable by the author via a context-sensitive inspector, such as windows shown in FIGS. 6 through 9D.

Figure 6:
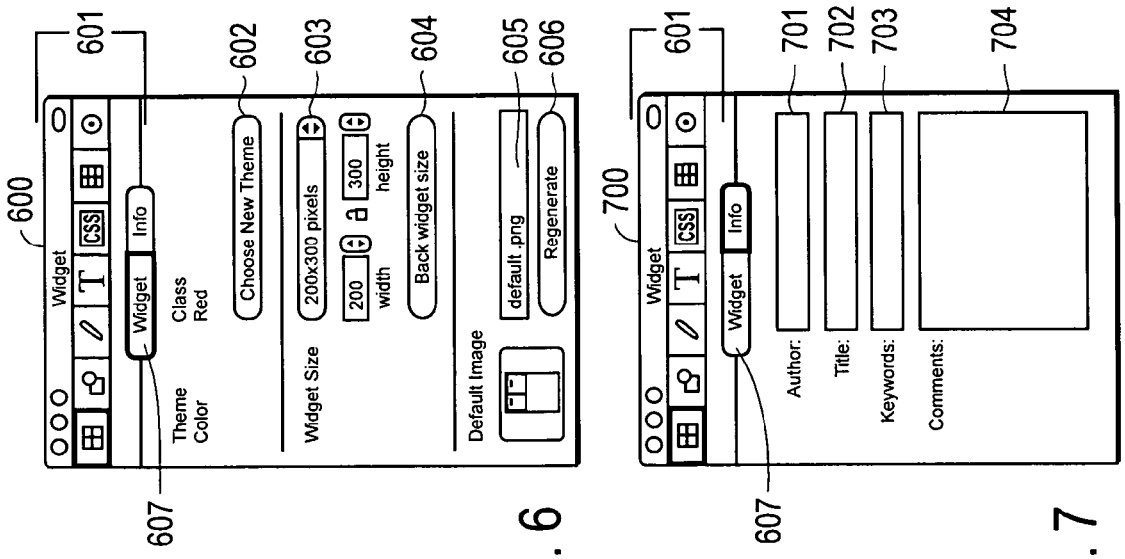
FIG. 6 is a screen shot showing a window for specifying theme, size and default image for a widget.
Figure 7:
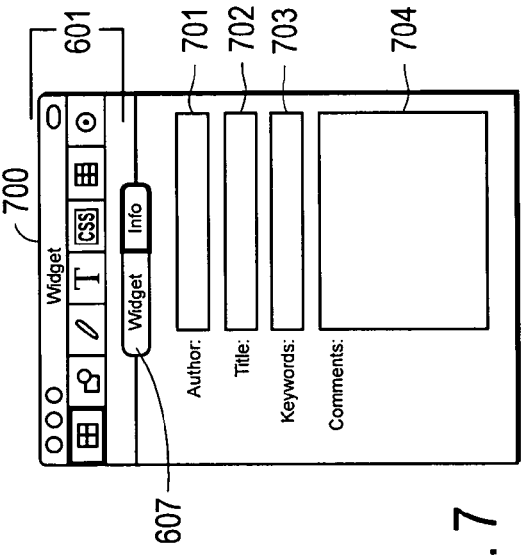
FIG. 7 is a screen shot showing a window for specifying metadata for a widget.

FIG. 6 shows a window 600 with a widget inspection context (inspector) according to one embodiment of the present invention. This window 600 allows the author to edit the basic attributes of the widget 303 such as theme, color, size, and the like. Button bar 601 allows selection among various panes for specifying various attributes of widget 303. Button bar 607 allows selection between window 600 for specifying visual attributes of the widget 303 (as shown in FIG. 6) and a window 700 for specifying metadata (as shown in FIG. 7). Button 602 allows the author to select a new theme for the widget 303. Menu 603 allows the author to select a size for the widget 303; in one embodiment fields are provided for entering a custom size. Button 604 locks the widget size so that it cannot be changed without first unlocking it. Field 605 provides an area for the author to specify a default image for the widget 303; in one embodiment a thumbnail of the default image is shown adjacent to field 605. Button 606 regenerates the widget 303 according to the specified parameters.

FIG. 7 shows a window 700 with a widget information inspection context according to one embodiment of the present invention. This window 600 allows the author to edit metadata about the widget 303. It includes fields for entering author information 701, title 702, keywords 703 (for search purposes), and comments 704.

Figure 8:
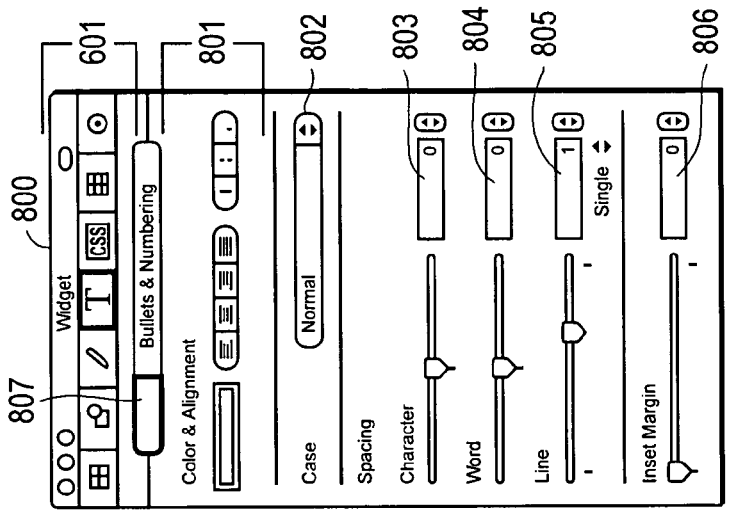
FIG. 8 is a screen shot showing a window for specifying text attributes for a widget.

FIG. 8 shows a window 800 with a text context according to one embodiment of the present invention. This window 600 allows the author to edit the text attributes of the widget 303. It includes fields, buttons, and menus for changing color and alignment 801, case 802, character spacing 803, word spacing 804, line spacing 805, and margin 806. In one embodiment, more than one control is available for a particular parameter; for example, as shown in FIG. 8 line spacing can be changed by moving a slider, or by typing a number in a field, or by clicking on up/down arrows to increase/decrease spacing, or by selecting from a pop-up menu that specifies single, double, and the like. Button bar 807 allows selection between window 800 for specifying text attributes of the widget 303 (as shown in FIG. 8) and a window 900a, b, c, d for specifying metadata (as shown in FIGS. 9A through 9D).

FIGS. 9A-D show windows 900a-d with bullets and numbering contexts according to one embodiment of the present invention. These windows 900a-d allow the author to select whether to include bullets and numbering in the widget 303, and if so, allow the author to format and customize the bullets and numbering. Windows 900a-d each include menu 901 for specifying the type of bullets, if any, to be included in the widget 303; in the examples shown, the types include none, text, numbers, and images.

Figure 9C:
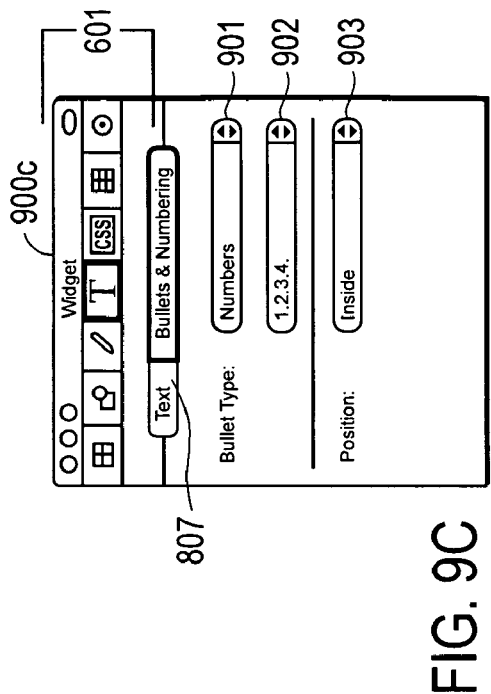
FIGS. 9A-D are screen shots showing windows for specifying bullets and numbering attributes for a widget.
Figure 9D:
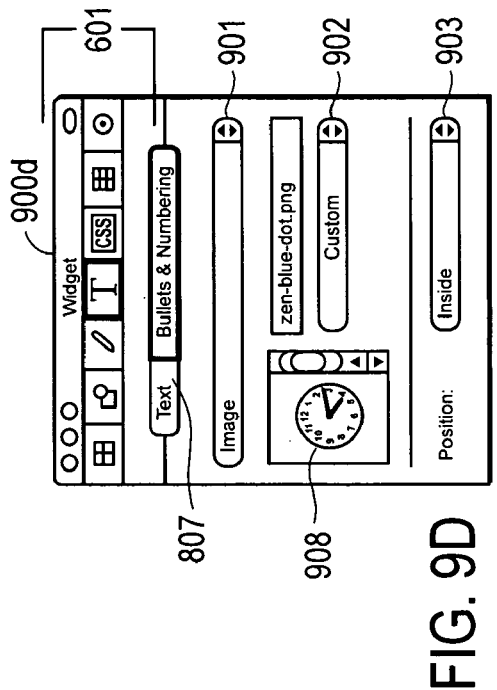
Figure 9A:
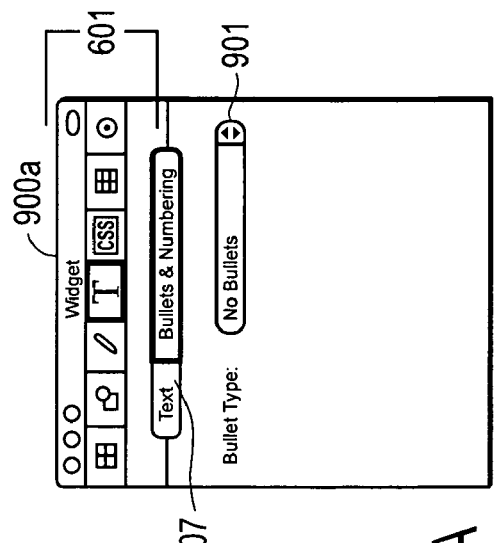
Figure 9B:
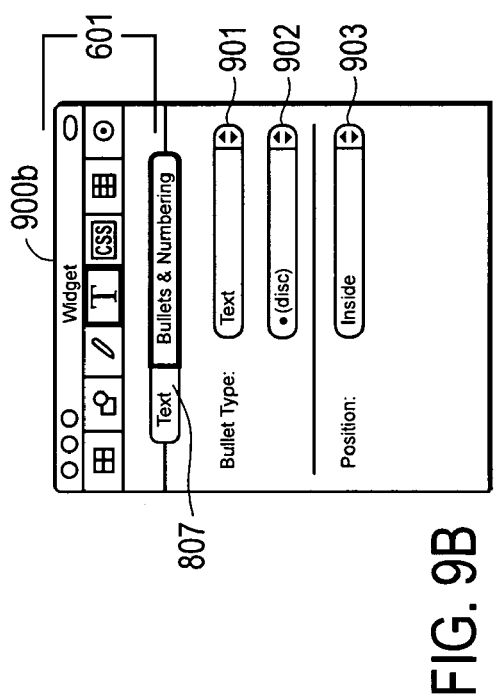

In window 900b, shown in FIG. 9B, the author has selected text bullets. Menu 902 allows selection of the specific appearance of bullets. Menu 903 allows selection of a position for the bullets.

In window 900c, shown in FIG. 9C, the author has selected number bullets. Menu 902 allows selection of the specific appearance of bullets. Menu 903 allows selection of a position for the bullets.

In window 900d, shown in FIG. 9D, the author has selected image bullets. Field 905 allows the author to type in the filename for an image to be used for bullets. Window 908 provides a preview of the image. Button 906 allows the author to select a custom image. Menu 903 allows selection of a position for the bullets.

Edits made in windows 600-900D are incorporated into the document user interface 500 when the author closes the window.

In one embodiment, the authoring environment 370 also includes a debugger for testing the functionality and operation of widgets 303 during development. For example, for widgets 303 that use JavaScript technology, a JavaScript debugger can be included that permits the author to set breakpoints, inspect variables, step through the script, and the like.

Figure 3C:
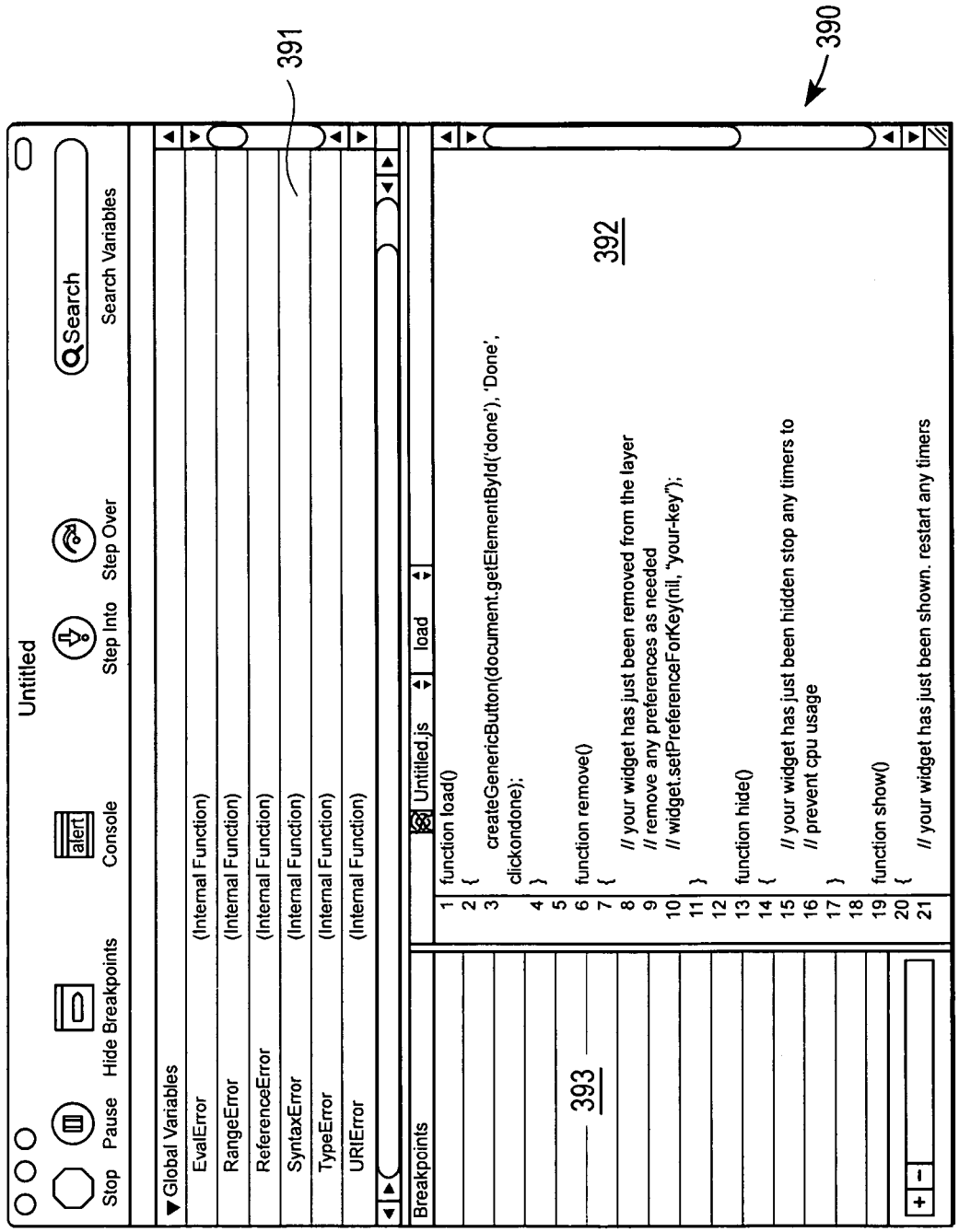
FIG. 3C is a screen shot depicting a JavaScript debugging environment according to one embodiment.

When the author wants to test widget 303, he or she enters a test mode. All of the appropriate files for widget 303 (.html, .css, .js, .png, and the like) are generated and run from a temporary location for testing purposes. If desired, a console window is provided to log runtime errors or provide other information and interaction capability. Referring now to FIG. 3C there is shown a screen shot depicting a JavaScript debugging environment 390 according to one embodiment. Environment 390 includes the ability to step through functions, set and hit breakpoints, evaluate functions and variables (global and local) and log and see errors and warnings. Pane 391 shows variables, pane 393 shows current breakpoints, and pane 392 shows the code being run.

Widget Editing

The author can open an existing widget 303 from within the authoring environment 370, and can then edit and save widget 303. In one embodiment, when an existing widget 303 is opened from within the authoring environment 370, the files associated with widget 303 are parsed and internal structures are set up as appropriate. The widget 303 being edited is then shown in a view similar to that depicted in FIGS. 5A and 5B. The author can then make changes as desired to the various parameters of widget 303 and save the changes. Updated widget 303 files (including .html, .css, .js, .png, and the like) are then automatically generated based on the new parameters.

Examples of Widgets

The following is a list of examples of widgets 303 that can be authored using the techniques of the present invention. One skilled in the art will recognize that many other types of widgets 303 can be authored.

buddy list
    calculator
    date book
    dictionary
    online music store and music player
    movie show times
    news feed
    package tracker
    rolodex
    sports scores
    stickies
    stock quotes
    webcam
    weather
    world clock
    currency converter online auction viewer and tool
lottery
mini inbox for receiving email
puzzle
telephone directory (e.g., yellow pages)
flight tracker
DVD rental queue.
translation
metric conversion
telephone directory For many of these widgets, the widget obtains information from online data sources via a network, in response to queries generated based on user input. The online data sources provide information that is used to generate the widget display. In one embodiment, those widgets that obtain their information via a network include a visual indicator to let the user know whether or not the displayed data is live. In one embodiment, such widgets also display the date and time of the most recent data update.

FIGS. 10-17, 18-19B, and 21-28C depict examples of some of these types of widgets 303. One skilled in the art will recognize that the particular layout, appearance, and arrangement of each of these widgets 303 are merely exemplary. Any or all of these widgets 303 can have a "back side" as well as a "front side".

Figure 10:
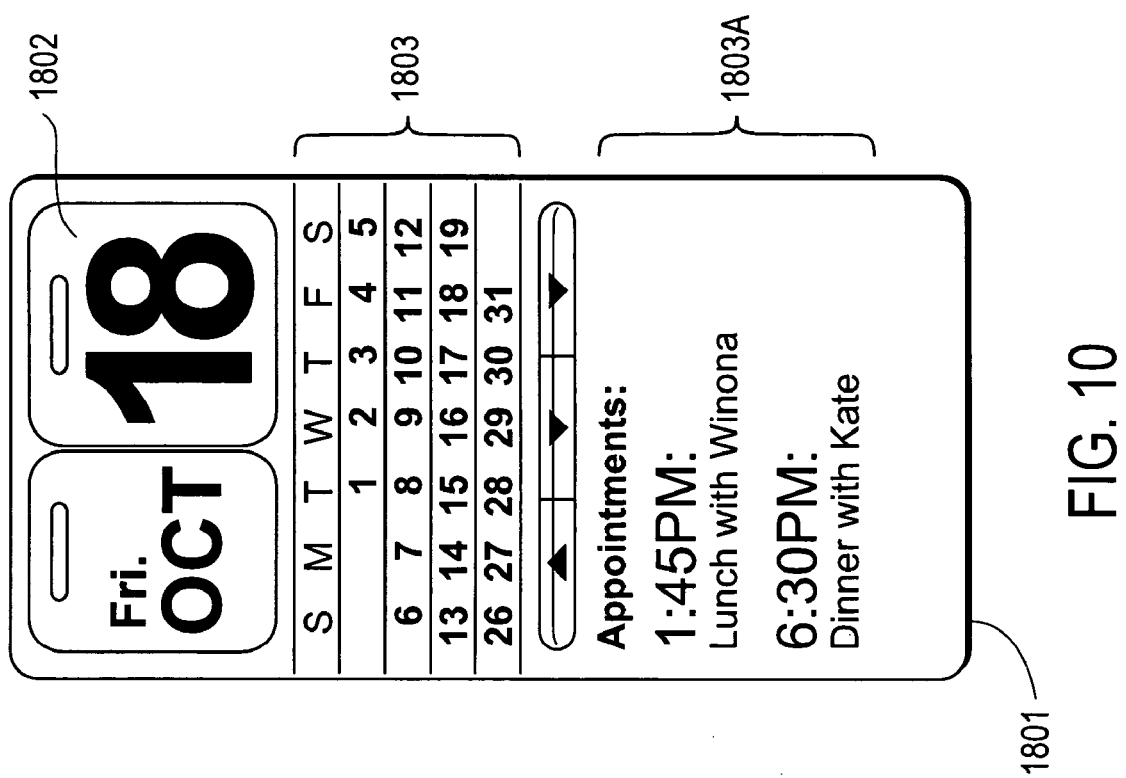
FIG. 10 is an example of a calendar widget according to one embodiment.

FIG. 10 depicts an example of a calendar widget 1801 according to one embodiment, including current date 1802, calendar display 1803 showing current month, and appointments 1803A. In one embodiment, data for the calendar is stored locally at computer 102; in another embodiment, widget 1801 retrieves calendar data from a remote server 107.

Figure 11:
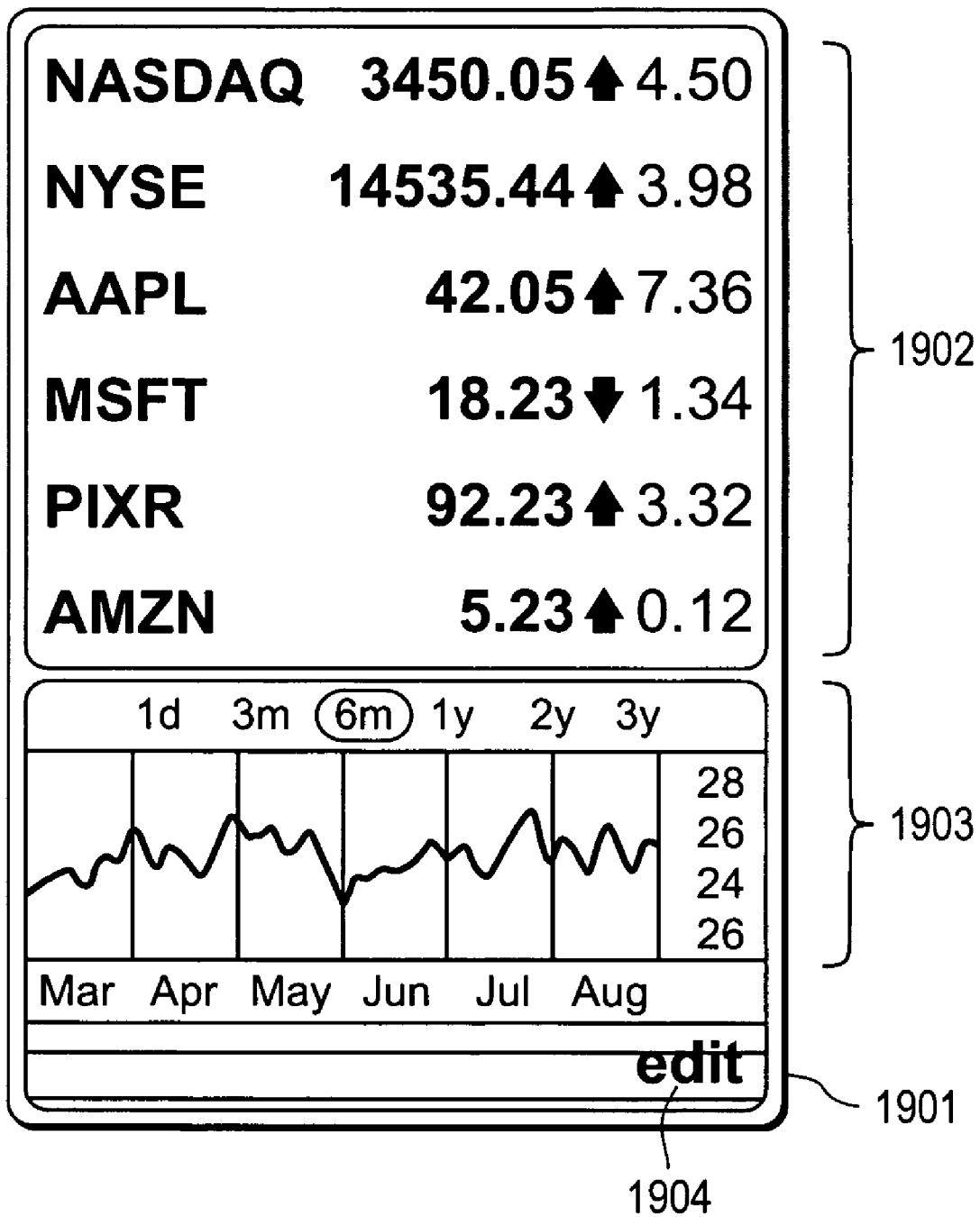
FIG. 11 is an example of a stock quote widget according to one embodiment.

FIG. 11 depicts an example of a stock quote widget 1901 according to one embodiment, including several stock quotes 1902, a graph 1903 for a selected stock, and an edit button 1904 for making changes to the stocks to be included in widget 1901. In one embodiment, widget 1901 retrieves stock quote data from a remote server 107.

Figure 12:
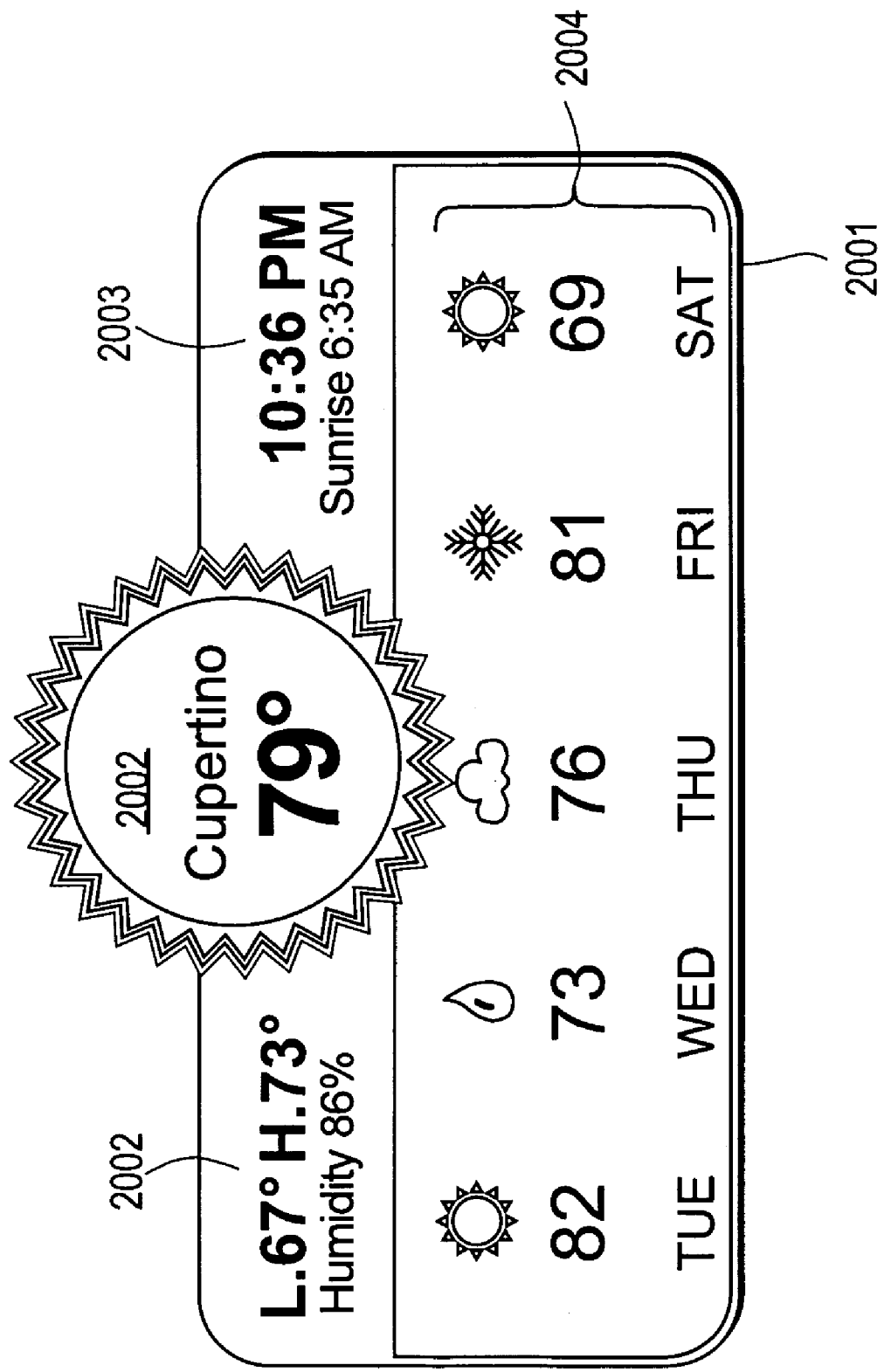
FIG. 12 is an example of a weather widget according to one embodiment.

FIG. 12 depicts an example of a weather widget 2001 according to one embodiment, including current temperature conditions 2002, current time 2003, and forecast 2004. Widget 2001 can be configured to show weather information for any one or more locations of interest to the user. In one embodiment, widget 2001 retrieves weather data from a remote server 107.

Figure 13:
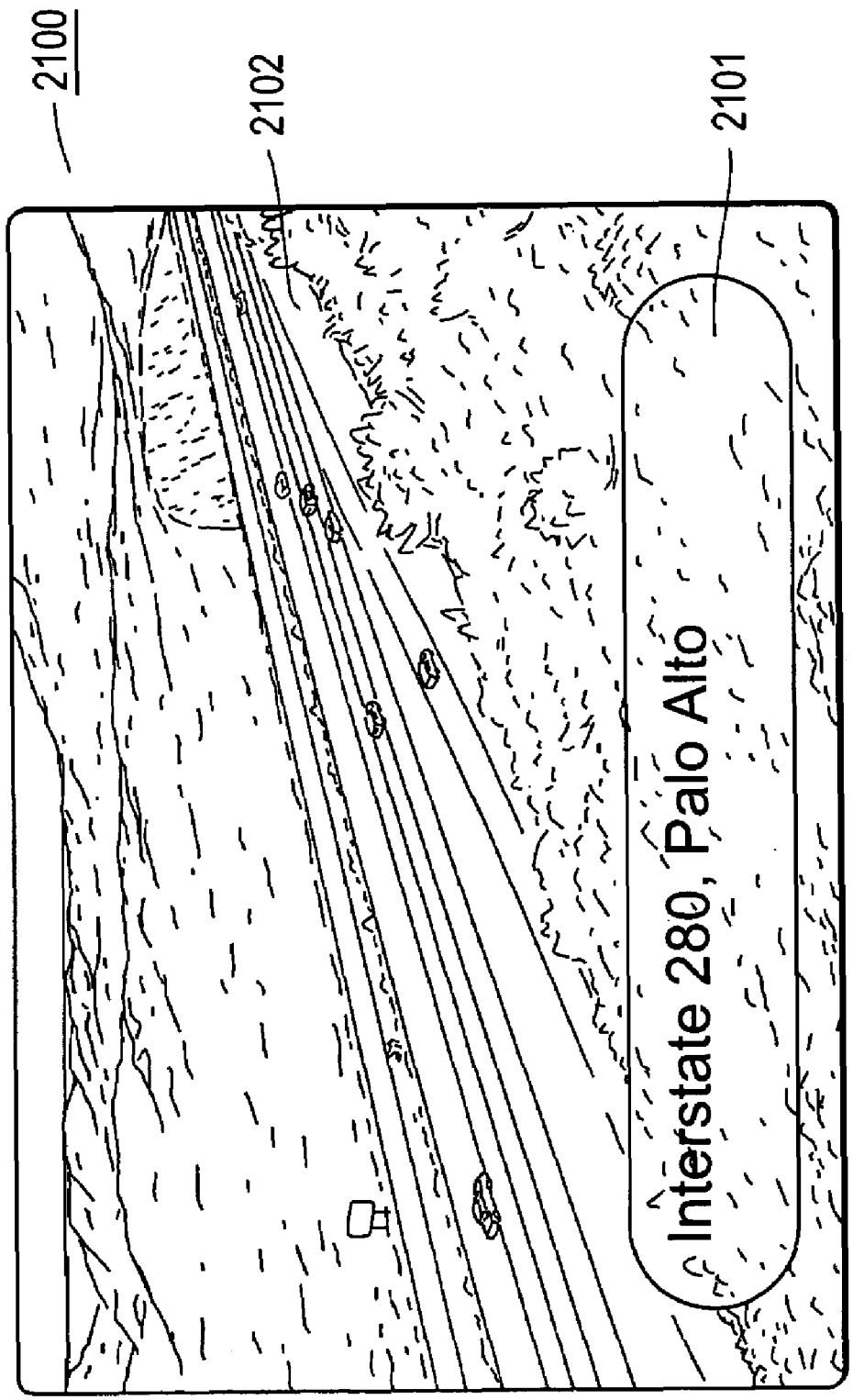
FIG. 13 is an example of a traffic webcam widget according to one embodiment.

FIG. 13 depicts an example of a traffic webcam widget 2100, including a current photograph 2102 (or live video feed) of a specified location, and an identifier 2101 of the location according to one embodiment. Widget 2100 can be configured to show images for any one or more locations of interest to the user. In one embodiment, widget 2100 retrieves photographs and/or video from a remote server 107.

Figure 14:
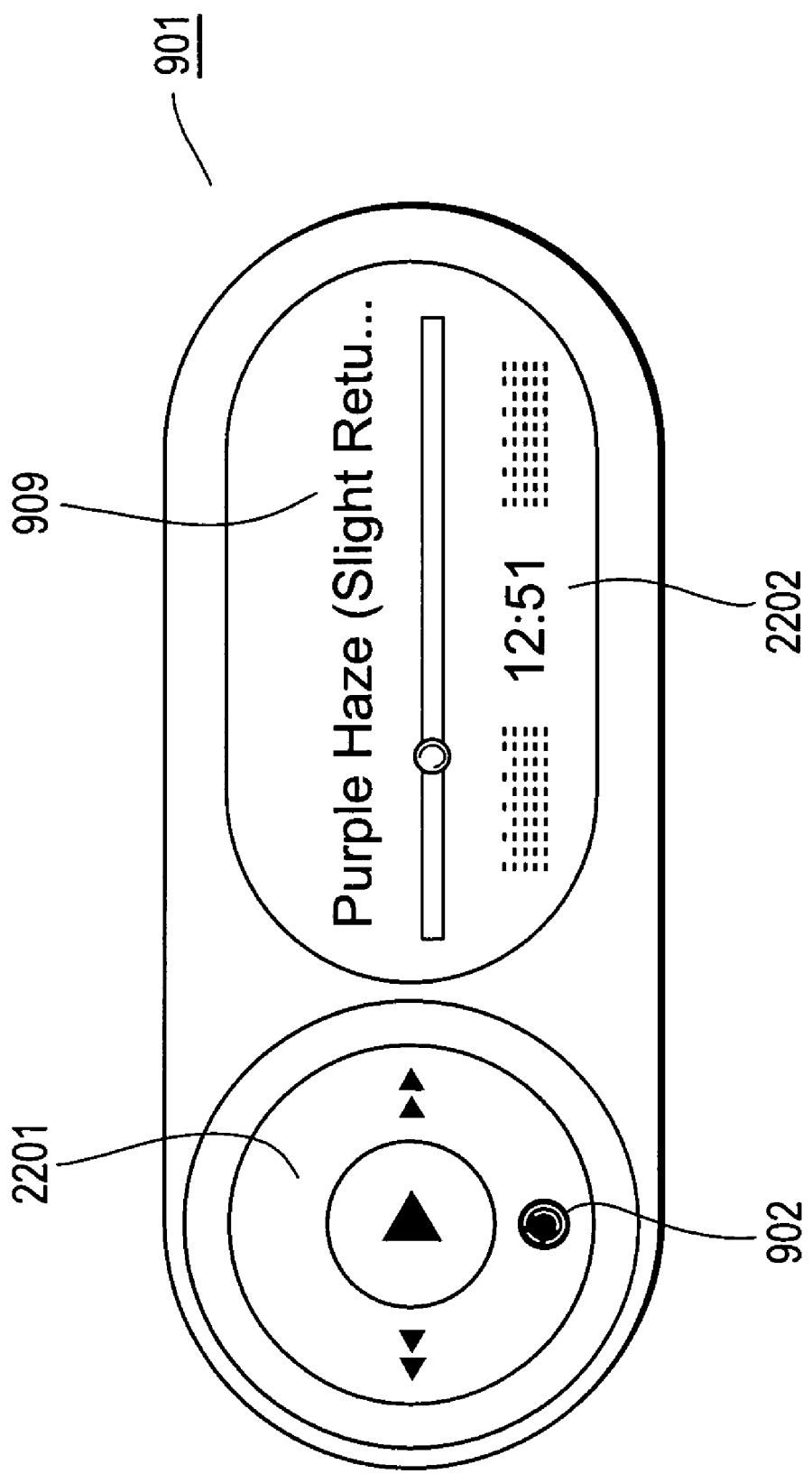
FIG. 14 is an example of a music player widget according to one embodiment.

FIG. 14 depicts an example of a music player widget 901 according to one embodiment, including now-playing indicator 909, counter 2202, controls 2201 for pausing, playing, rewinding and fast-forwarding, and button 902 for accessing a fully functional music player application, as described above in connection with FIGS. 9 and 10. In one embodiment, widget 901 retrieves music data from a remote server 107.

Figure 15:
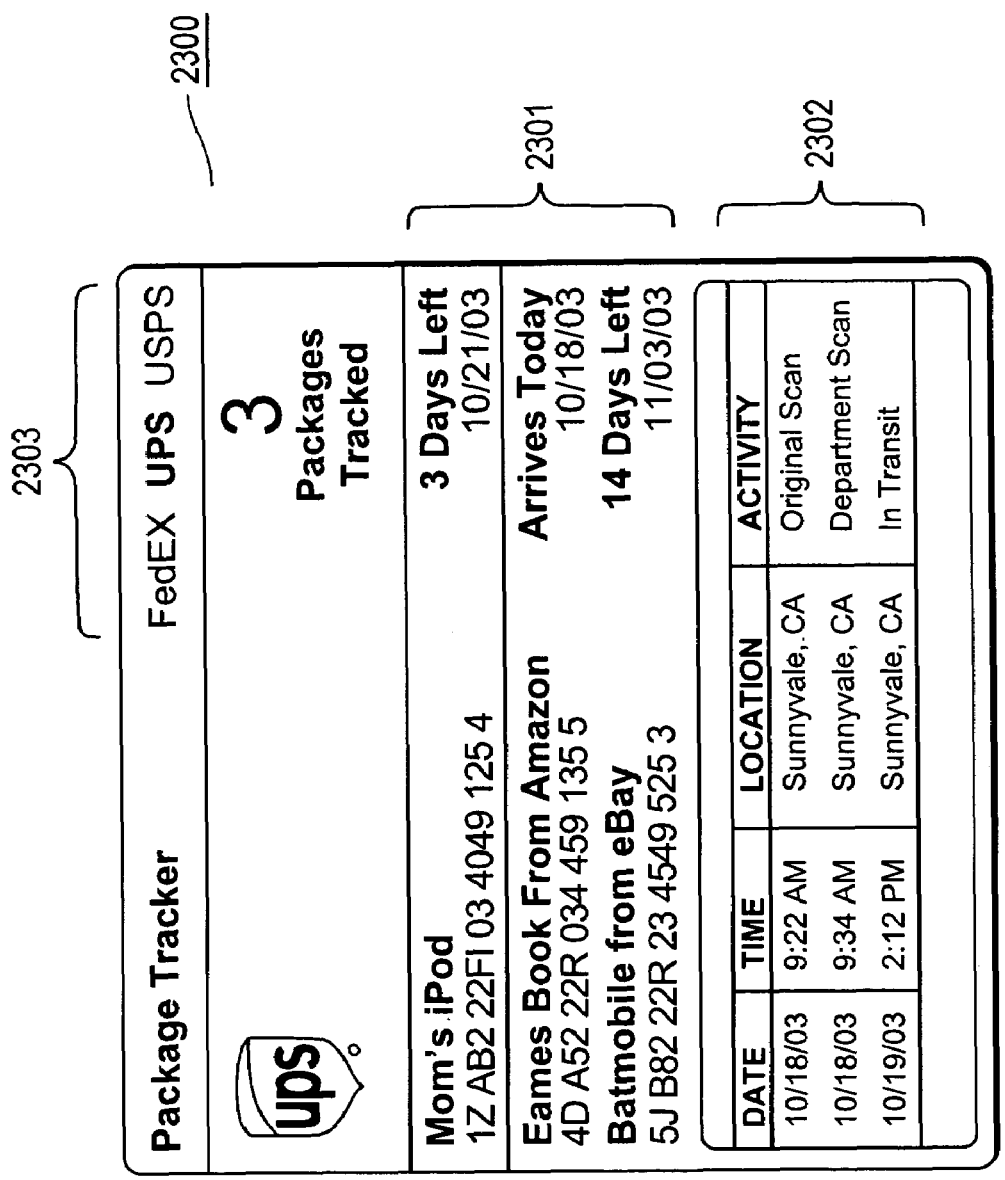
FIG. 15 is an example of a package tracking widget according to one embodiment.

FIG. 15 depicts an example of a package tracking widget 2300 according to one embodiment, including a list of delivery services 2303, one of which is currently selected. Package tracking information 2301 for the selected delivery service is shown, including a name for each item being delivered, current status, tracking number, and the date of the last update for that item. Detailed tracking info 2302 is shown for a selected item in 2301. The user can configure widget 2300 to add items to be tracked, format the results, and the like. In one embodiment, widget 2300 retrieves package tracking data from a remote server 107.

Figure 16:
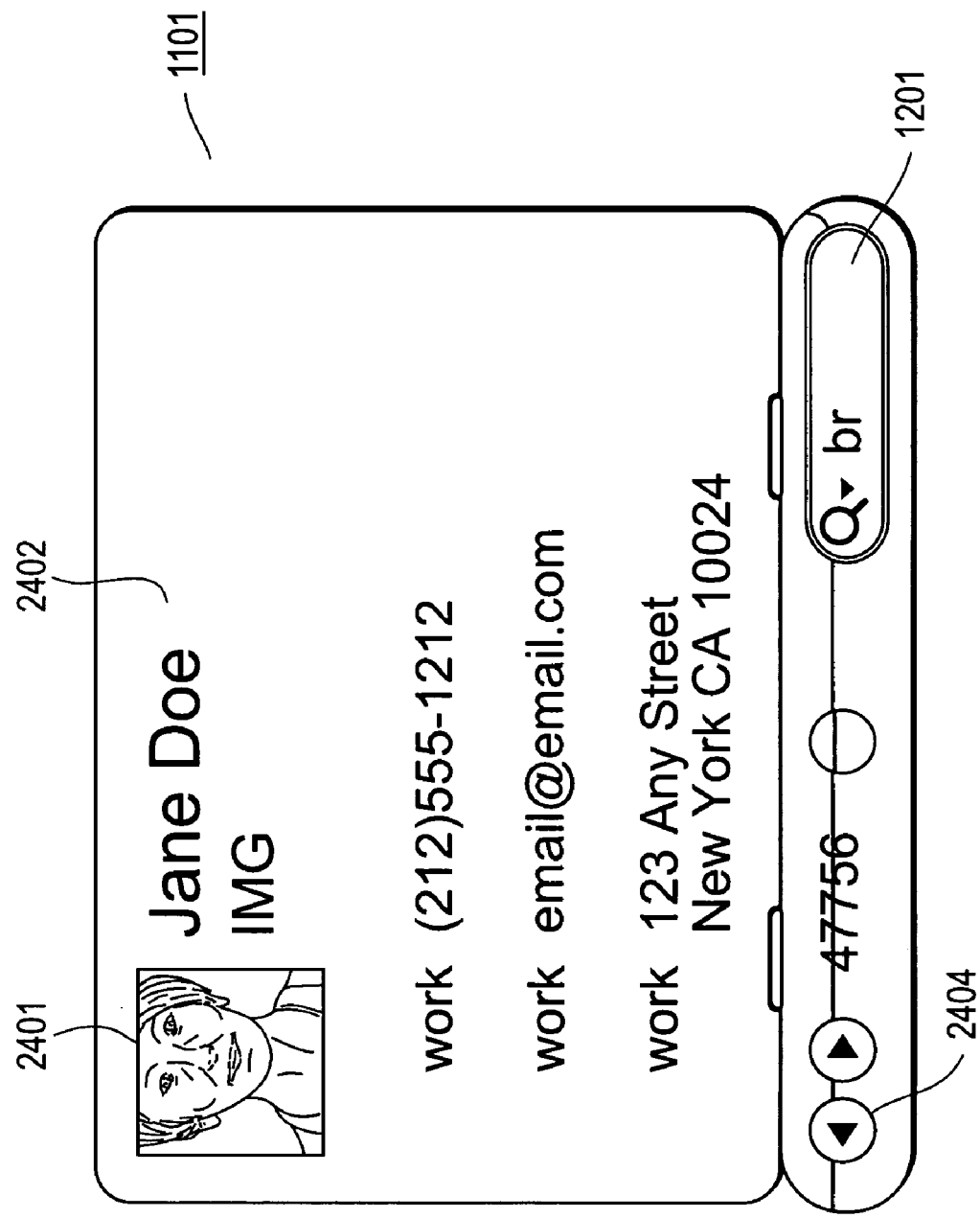
FIG. 16 is an example of an address book widget according to one embodiment.

FIG. 16 depicts an example of an address book widget 1101 according to one embodiment. Widget 1101 includes the following information for an individual: a name 2402, photograph 2401, and contact information 2403. Arrows 2404 allow the user to navigate to other records in the address book. Search field 1201 allows the user to search for names that begin with or include the search terms. In one embodiment, data for the address book is stored locally at computer 102; in another embodiment, widget 1101 retrieves address book data from a remote server 107.

Figure 17:
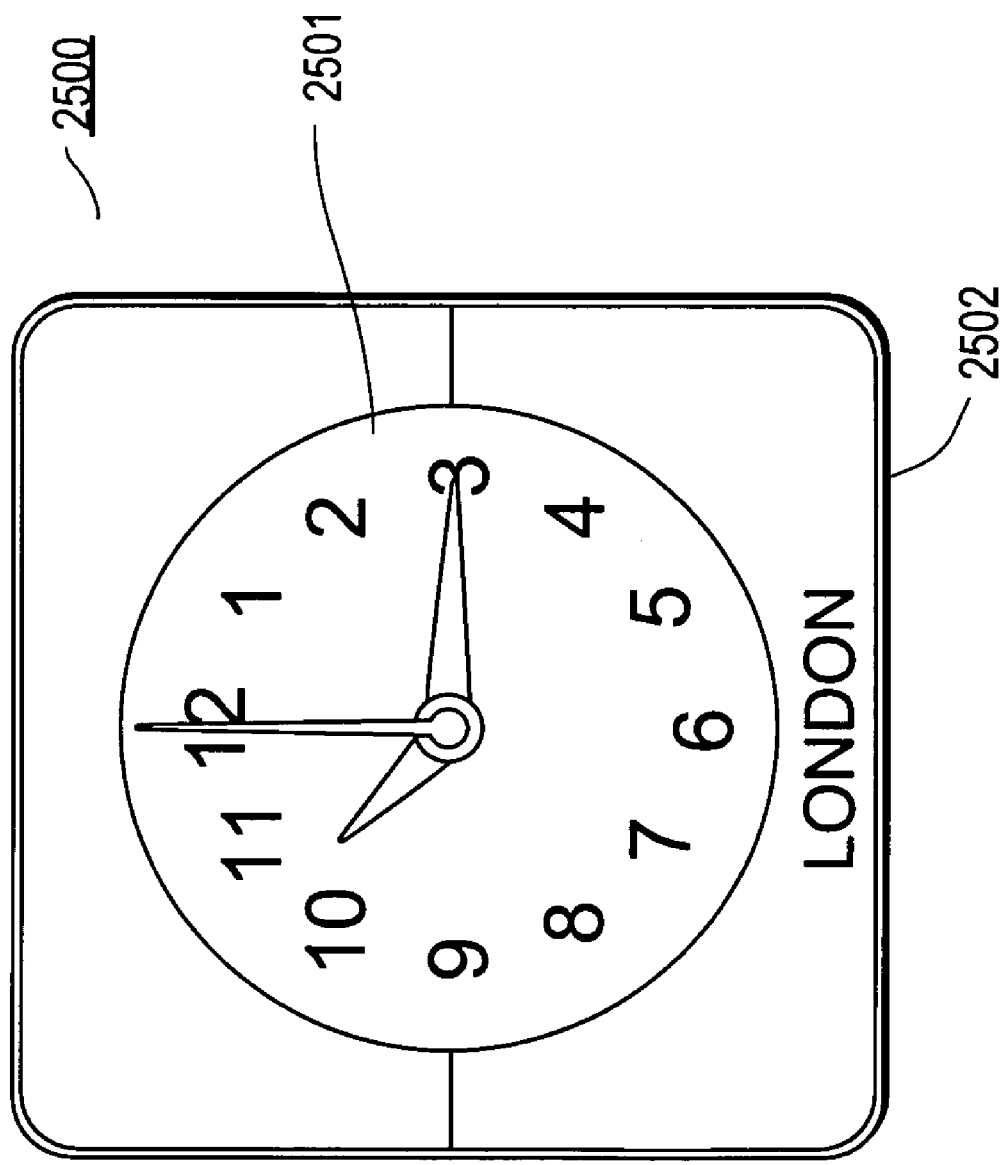
FIG. 17 is an example of a clock widget according to one embodiment.

FIG. 17 depicts an example of a clock widget 2500 according to one embodiment, including a current time display 2501 (which can take any form, digital and/or analog), and a location 2502 corresponding to the current time display 2501. The user can configure widget 2500 to change the time, location, and/or format of the display.

In one embodiment, clock widget 2500 changes in appearance according to the time of day. For example, a light-colored face can be shown during the day, and a dark face can be shown at night. Referring again to FIG. 26, clock widget 2500A has a light-colored face because the local time in San Francisco is 11:28 am, while clock widget 2500B has a dark face because the local time in London is 7:28 pm. In one embodiment, other distinguishing visual characteristics are used to denote day and night. In one embodiment, local times from 6:00 am to 6:00 pm are indicated as being daytime, while local times from 6:00 pm to 6:00 am are indicated as being night time. In another embodiment, actual sunrise and sunset times are used for controlling the appearance of clock widget 2500 (based on the selected location for the clock widget 2500, and further based on sunrise/sunset information retrieved from stored tables or from a resource such as a website). In another embodiment, a continuous gradation is used, so that times near sunset or sunrise are shown in some gradation between the dark and light-colored faces; such times may also be shown in a pinkish hue to further reinforce the sunset or sunrise time period.

Figure 18:
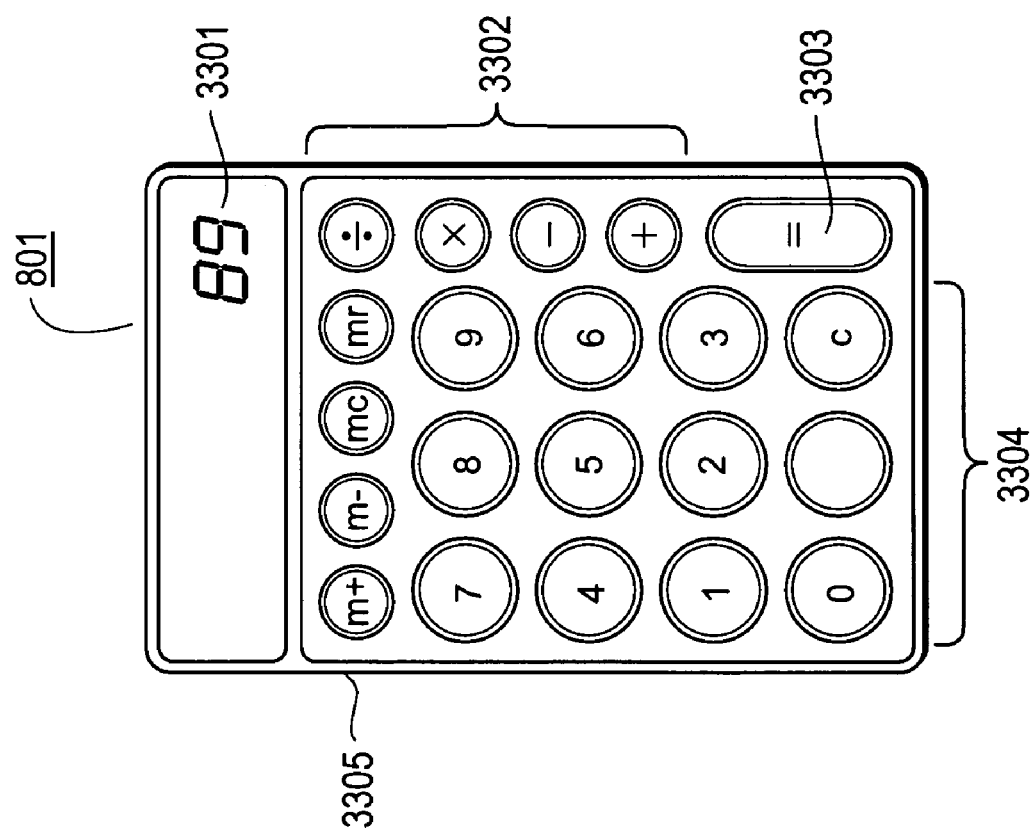
FIG. 18 is an example of a calculator widget according to one embodiment.

FIG. 18 depicts an example of a calculator widget 801 according to one embodiment, including numeric display 3301, keypad 3304, arithmetic operator keys 3302, memory keys 3305, and equals key 3303. Keys 3302, 3303, 3304, and 3305 generally function in a manner similar to that of conventional calculators and calculator accessories, except as noted herein. Display 3301 shows results of calculations in a manner similar to that of conventional calculators and calculator accessories, except as noted herein.

In one embodiment, display 3301 lights up, or otherwise changes in appearance, to indicate that calculator widget 801 is active. For example, display 3301 may light up when the user first clicks somewhere within widget 801, and may stay lit until the user dismisses widget 801 or clicks somewhere outside widget 801. While display 3301 is lit, widget 801 is active and can receive user input via the onscreen cursor or via a keyboard or other input device.

In one embodiment, operator keys 3302 light up when clicked, and stay lit until the next key is pressed, so as to remind the user what operation is being performed. For example, in FIG. 18 the division operator key 3302 is lit, signifying that the user has clicked on that key, and reminds the user that the current operation is a division operation. In one embodiment, operator key 3302 stays lit until another operator key 3302 is pressed, or until the clear button is pressed, or until equals key 3303 is pressed; in another embodiment, operator key 3302 stays lit until any other key is pressed.

Figure 19A:
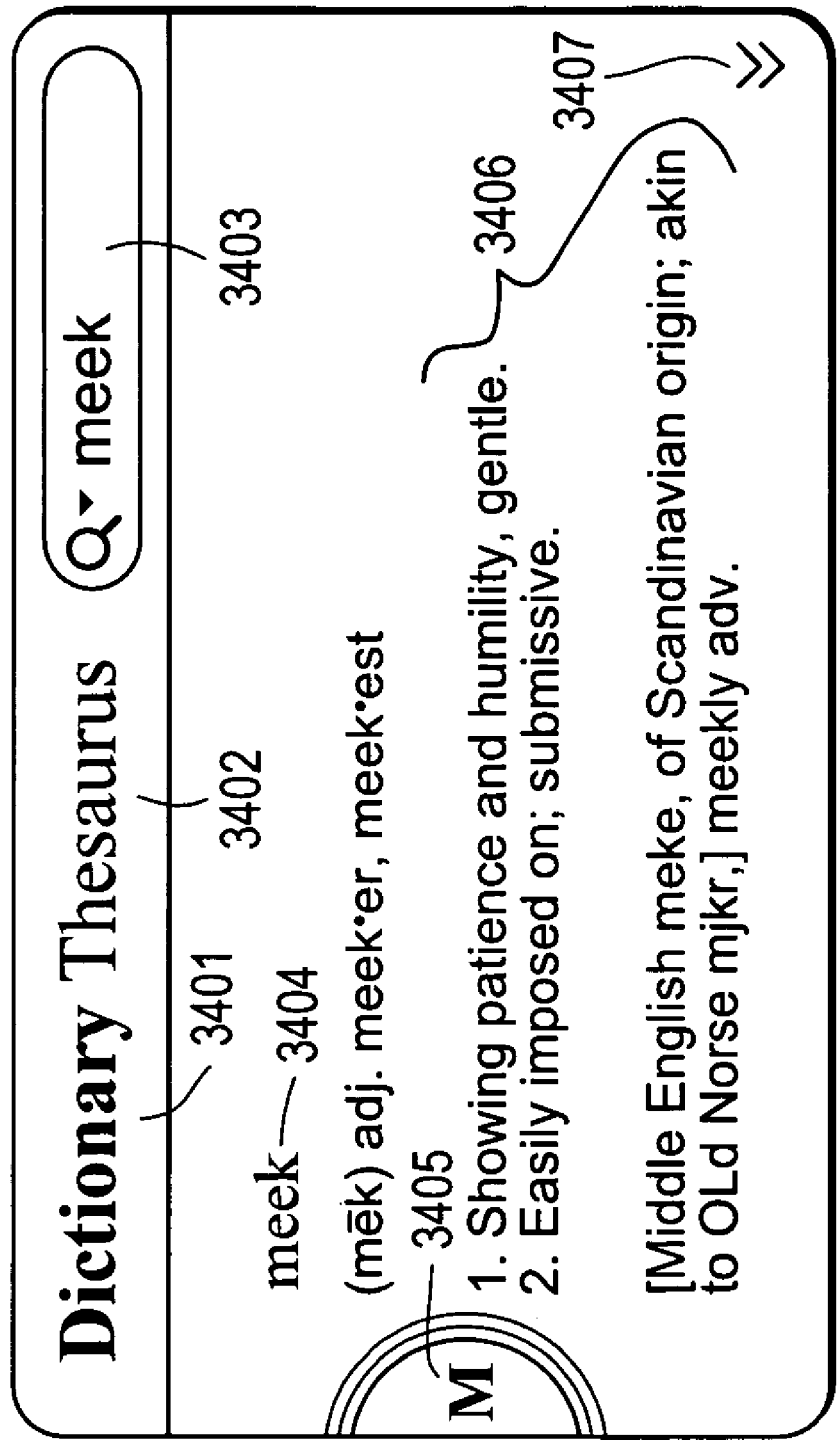
FIGS. 19A and 19B depict an example of a dictionary/thesaurus widget according to one embodiment.
Figure 19B:
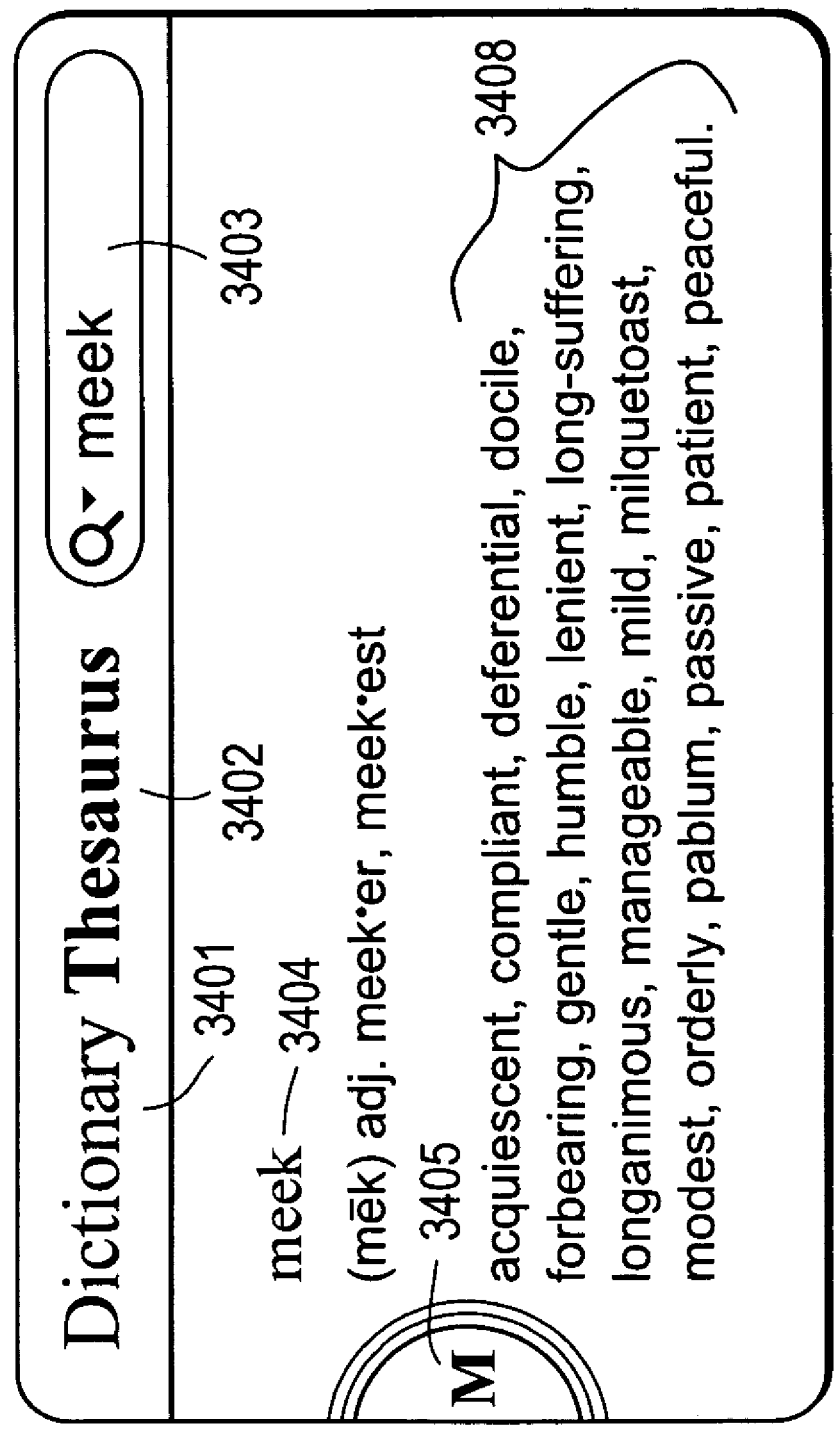

Referring now to FIGS. 19A and 19B, there is shown an example of a dictionary/thesaurus widget 3400 according to one embodiment. A user can type a word in text input field 3403, and can select dictionary or thesaurus functionality by clicking on text labels 3401 or 3402, respectively, to see either definition 3406 or synonyms 3408. If either definition 3406 or synonyms 3408 do not fit within the bounds of widget 3400, widget 3400 can auto-resize accordingly, or can display arrows 3407 for accessing the rest of the information. Thumb index 3405 can also be presented, allowing the user to quickly access other words that appear on the same dictionary page as the entered word. In one embodiment, a reverse lookup dictionary (not shown) can also be provided (the user enters a definition or part thereof, and widget 303 responds with one or more words that match the entry). In one embodiment, data for the dictionary/thesaurus is stored locally at computer 102; in another embodiment, the dictionary/thesaurus widget retrieves its data from a remote server 107.

Figure 21:
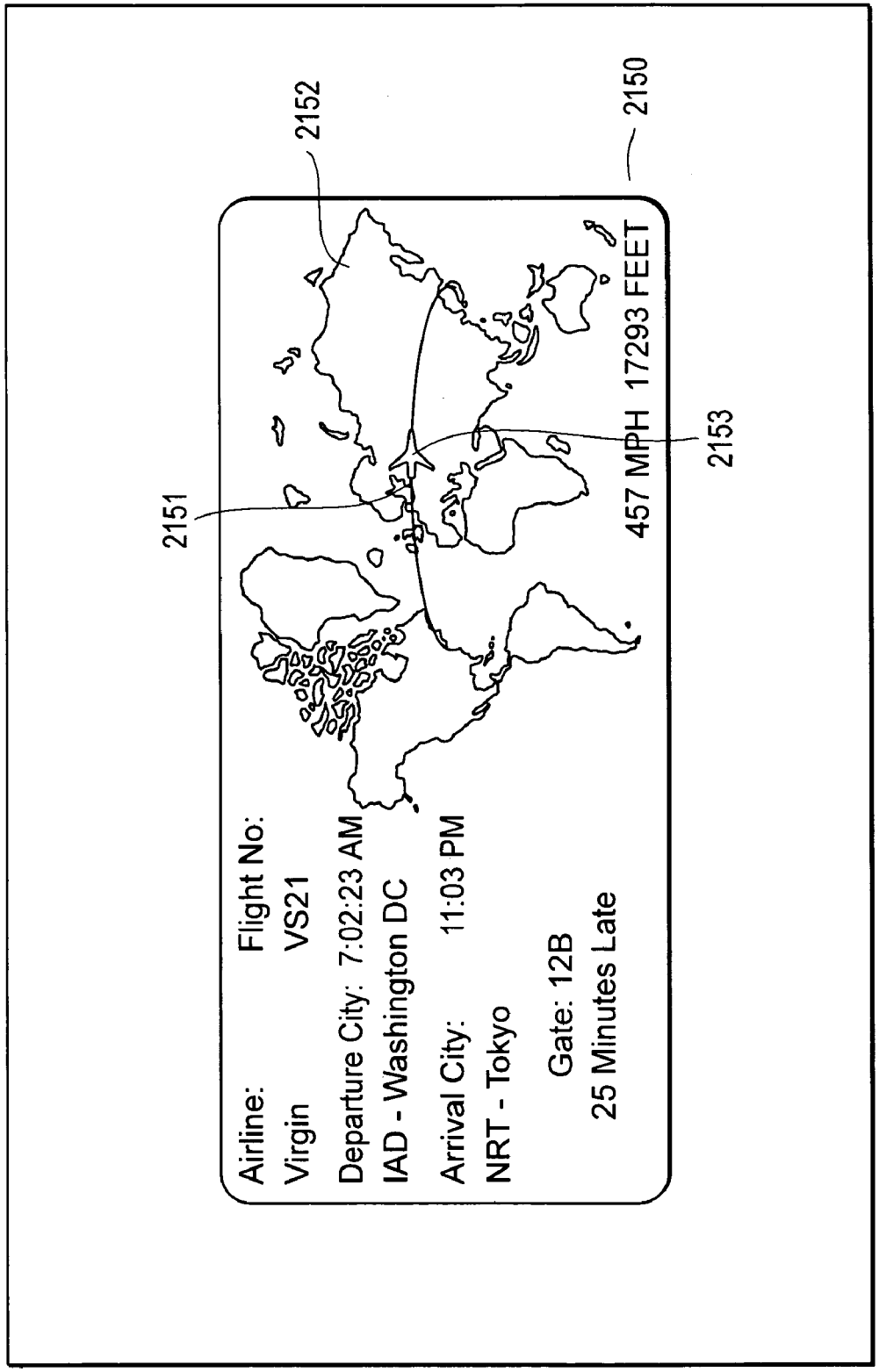
FIG. 21 depicts a flight tracker widget.

FIG. 21 depicts a flight tracker widget 2150. The user can enter whatever information is known, including any combination of flight number, arrival city, departure city, airline, date, and time. The widget communicates with online flight data sources to obtain gate information, flight status, and the like. In one embodiment, the widget displays any or all of airline, flight number, departure city, departure time (scheduled), departure time (actual), departure time (expected), departure airport code, arrival city, arrival time (scheduled), arrival time (actual), arrival time (expected), arrival airport code, departure gate, arrival gate, on-time/late/early status, aircraft type, speed, and altitude. In one embodiment, it displays a map 2152 including an arc 2151 between origin and destination that approximates the travel trajectory. An indicator 2153 is shown on the arc that denotes the aircraft's approximate current location. In one embodiment, this display is based on actual position data for the aircraft; in another embodiment, it is an interpolation based on the origin, destination, and remaining flying time.

Figure 22:
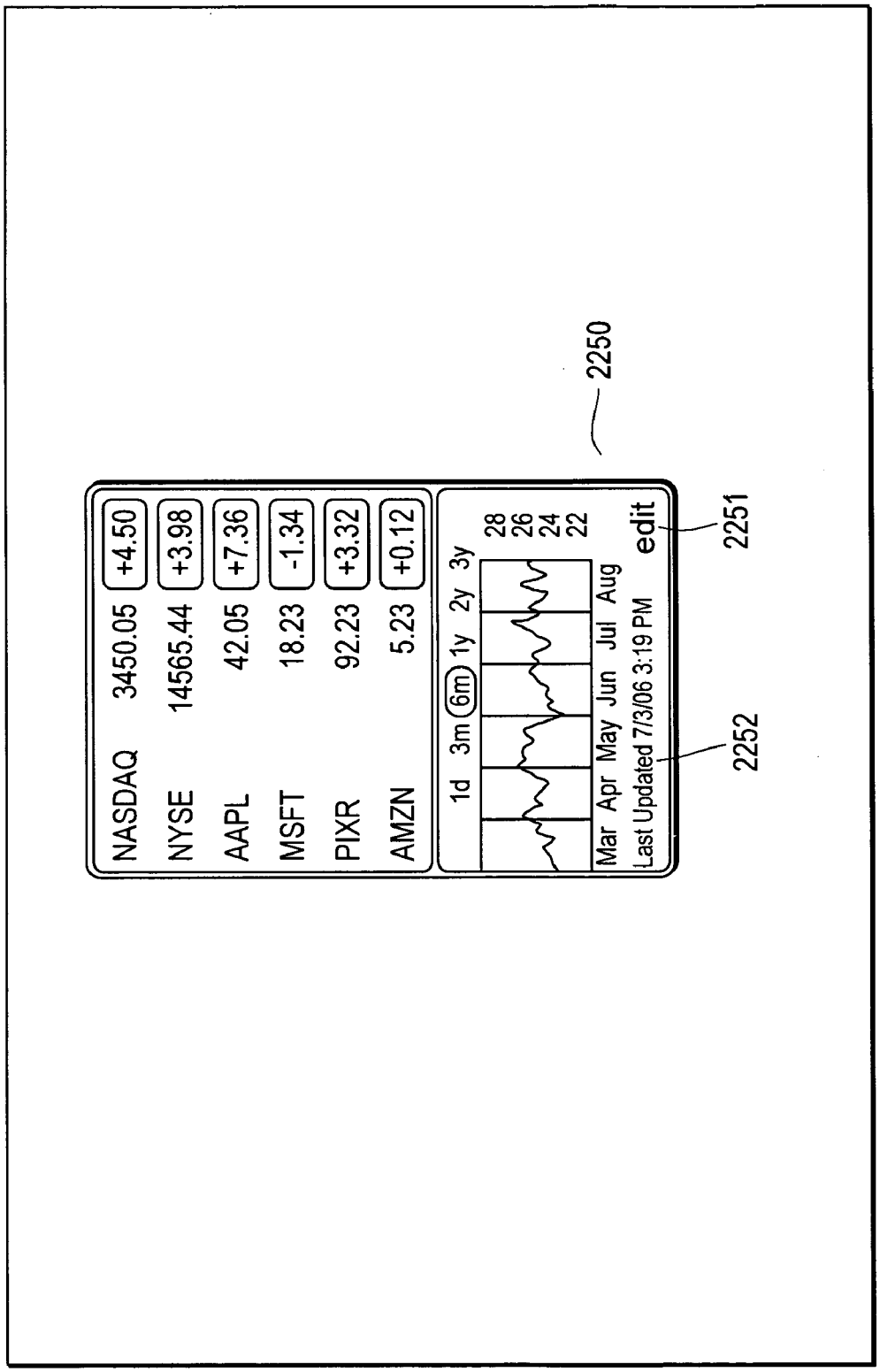
FIG. 22 depicts a stock quote widget.

FIG. 22 depicts a stock quote widget 2250. The user can enter a portfolio of stocks (or other securities), or the widget can extract the user's stock holdings from an online data source, locally stored file, or other source. Alternatively, the user can enter an individual ticker symbol. The widget displays the ticker symbol(s), current stock price(s), change since previous day, and the like. In one embodiment, the widget displays a graph showing stock performance for a stock or portfolio. In one embodiment, the graph can be shown in any of a number of different formats and time ranges. In one embodiment, an Edit button 2251 is provided to allow access to input/output elements for changing characteristics of the displayed portfolio or stock quotes, or other preferences. In one embodiment, a last updated indicator 2252 is included. In one embodiment, the user can click on a button (not shown) to initiate a Buy or Sell operation for the displayed stock, or to find out more information about the stock.

Figure 23A:
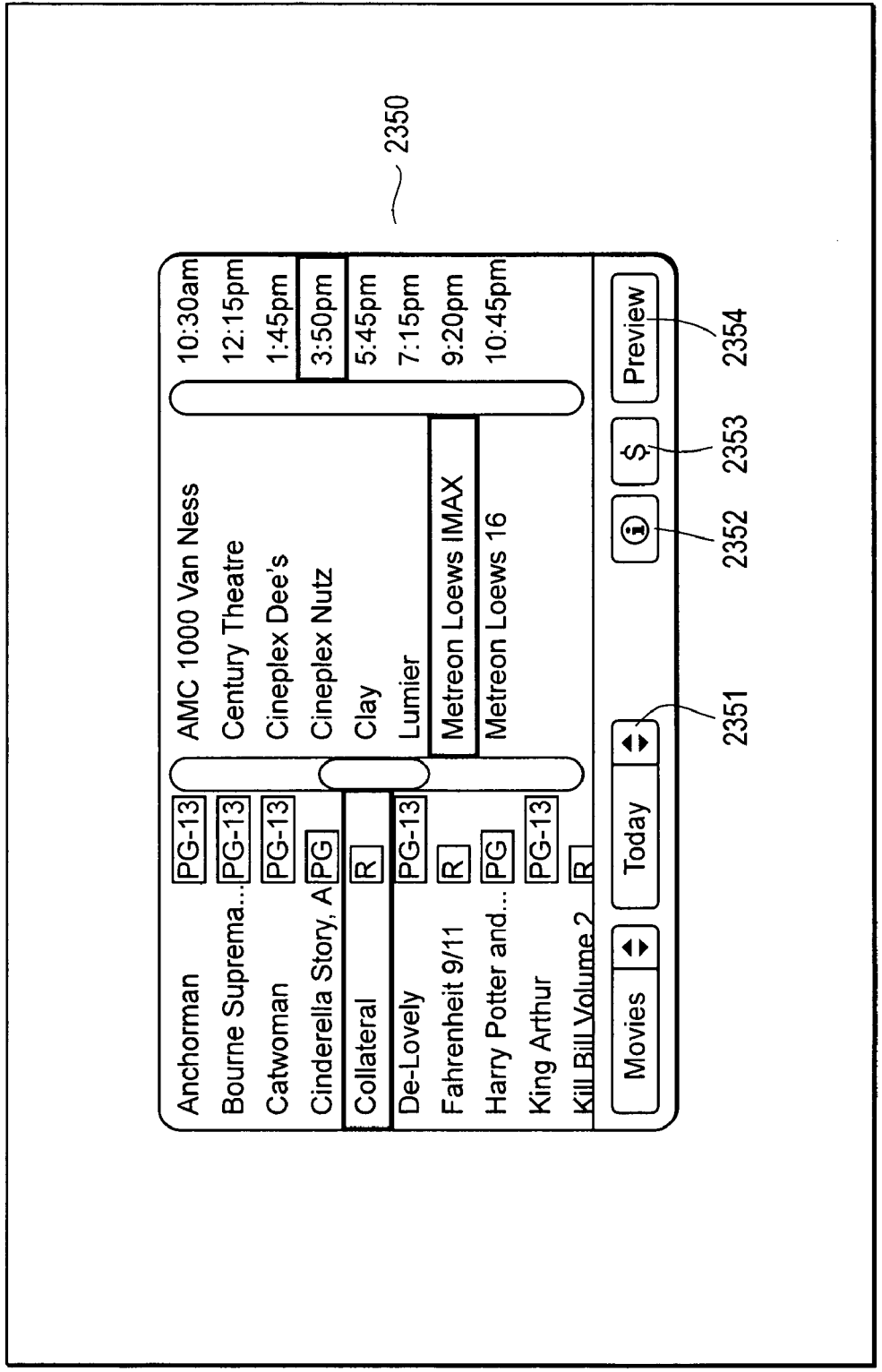
FIGS. 23A and 23B depict a movie listings widget.
Figure 23B:
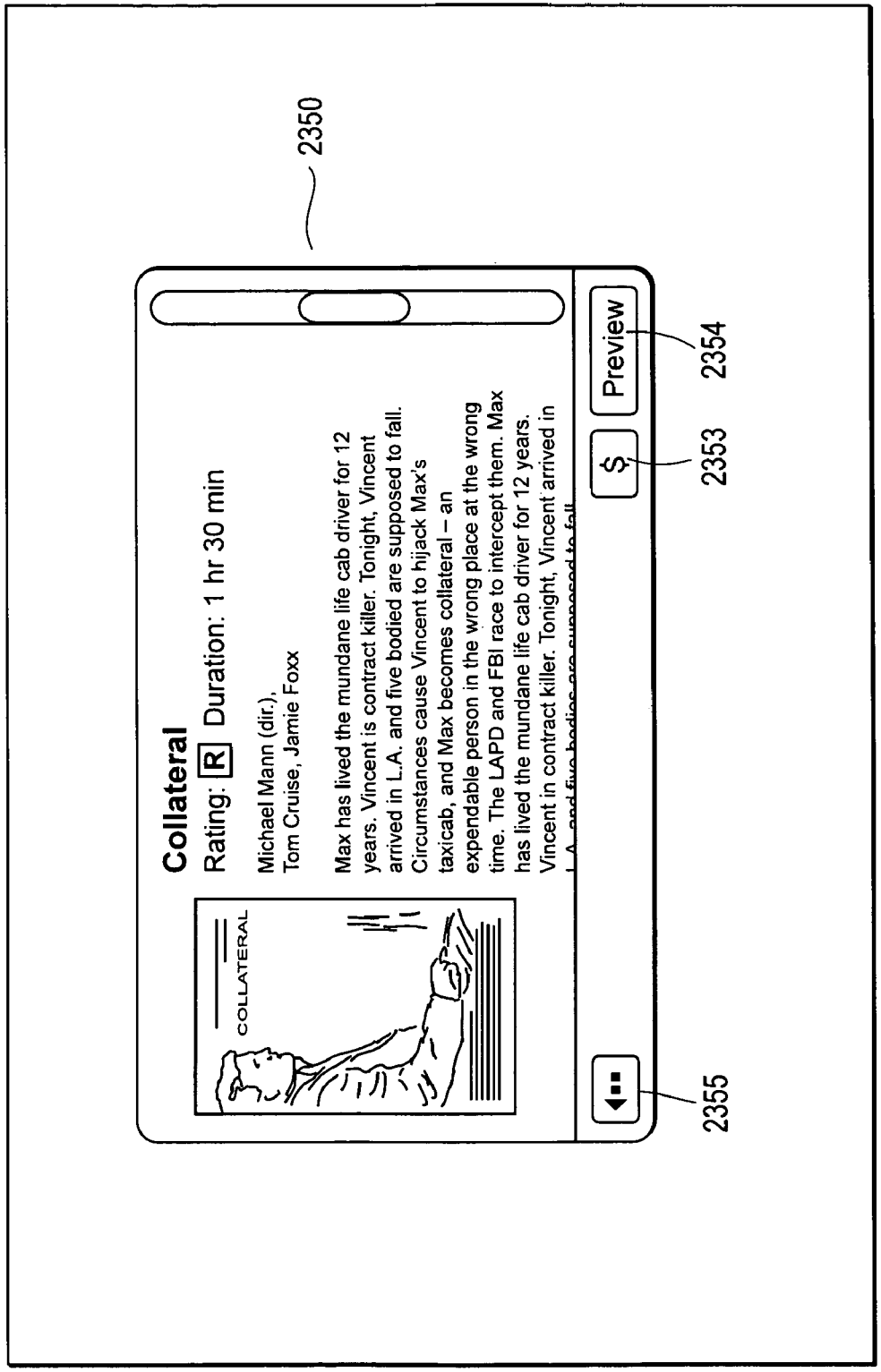

FIGS. 23A and 23B depict a movie listings widget 2350. As shown in FIG. 23A, a user can select from a list of movie titles or a list of theaters, and can see show times, ratings, and the like. A button is provided for selecting between titles and theaters. A button 2351 is provided for selecting the date the user is interested in (today, tomorrow, or another date). An information button 2352 is provided for obtaining more information about the selected movie, including for example a synopsis, photos, reviews, website links, or the like. A ticket purchase button 2353 is provided for purchasing tickets to the selected show time. A preview button 2354 is provided for accessing a video preview of the movie.

In one embodiment, the theaters shown are based on a target location (for example a ZIP code entered by the user, or known to the widget based on previously entered or derived user data). Theaters within a predefined or user-specifiable radius of the target location are shown.

The user can click on the information button 2352 to see a synopsis, movie poster representation, and other information, as depicted in FIG. 23B. The user can click on back button 2355 to return to the previous display. The user can click on the ticket purchase button 2353 or the preview button 2354 to purchase tickets or view the video preview.

Figure 24A:
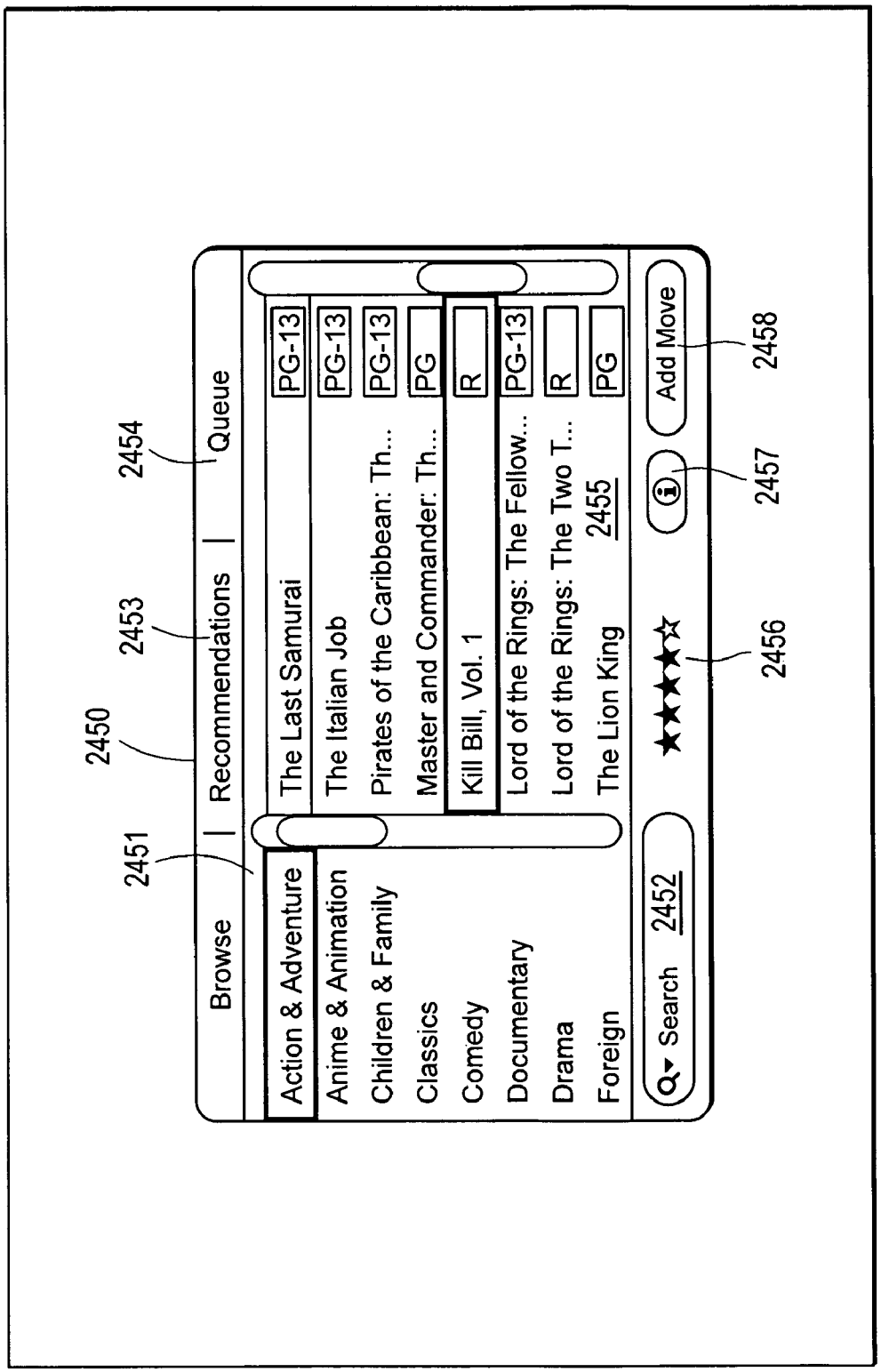
FIGS. 24A through 24D depict a widget for managing a DVD rental queue.

FIGS. 24A through 24D depict a widget 2450 for managing a DVD rental queue. As shown in FIG. 24A, the user can browse various categories of movies by clicking on the categories 2451 in the left side of widget 2450. The user can type in the Search field 2452 to search for a movie title. The user can click on Recommendations 2453 to see personalized recommendations based on previous rentals or on other information provided by the users. The user can click on Queue 2454 to see the current rental queue.

When a movie is selected in the list 2455, a quality rating 2456 appears (one to five stars). The user can click on information button 2457 to see more information about the movie, or can click on Add Movie 2458 to add the selected movie to the user's queue.

Figure 24B:
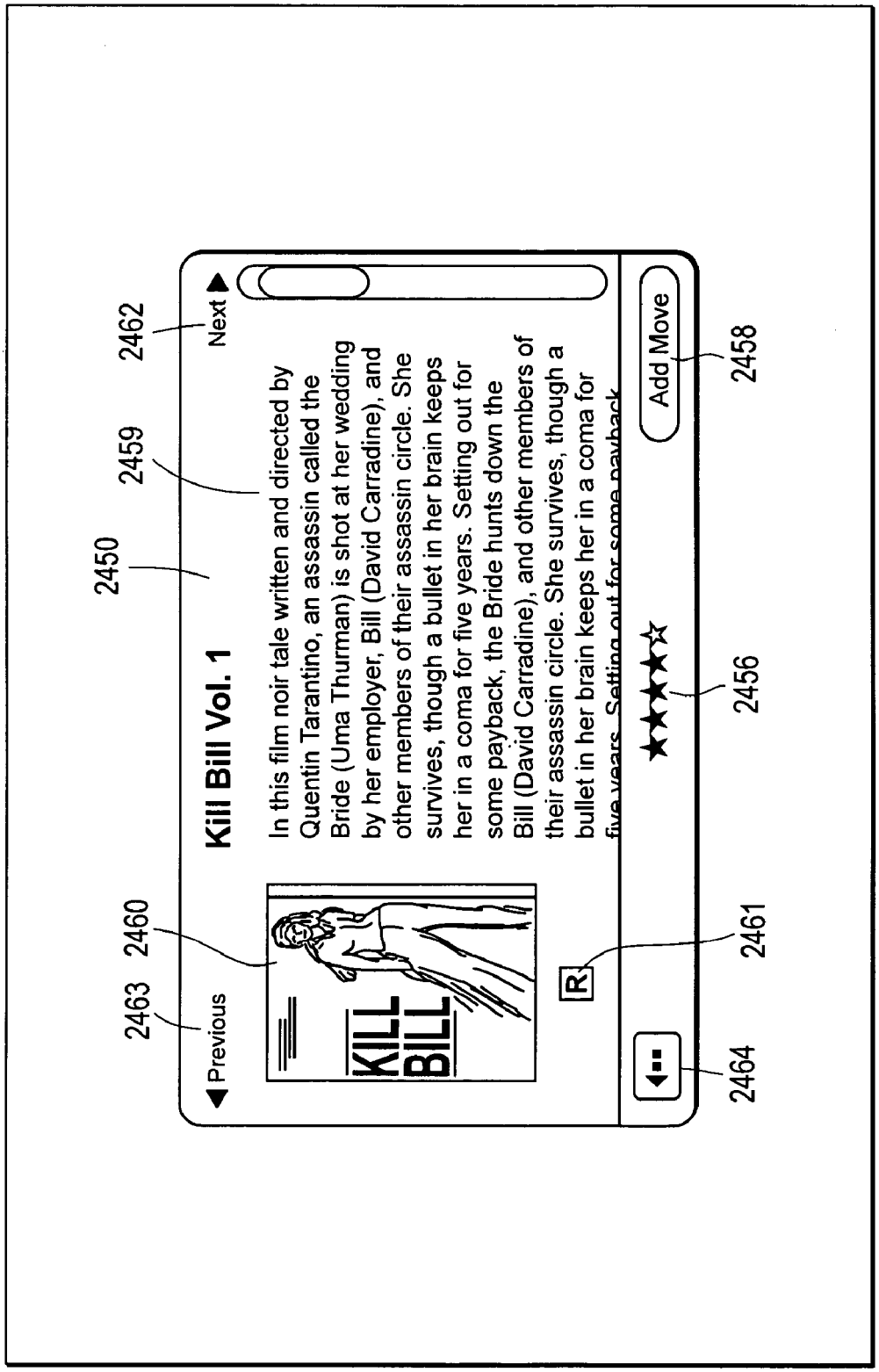

FIG. 24B shows widget 2450 after the user has clicked on information button 2457. A description 2459 of the selected movie is shown, along with a movie poster representation 2460, MPAA rating 2461, quality rating 2456, and the like. Previous and next buttons 2463, 2462 allow the user to jump directly to other movies in the queue or list. The user can click on back button 2464 to return to the previous screen, or can click on Add Movie 2458 to add the movie to the user's queue.

Figure 24C:
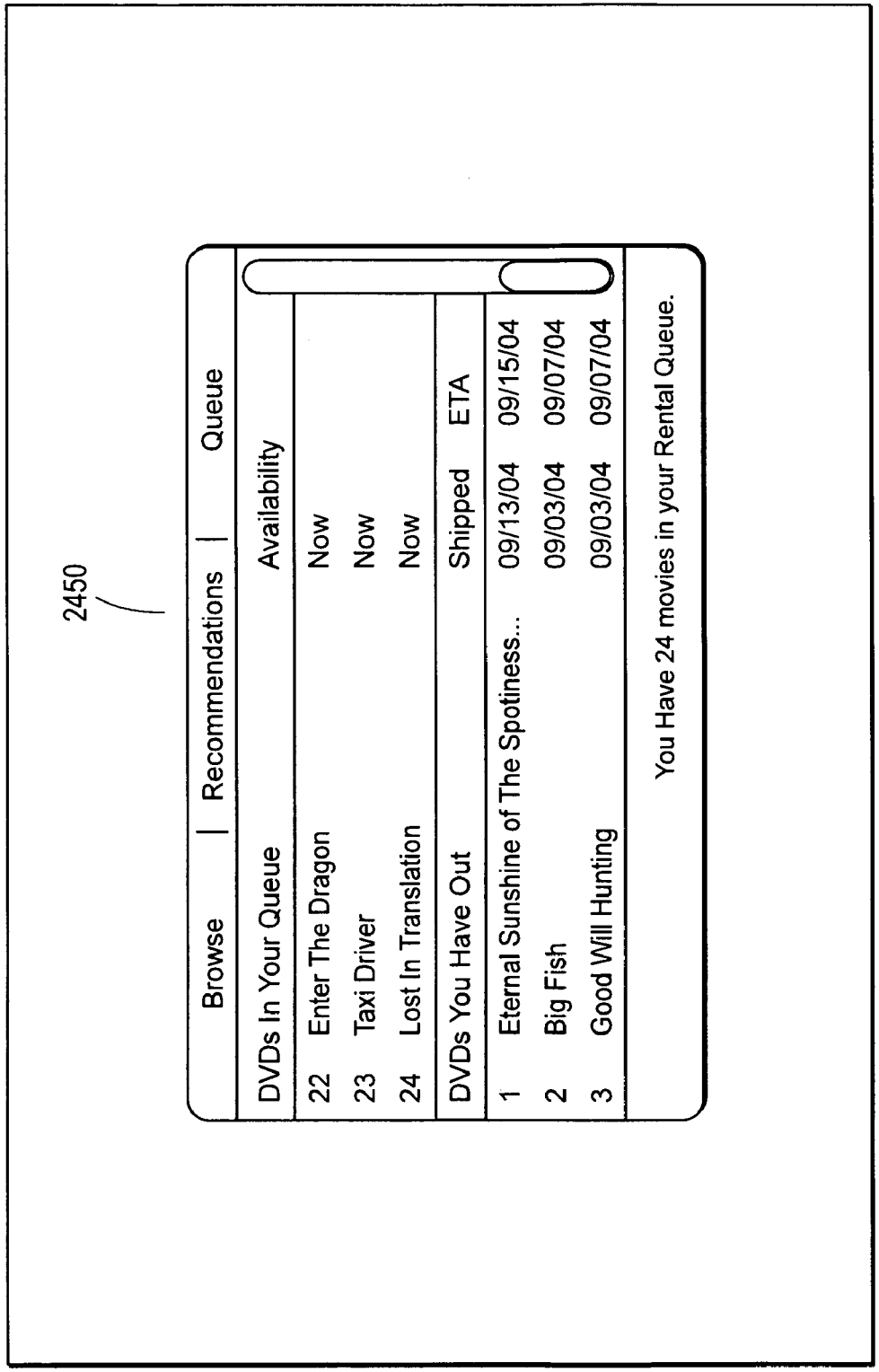
Figure 24D:
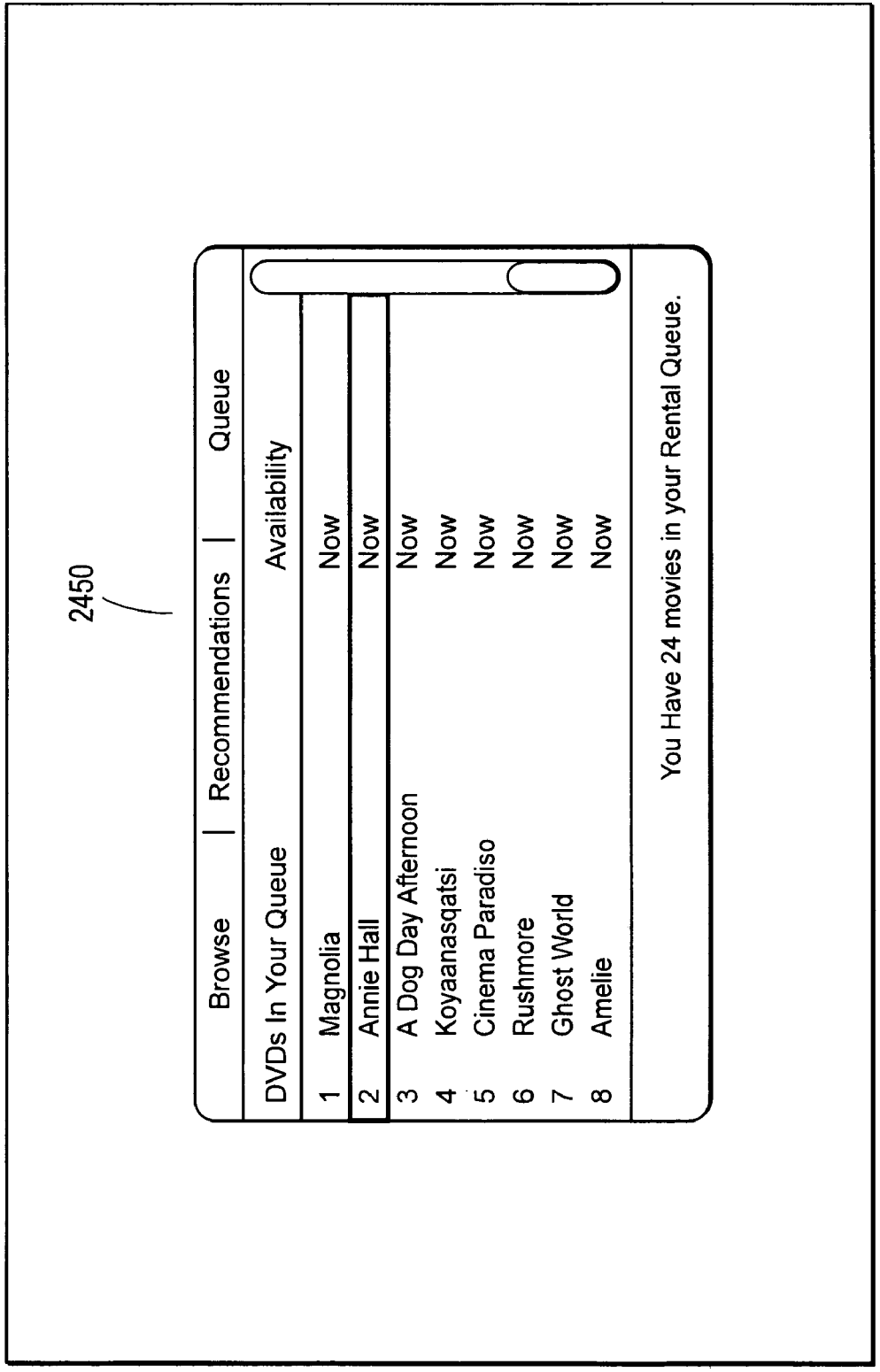

FIGS. 24C and 24D show widget 2450 after the user has clicked on Queue button 2454. The widget shows DVDs currently in the queue, along with DVDs currently out (i.e. in the user's possession or on their way to the user). Availability, ship dates, and ETA are shown. A total number of movies in the rental queue is shown.

Figure 25:
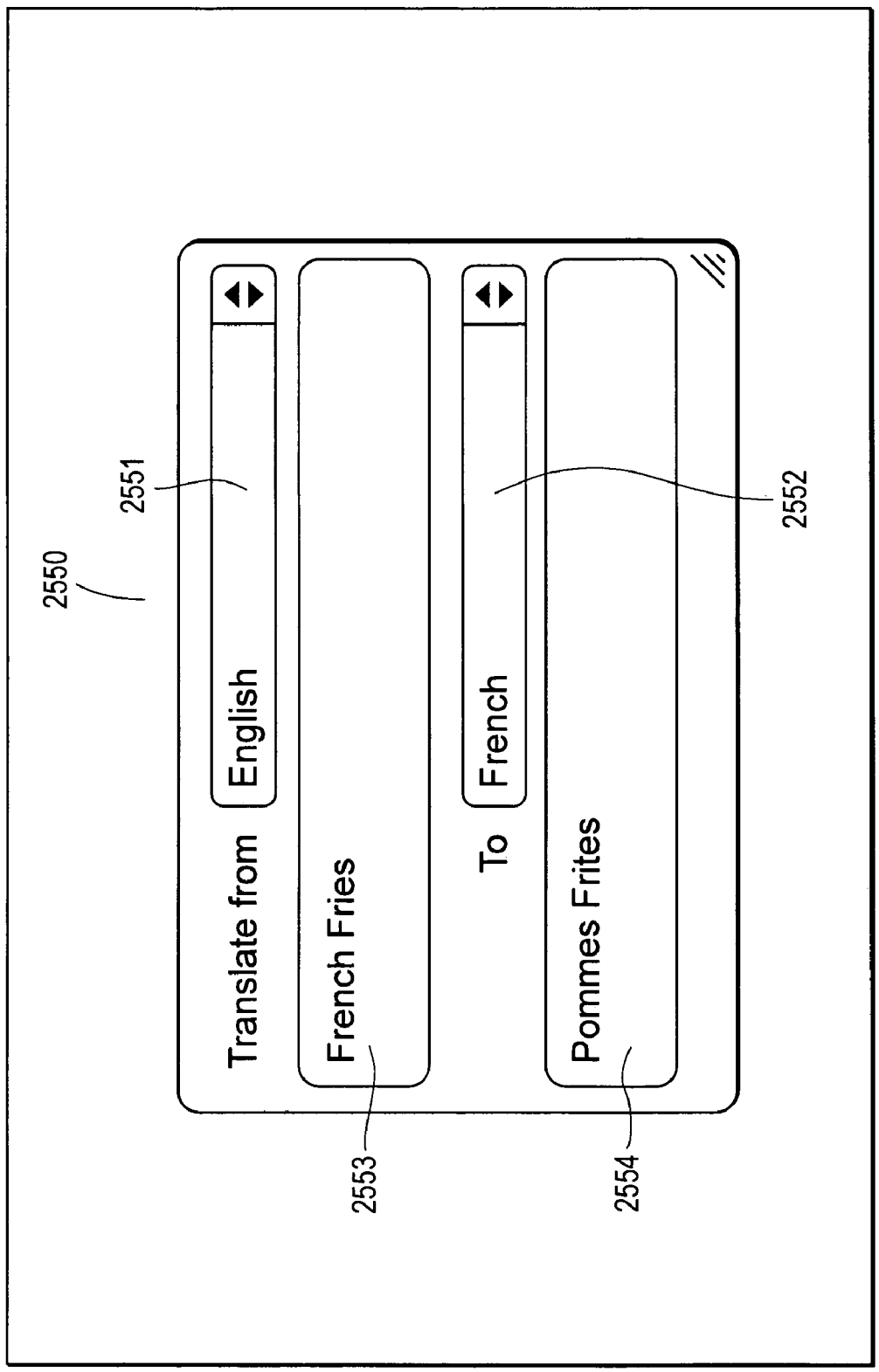
FIG. 25 depicts a translation widget.

FIG. 25 depicts a translation widget 2550. The user can select a "from" language and a "to" language (via pop-up menus 2551, 2552), and can enter text in the upper box 2553. The translated text appears in the lower box 2554. In one embodiment, text is translated as it is typed, so the user need not hit Enter or some other button to activate translation. In one embodiment, widget 2550 waits for a typing pause of some particular length (for example one second) before performing translation. In one embodiment, widget 2550 transmits the entered text to an online translation resource; in another embodiment, translation is performed locally using software installed at the user's computer. In one embodiment, reverse translation is also performed, so that the user can see the end result of translating the entered text to the other language and back; in this way the user can gauge the overall quality of the translation.

Figure 26A:
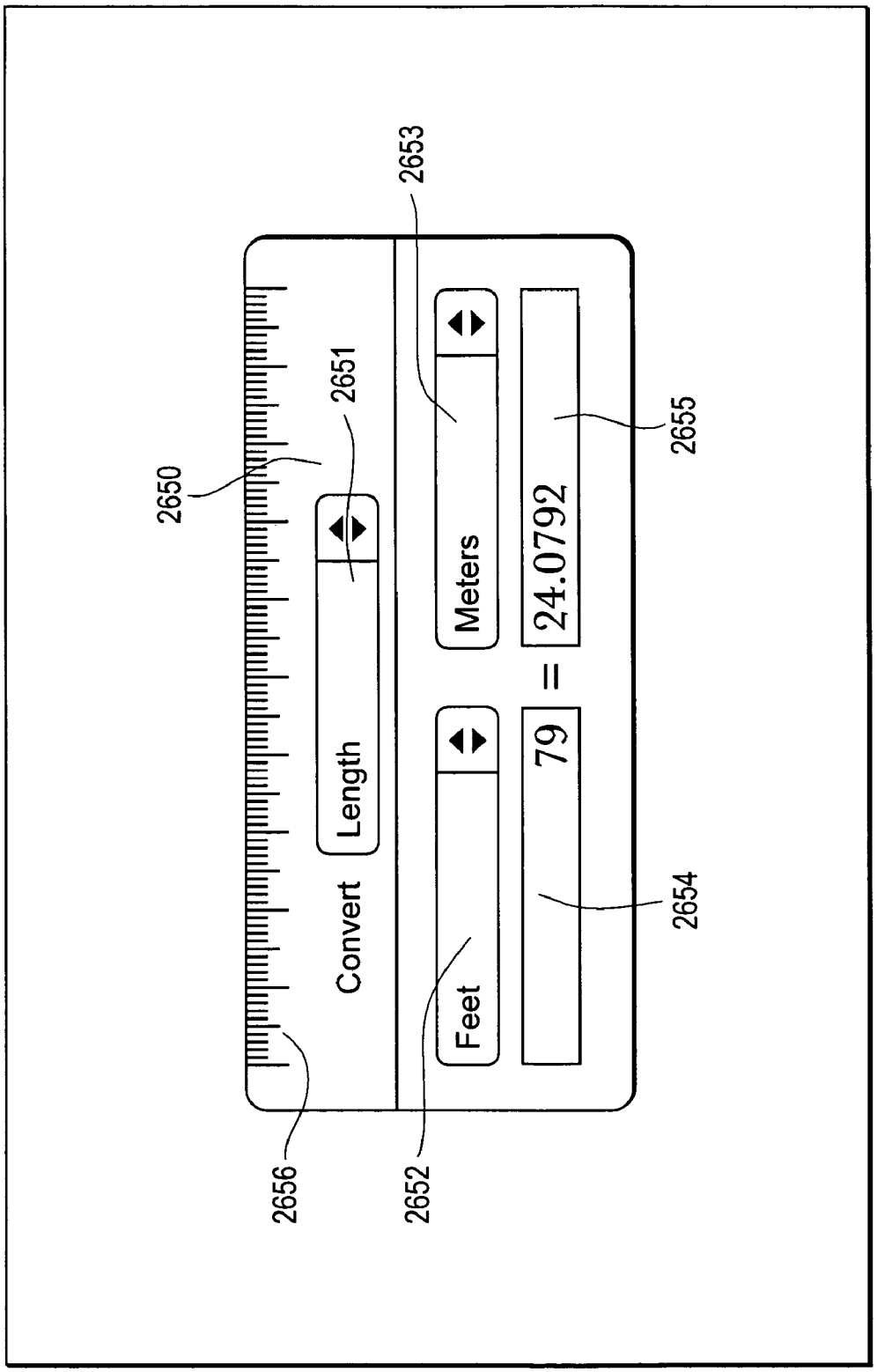
FIGS. 26A through 26C depict a metric conversion widget.
Figure 26B:
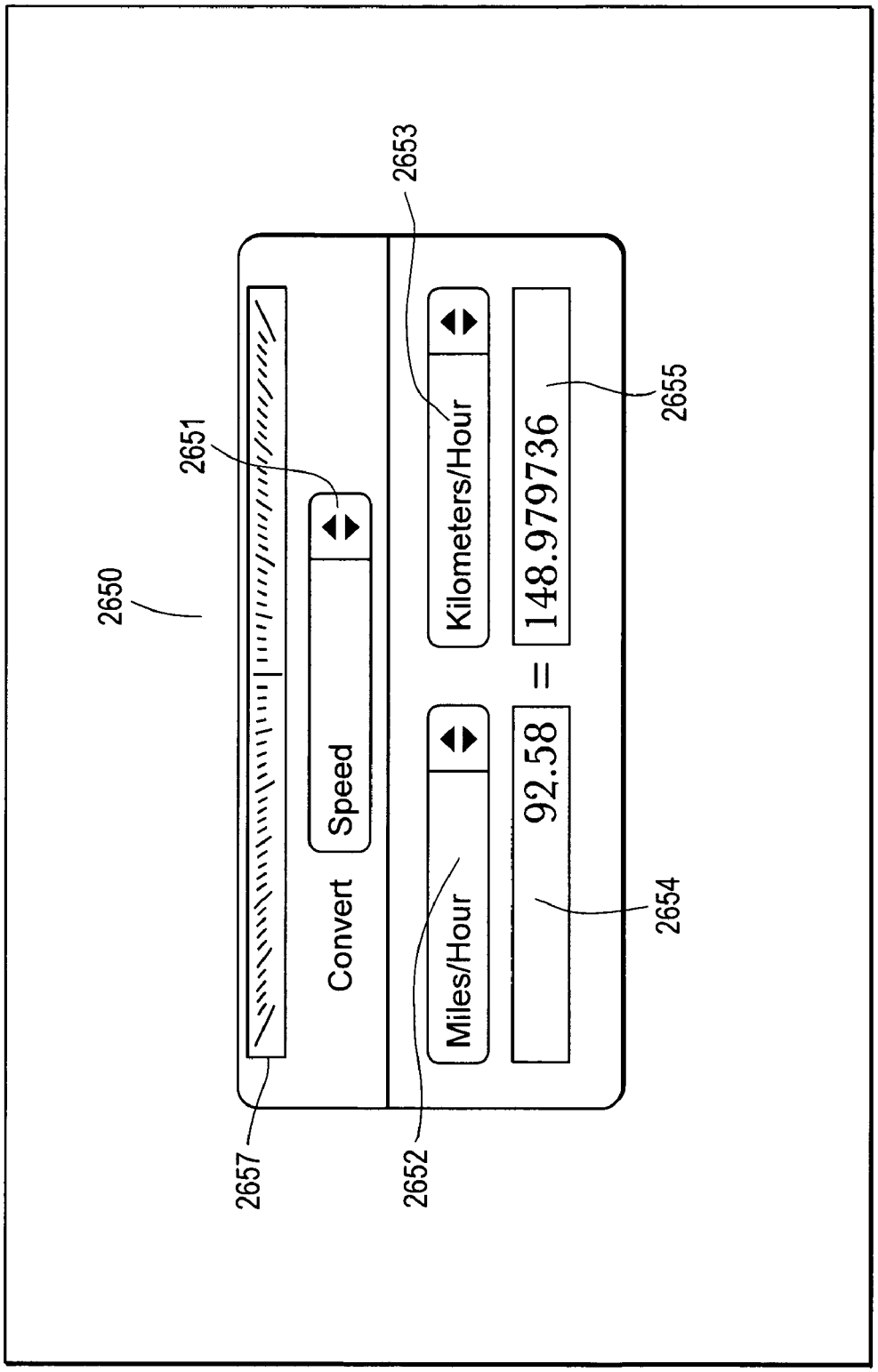
Figure 26C:
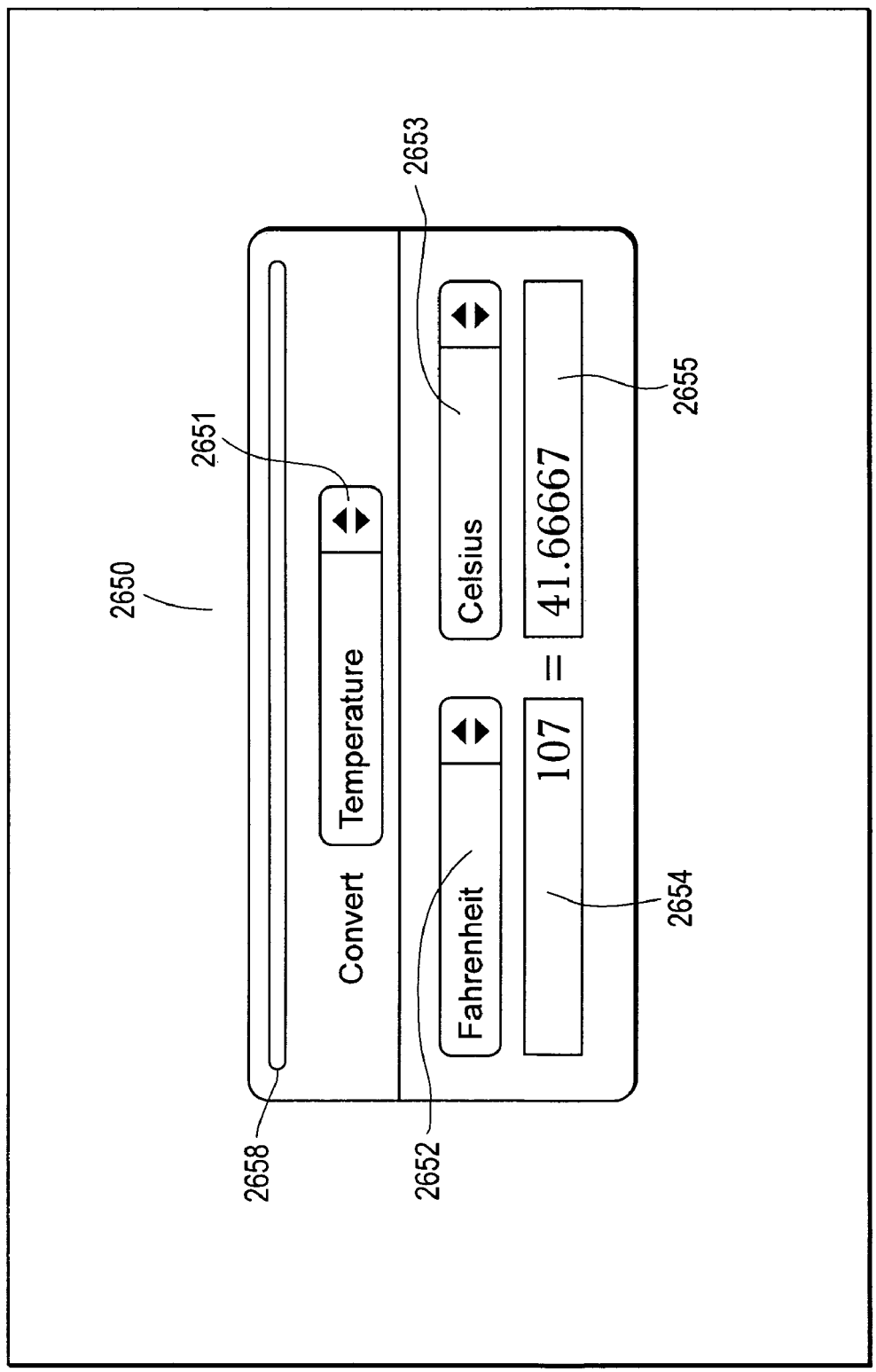

FIGS. 26A through 26C depict a metric conversion widget 2650. The user can select the type of conversion from Convert pop-up menu 2651 (e.g. length, volume, area, speed, temperature, weight, or the like), and can select the from/to units for the conversion via two other pop-up menus 2652, 2653. The user can enter numbers in either of the two fields 2654, 2655, and the converted value appears in the other field. In one embodiment, values are converted as numbers are entered, so the user need not hit Enter or some other button to initiate the conversion. In one embodiment, widget 2650 waits for a typing pause of some particular length (for example one second) before performing conversion.

In one embodiment, a distinctive graphic appears within the widget (for example along the top edge of the widget) to denote the type of conversion being performed. For example, for length conversion a ruler graphic 2656 is shown (FIG. 26A), for speed conversion a speedometer graphic 2657 is shown (FIG. 26B), and for temperature conversion a thermometer graphic 2658 is shown (FIG. 26C). One skilled in the art will recognize that these graphics can take any form, and that the Figures are merely exemplary. In one embodiment, these graphics are animated.

FIGS. 27A through 27F depict a weather widget 2750. In one embodiment, weather widget 2750 shows information for a given location; the location can be provided by the user or extracted from other information such as the user's ZIP code or address. In one embodiment, weather widget 2750 shows current temperature 2751, high and low for the day 2752, and a forecast 2753. Graphic elements 2754 depict the current conditions and the forecast conditions. For example, a sun, clouds, rain, or any combination thereof can be shown to indicate conditions. In one embodiment, these graphic elements can be combined as needed to accurately represent the weather conditions. In one embodiment, some or all of the graphic elements are animated; for example clouds can be shown to move slightly in the wind, in order to indicate how much wind there is.

Figure 27A:
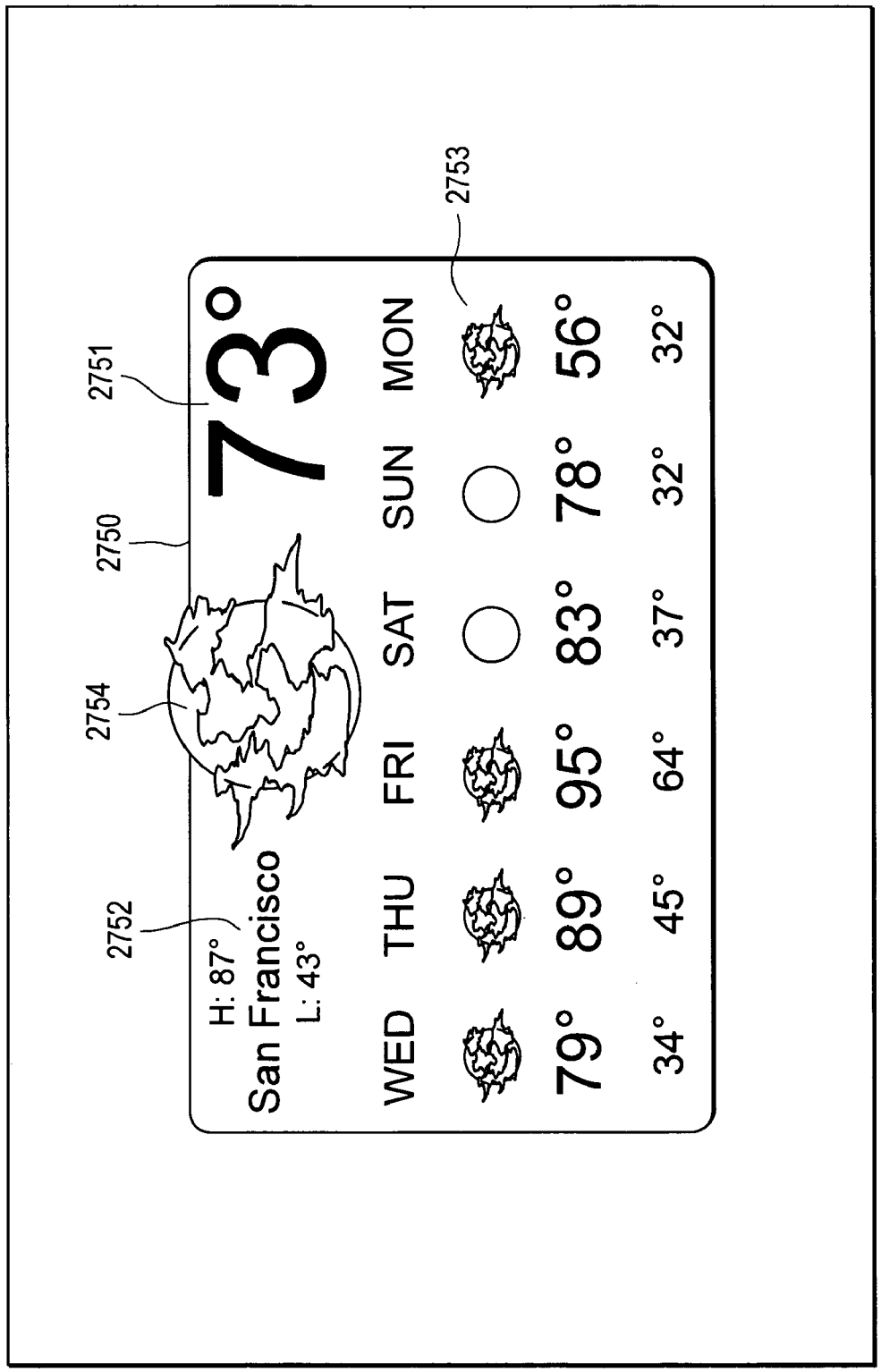
FIGS. 27A through 27F depict a weather widget.
Figure 27B:
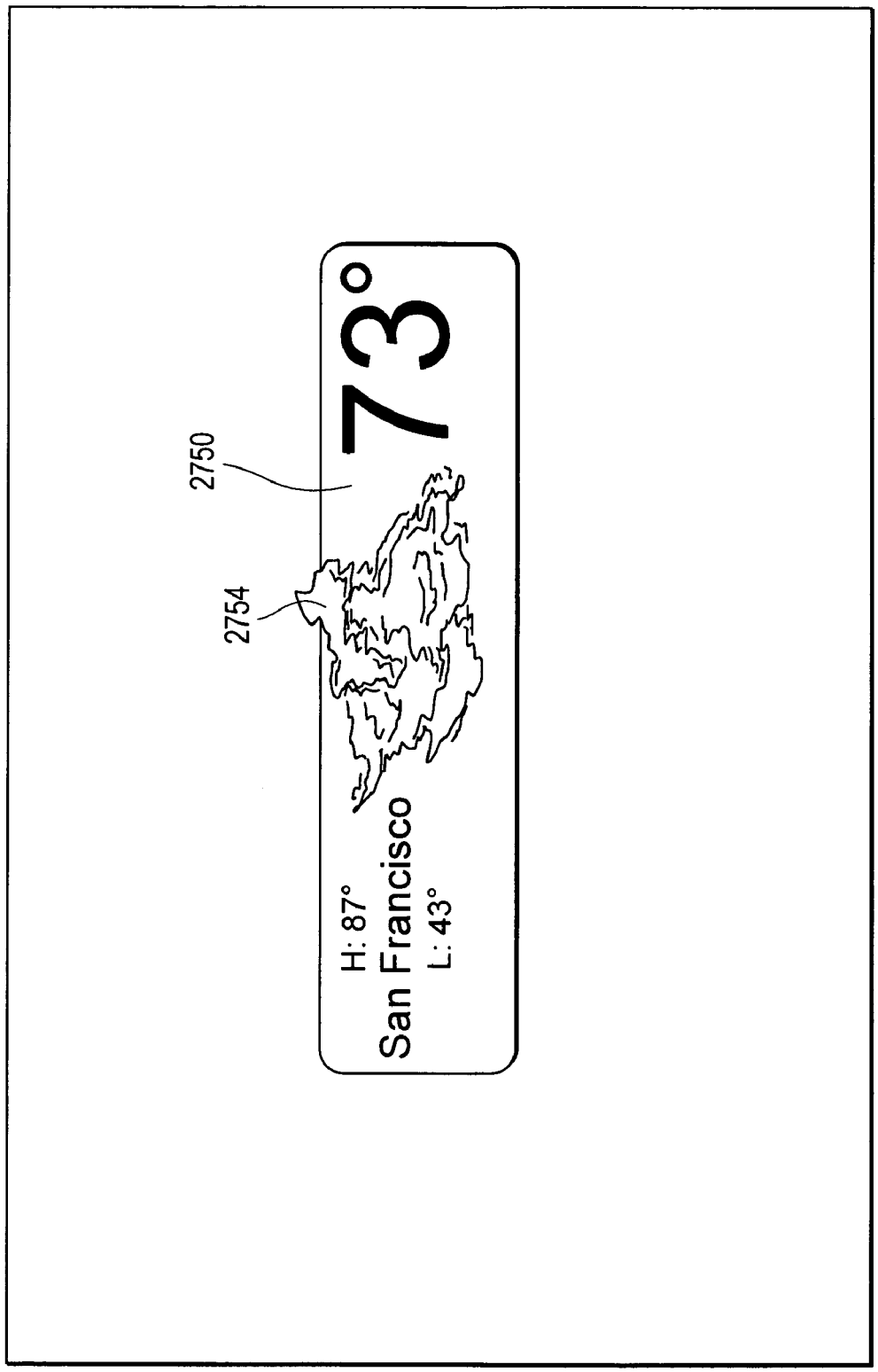

In one embodiment, weather widget 2750 can be expanded or collapsed in response to rollover or in response to the user clicking on a button for expanding and collapsing. For example, FIG. 27A shows weather widget 2750 in an expanded state, while FIG. 27B shows it in a collapsed state where the forecast is not shown.

Figure 27C:
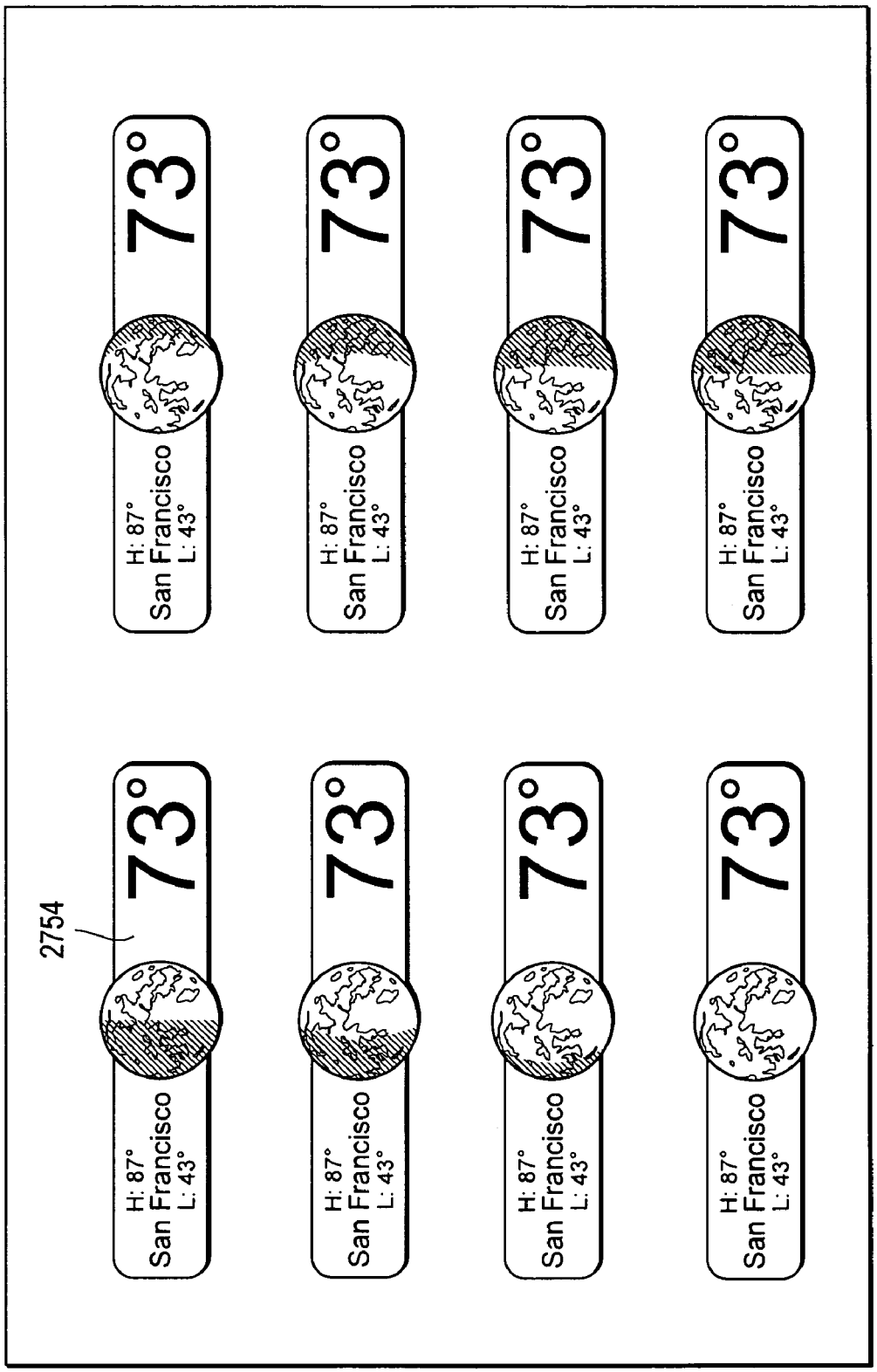
Figure 27D:
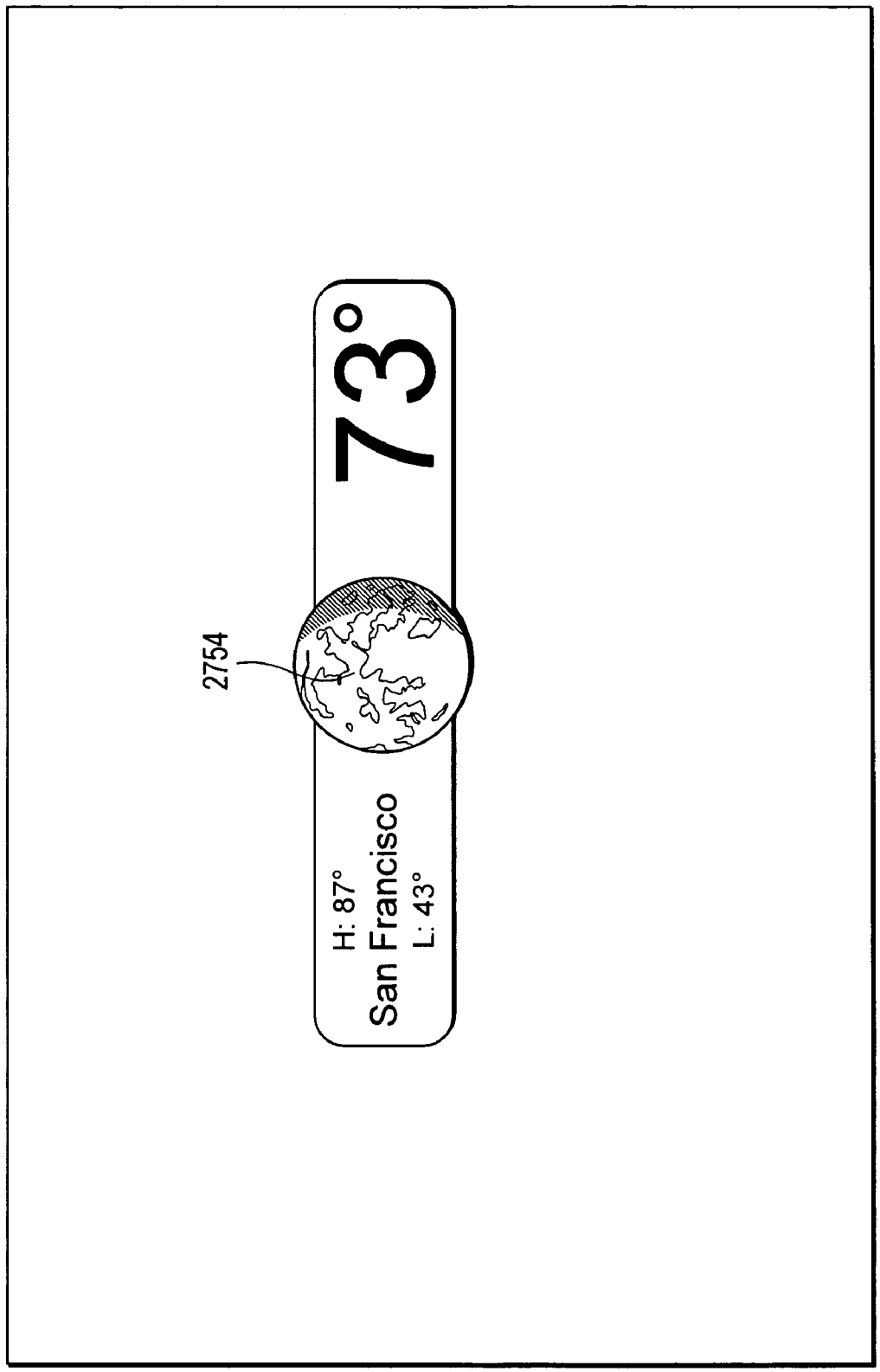

In one embodiment, graphic 2754 shows a moon when it is night (FIG. 27D), and sun when it is day (assuming that conditions are clear). Weather widget 2750 uses the local machine's internal clock, or obtains current time information over a network, to determine the time of day or night. In one embodiment, when the moon is shown, the correct current phase of the moon is depicted. FIG. 27C shows a number of widget states for various phases of the moon.

Figure 27E:
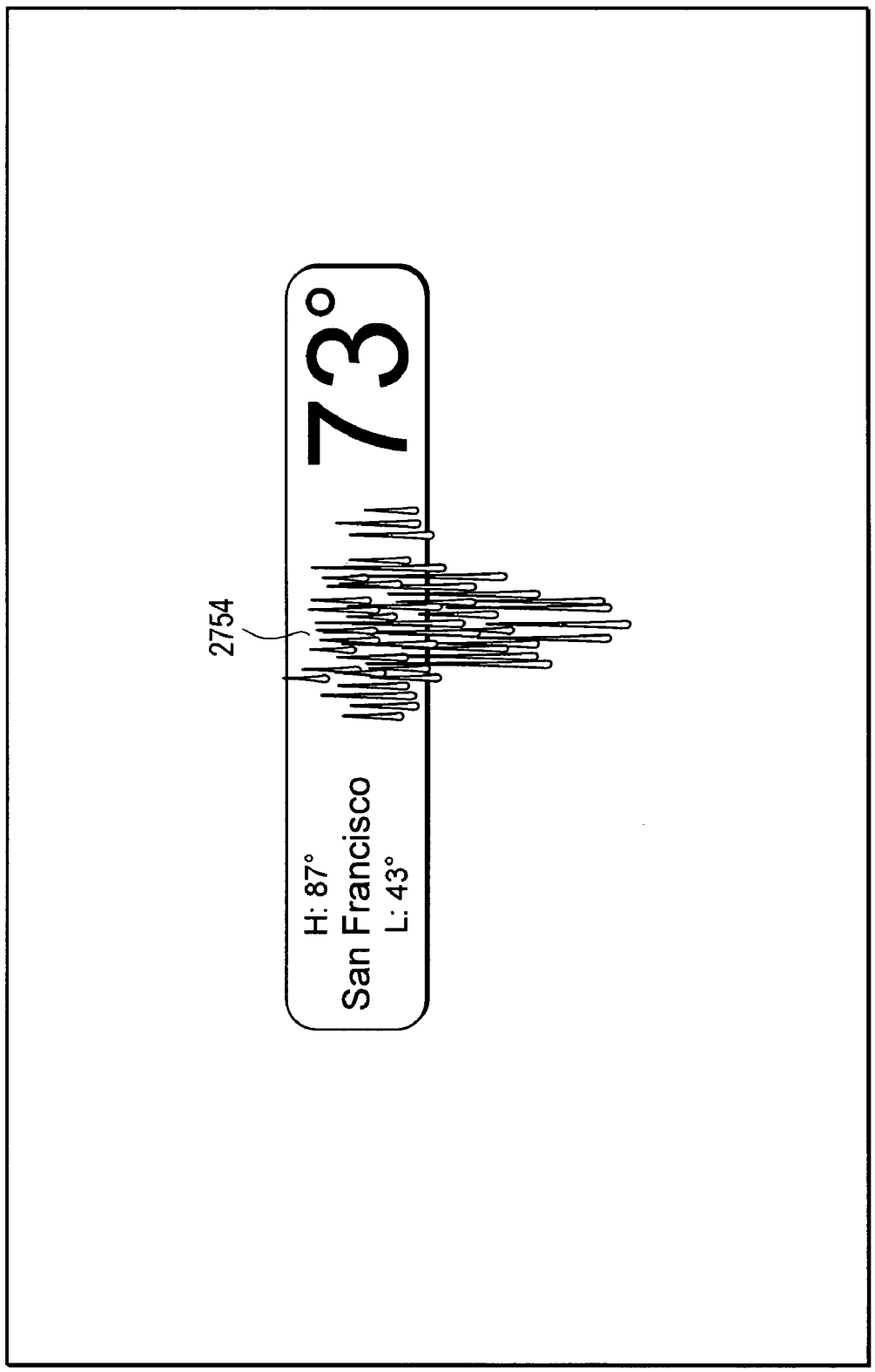
Figure 27F:
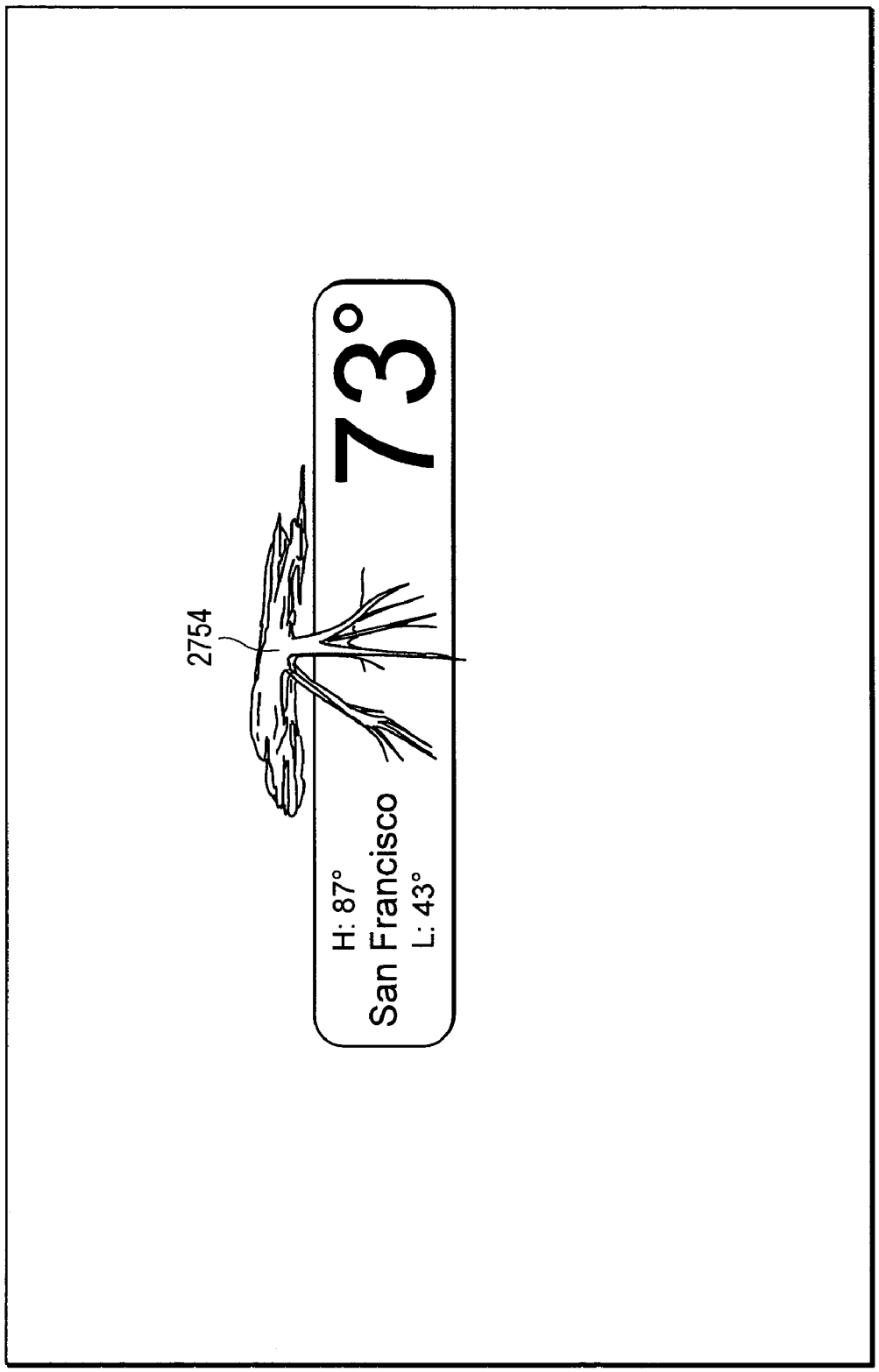

Other examples are shown in FIG. 27E, in which graphic 2754 depicts rain, and FIG. 27F, in which graphic 2754 depicts lightning. Any or all of these can be animated if desired. Sound effects can also be provided, for example when the user rolls over widget 2750 or clicks on it.

Figure 28A:
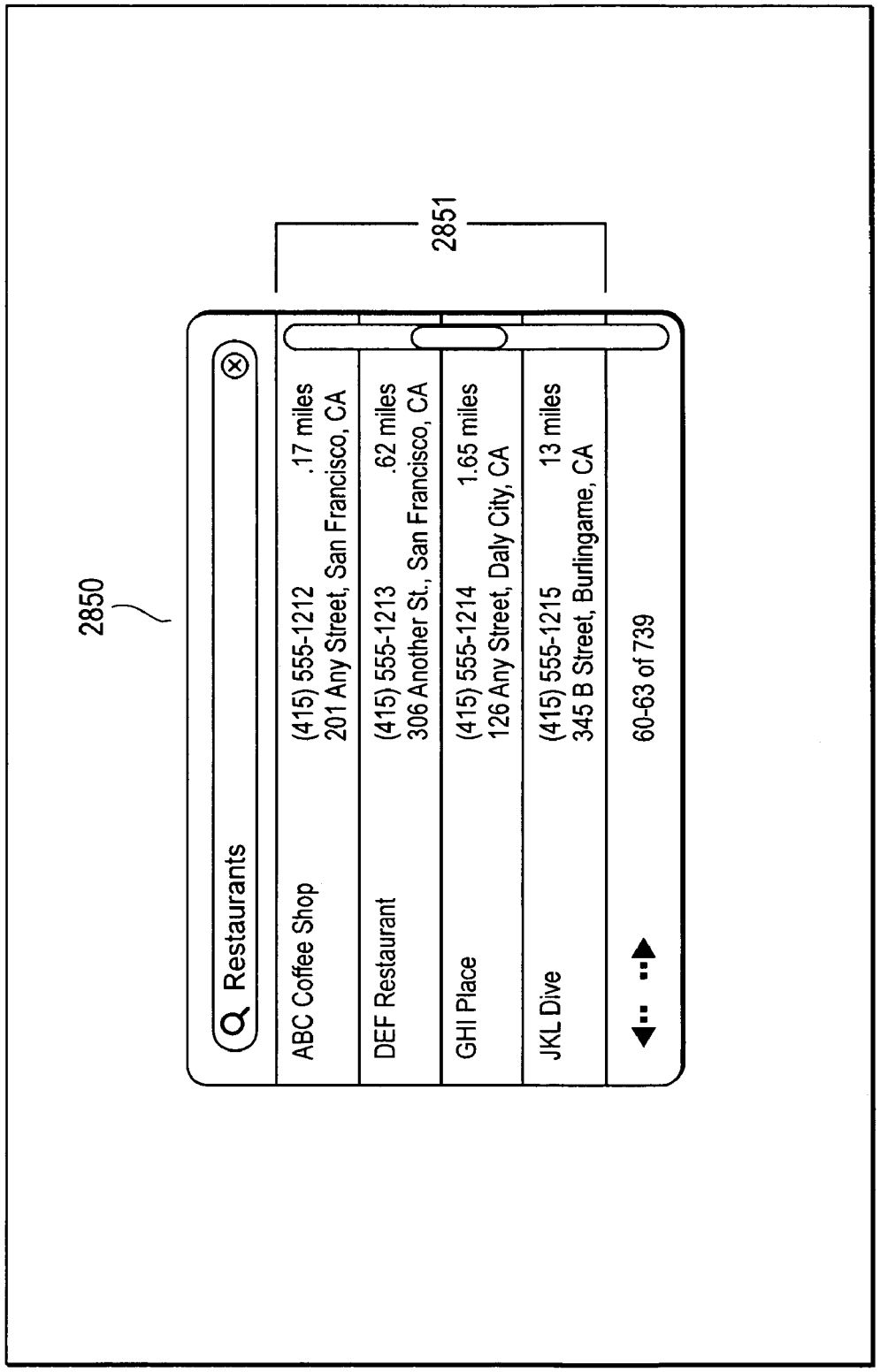
FIGS. 28A through 28C depict a telephone directory widget.
Figure 28B:
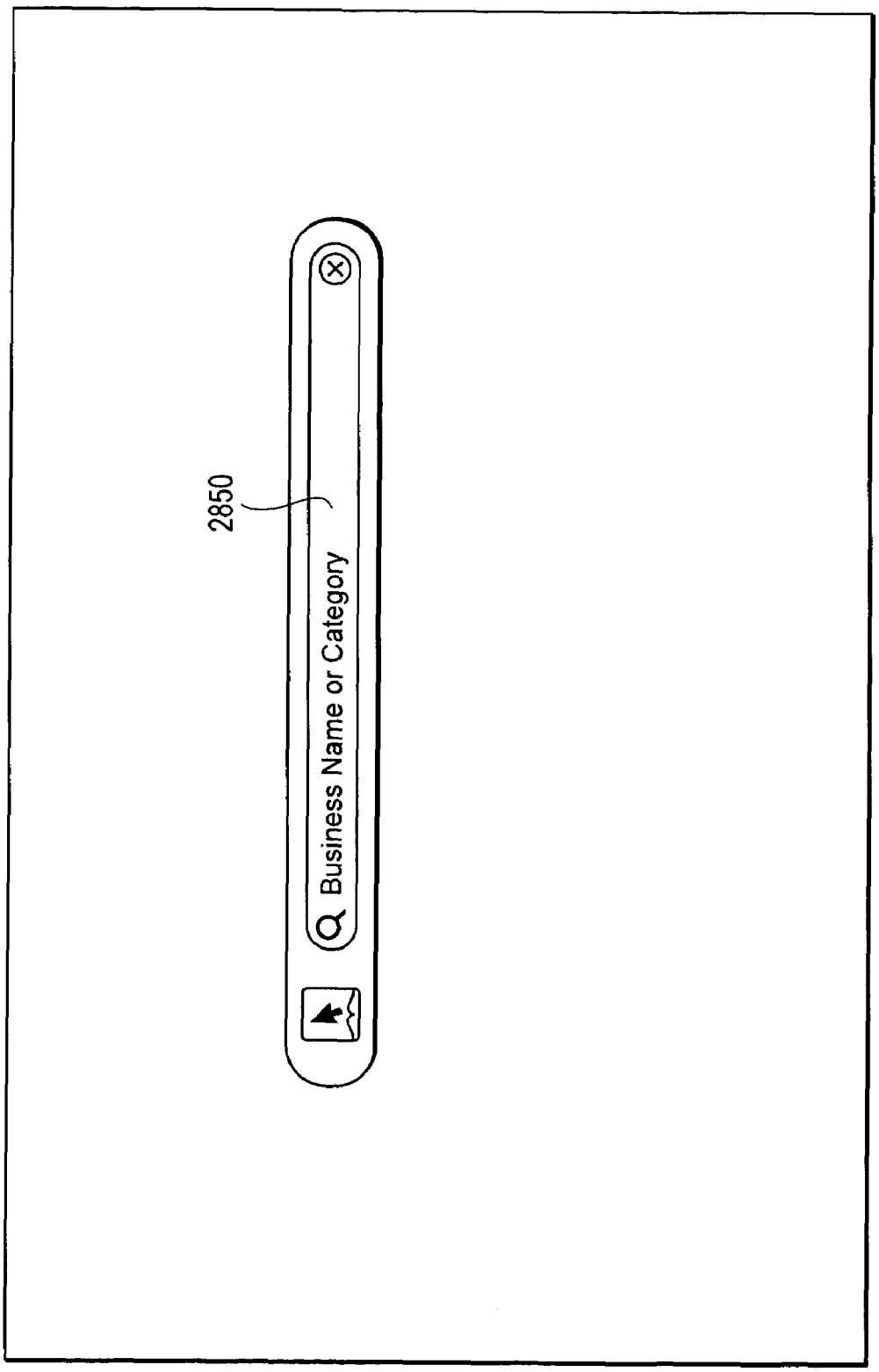
Figure 28C:
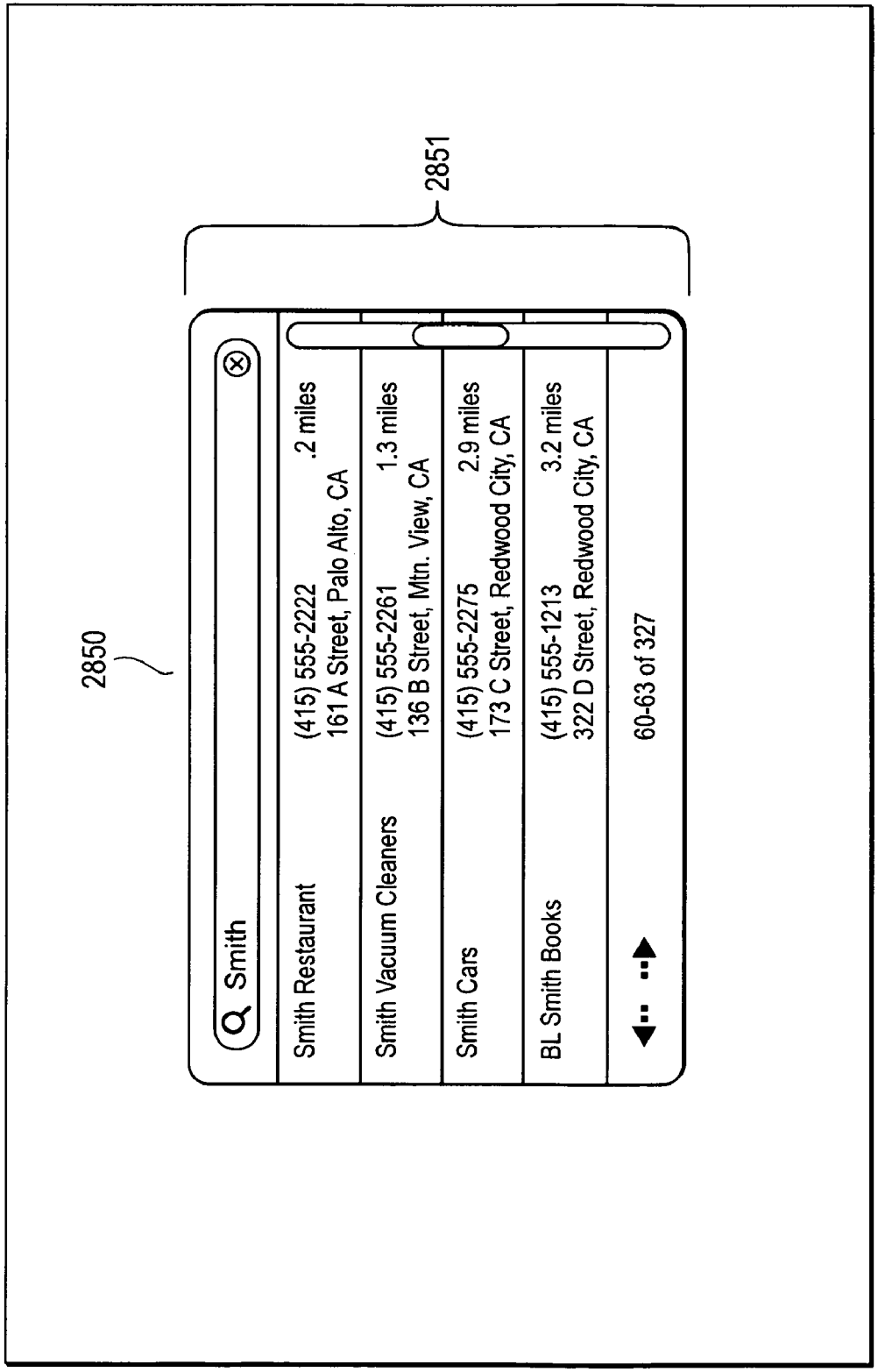

FIGS. 28A through 28C depict a telephone directory widget 2850, implemented as a Yellow Pages function. The user can type in a business name or category (or portion thereof) in widget 2850 shown in FIG. 28B, and listings 2851 are displayed in widget 2850 as shown in FIG. 28A. FIG. 28C shows another example wherein the user-entered query is a name rather than a category.

In one embodiment, the lookup is based on a target location (for example a ZIP code entered by the user, or known to the widget based on previously entered or derived user data). Listings 2851 within a predefined or user-specifiable radius of the target location are shown. In one embodiment, listings 2851 are displayed as the user types (updated automatically with each key-stroke), so the user need not hit Enter or some other button to activate the lookup operation. In one embodiment, widget 2850 waits for a typing pause of some particular length (for example one second) before looking up and displaying listings. In one embodiment, each listing includes the name of the business, telephone number, distance from the target location, and address. The user can click on a listing to see more information, including for example a map, reviews, or the like. In one embodiment, the user can add any displayed listing to a personalized address book, for example by clicking on a button (not shown) adjacent to the listing.

In one embodiment, any or all of the above-described widgets, and/or any or all of the widgets described in the above-referenced related application, include animation or other motion-based elements. For example, a clock widget can include moving hands and other elements.

In one embodiment, the dashboard is also available to a user from a remote location. Configuration information for the user's dashboard is stored at a remote server, pursuant to a user command or automatically. The user can then log in from a remote computer or other device, and be presented with a web page that duplicates the user's dashboard as it would be viewed from his or her own computer. Widgets 303 are provided via HTML pages per the extended functionality described above. The user can interact with widgets 303 in the same manner as from his or her own computer.

Figure 20:
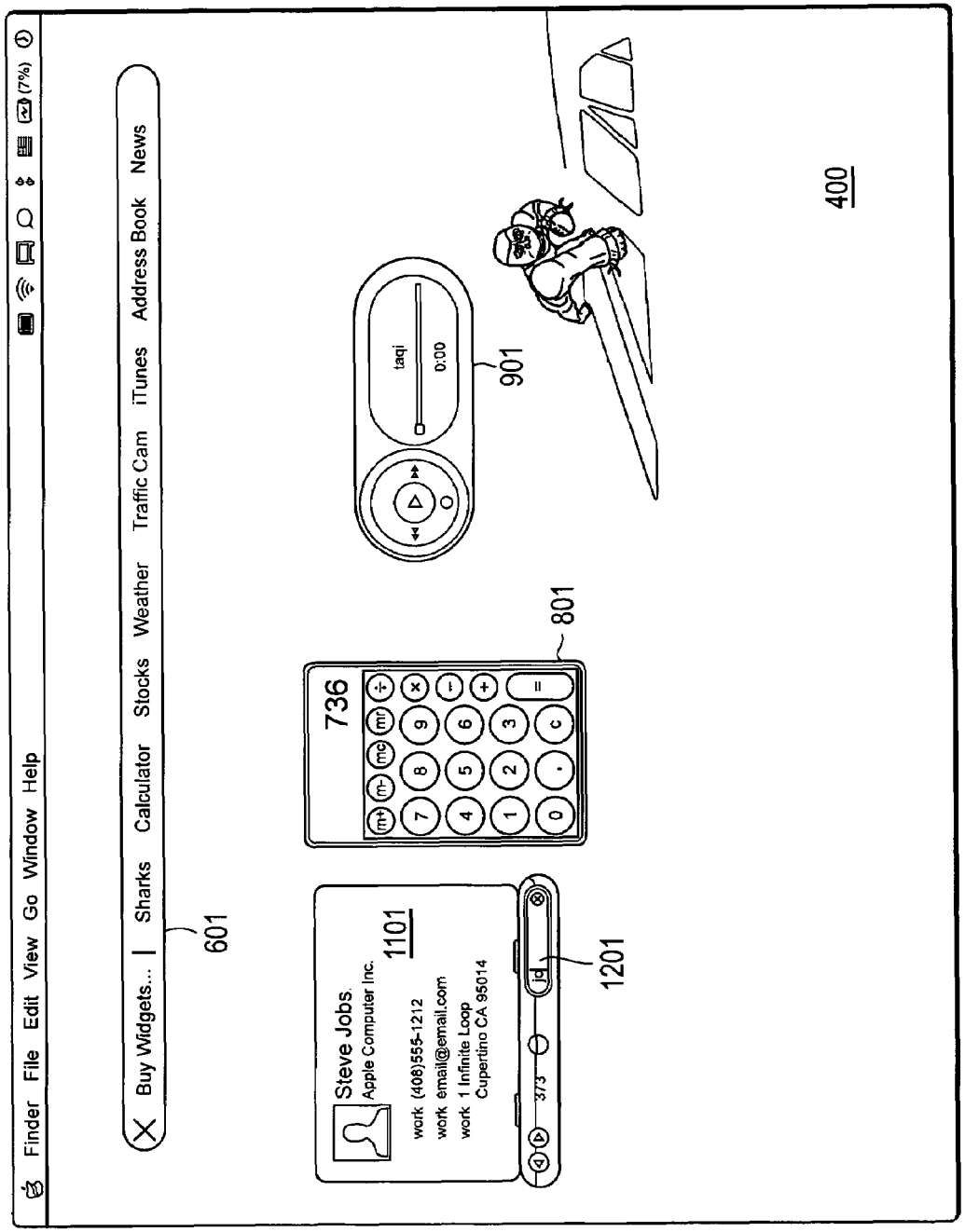
FIG. 20 is a screen shot depicting a dashboard including a number of widgets including a notes widget, according to one embodiment.

FIG. 20 depicts a dashboard after a number of widgets have been placed, including notes widget 1301, calculator widget 801, music player widget 901, and address book widget 1101. In one embodiment, double-clicking in notes widget 1301 causes it to enter an edit mode wherein text can be entered or edited. When not in edit mode, widget 1301 can be moved around the dashboard. In other embodiments, other types of user actions (for example pressing modifier keys) can be used to distinguish between text editing operations and widget-dragging operations.

In one embodiment, an author can generate a widget 303 based on a template. Referring now to FIGS. 29A through 29D, there is shown a user interface for selecting and applying a template for a widget, and for configuring and testing widget 303 according to one embodiment.

Figure 29A:
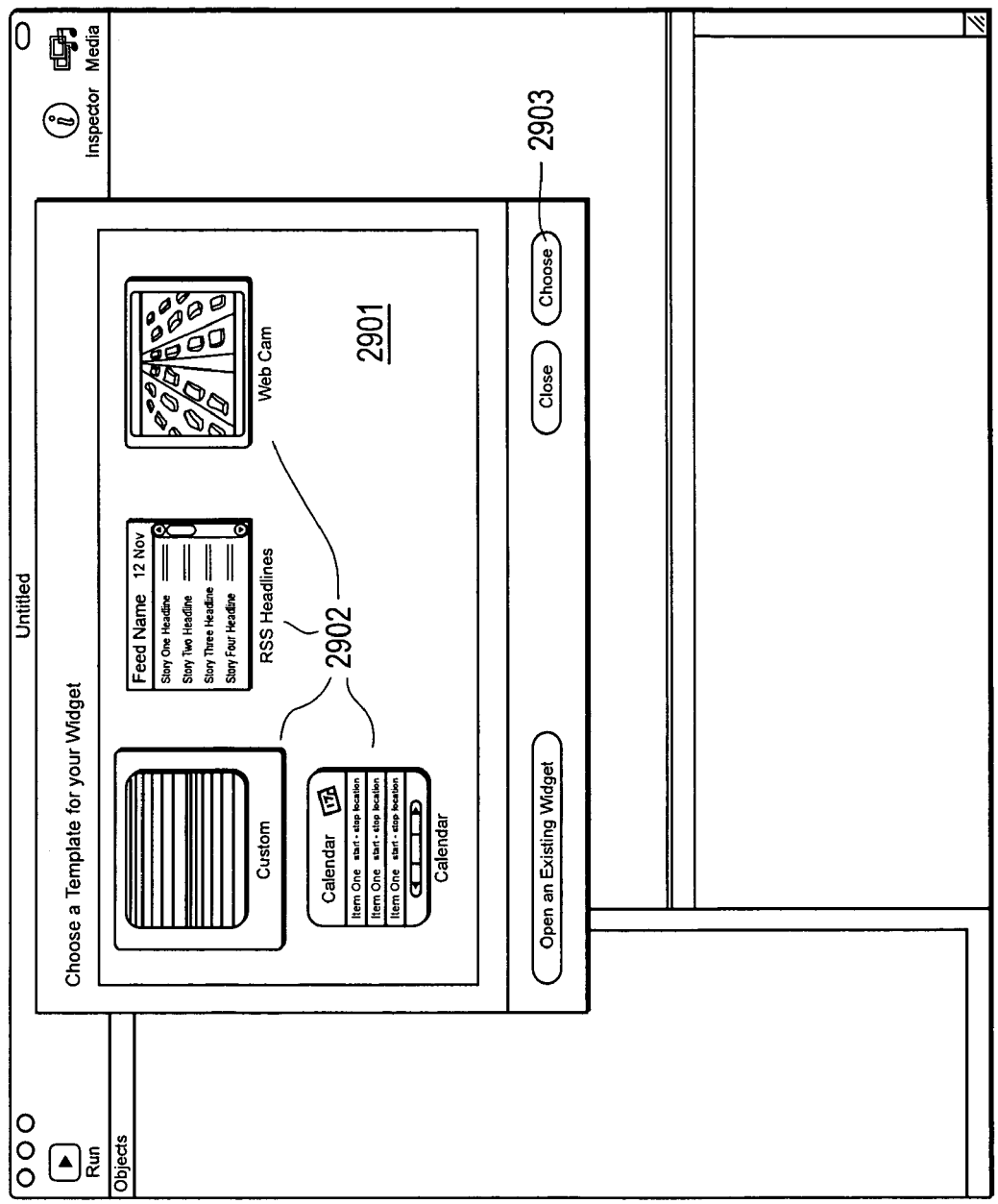
FIGS. 29A through 29D depict a user interface for selecting and applying a template for a widge, and for configuring and testing a widget according to one embodiment.
Figure 29B:
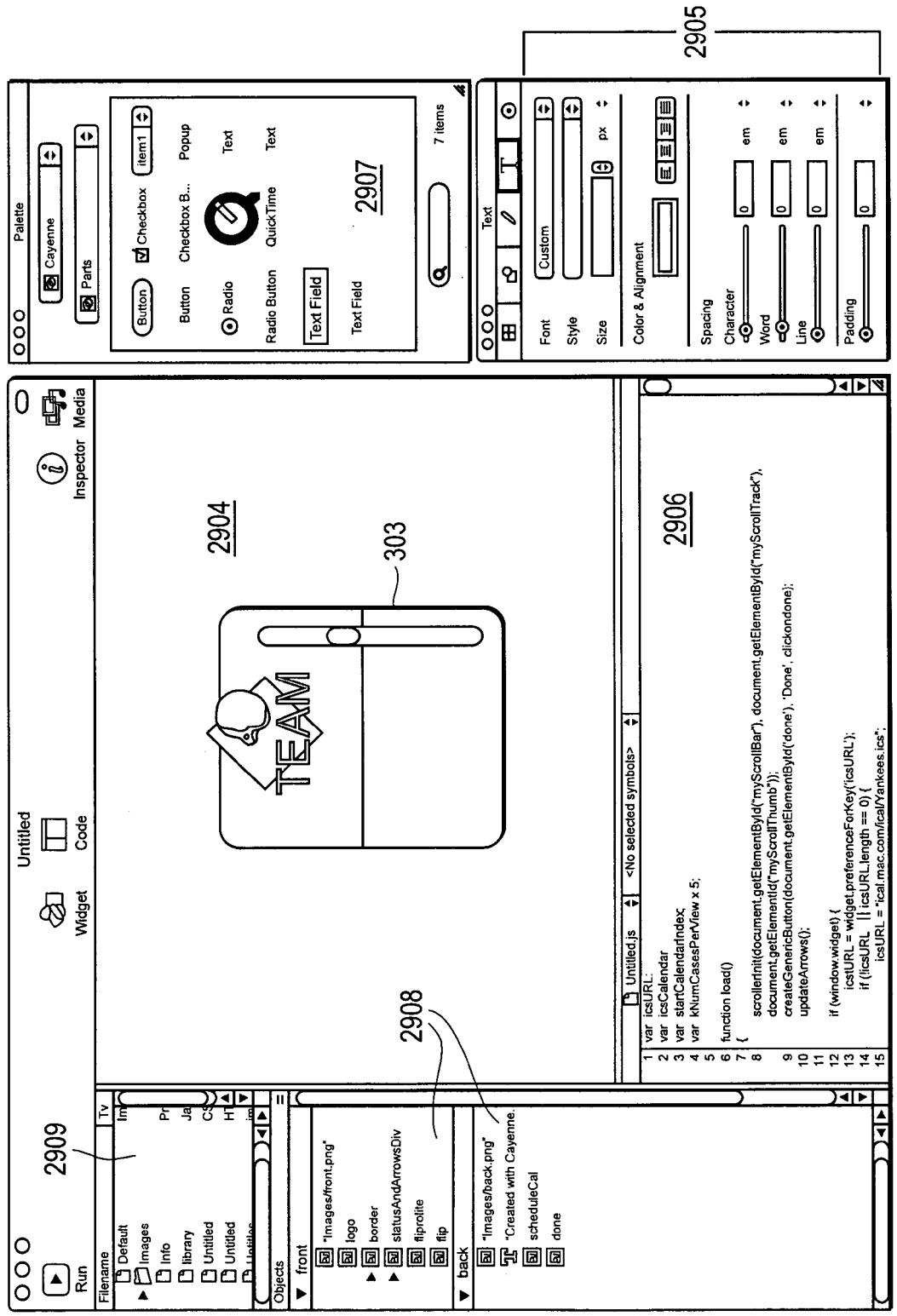

FIG. 29A depicts template selection window 2901, in which the author is given an opportunity to choose a template 2902 on which to base their widget 303. The user clicks on one of the displayed templates 2902 then clicks on Choose button 2903. FIG. 29B depicts a user interface for editing the front side of widget 303. Files view 2909 provides a mechanism for navigating to different files. Objects view 2908 contains a list of objects used in widget 303. Widget editor 2904 contains a depiction of widget 303 so that the author can see changes being made. Source view 2906 shows the source code of widget 303. Parts palette 2907 includes a library of parts that can be dragged onto widget 303 to add functionality to widget 303. Inspector 2905 is used to inspect aspects of widget 303.

Figure 29C:
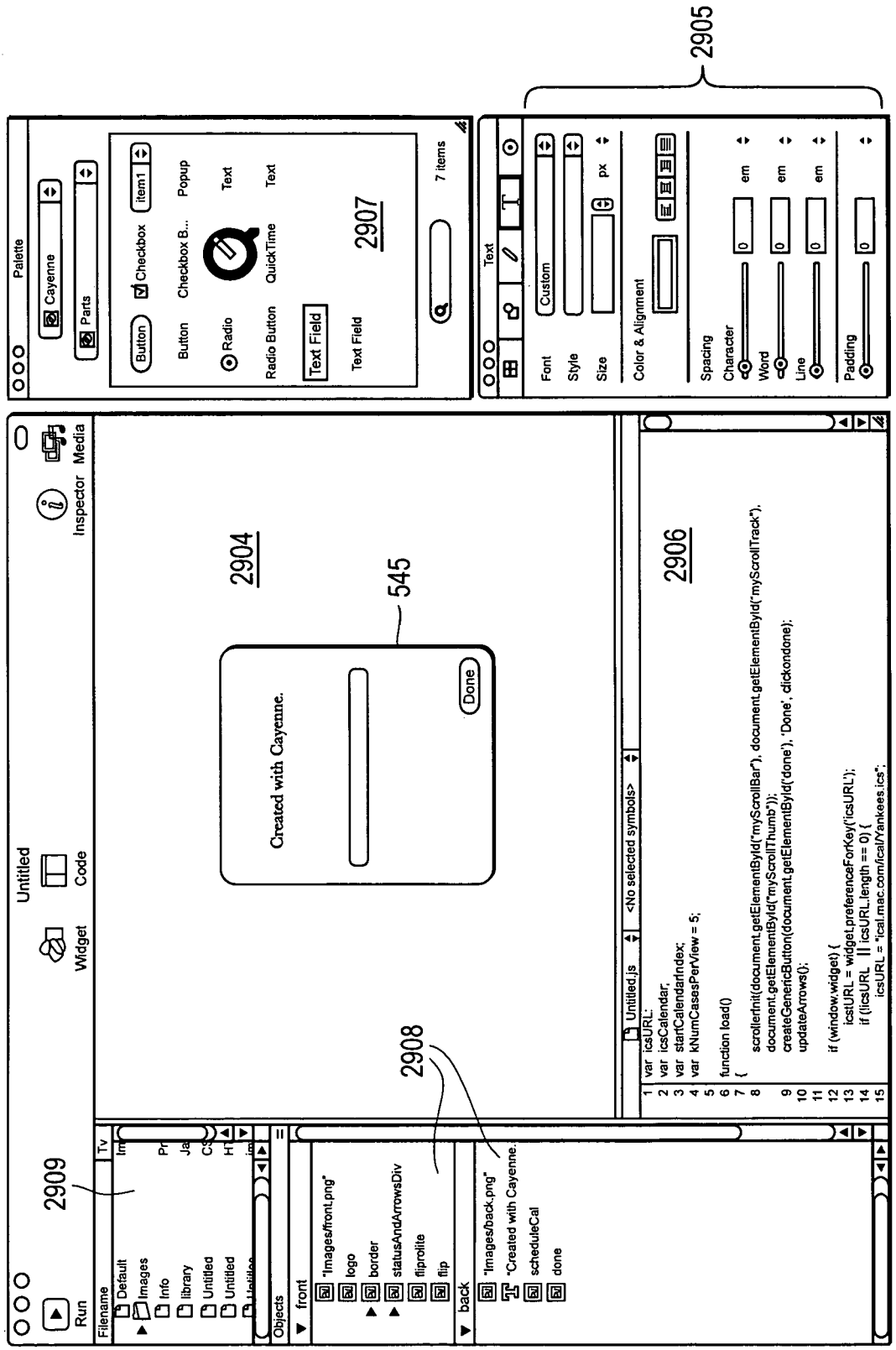

FIG. 29C depicts a user interface for editing the backside 545 of widget 303.

Figure 29D:
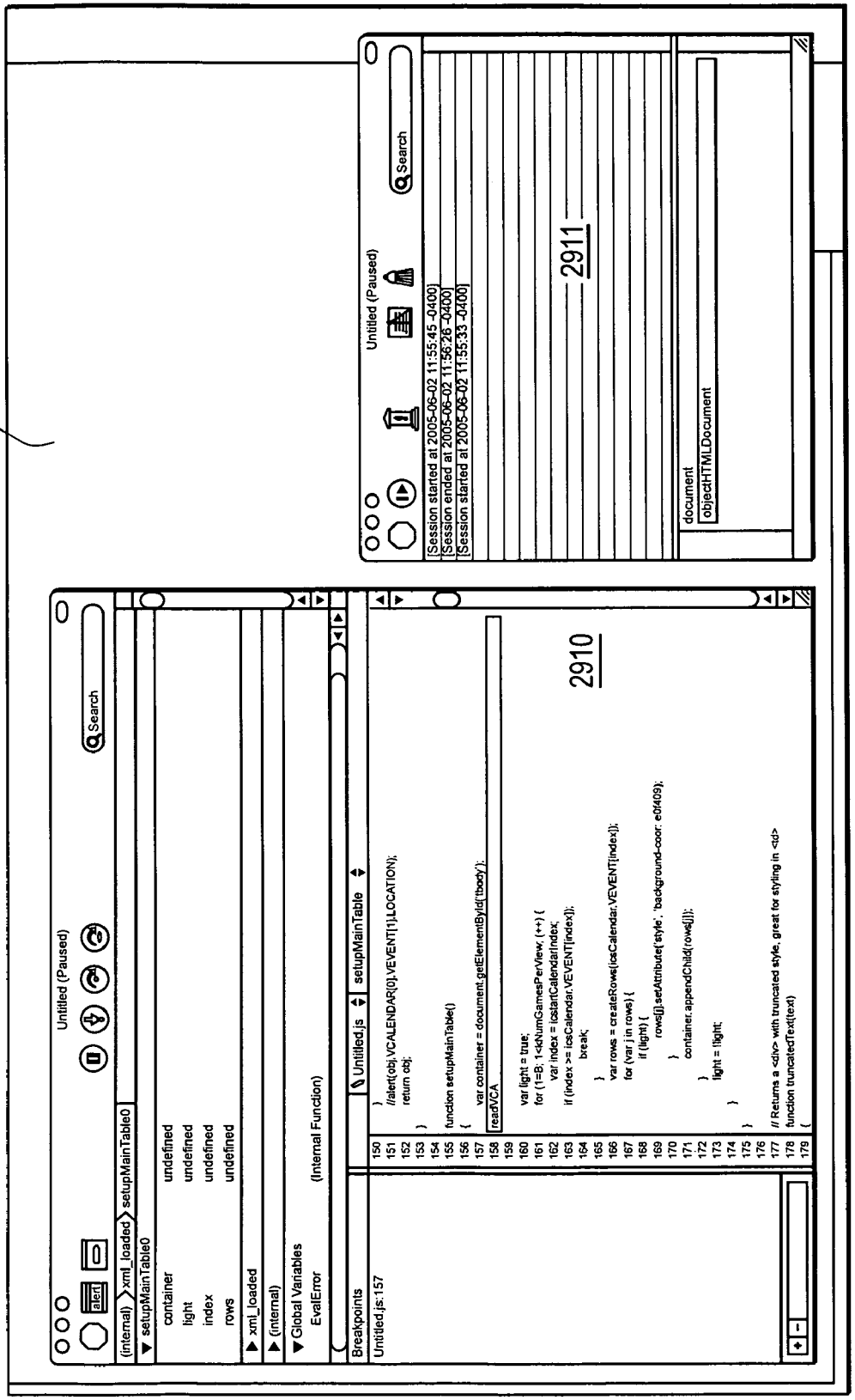

FIG. 29D depicts a user interface for running widget 303 in a run mode. Debug window 2910 provides features for stepping through the code, viewing the code, setting breakpoints, and the like. Console window 2911 provides information about the running of widget 303. Also provided is a representation 2912 of widget 303 as it is being tested.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and graphics environments may be used, and that the present invention can be implemented using graphics tools and products other than those described above. In particular, the client/server approach is merely one example of an architecture for providing the dashboard functionality of the present invention; one skilled in the art will recognize that other, non-client/server approaches can also be used.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer-implemented method of creating a widget from a template, the widget to be used in a computer system including an operating system comprising a runtime engine that is part of the operating system, the method executed by a computer and comprising:
    displaying one or more templates for the widget;
    receiving first author input selecting a template from the one or more templates as a basis for the widget;
    displaying a set of predetermined attributes for the widget;
    receiving second author input selecting one or more predetermined attributes from the set of predetermined attributes; and
    displaying, within a unified interest layer, the widget incorporating the one or more predetermined attributes, wherein the unified interest layer comprises a web view defined in a development environment and is executed by the runtime engine.

2. The method of claim 1, wherein the predetermined attributes are selected from the group comprising theme, color, shape, sidedness, and expandability.

3. The method of claim 1, wherein receiving second author input comprises receiving author input selecting a theme, and wherein the widget incorporates at least one attribute associated with the selected theme.

4. The method of claim 1, further comprising detecting a first trigger event for activating the unified interest layer, and, responsive to the first trigger event, temporarily inactivating a user interface and displaying the unified interest layer comprising a plurality of widgets.

5. The method of claim 1, wherein displaying the widget comprises displaying the widget concurrently with displaying at least a subset of the attributes.

6. The method of claim 1, further comprising installing the widget in the unified interest layer.

7. The method of claim 1, further comprising distributing the widget for installation in a second unified interest layer.

8. The method of claim 1, wherein the widget comprises one selected from the group consisting of:
    a calendar widget;
    a calculator widget;
    a music player widget;
    an address book widget;
    a notes widget;
    a stock quote widget;
    a weather widget;
    a traffic widget;

a package tracking widget;
a contact manager widget; and
a clock widget.

9. The method of claim 1 further comprising displaying a plurality of templates for the widget.

10. The method of claim 1, further comprising:
storing the widget incorporating the one or more predetermined attributes.

11. A computer readable memory storing a computer program executable by a processor, the computer program producing a user interface of a widget authorship application in a computer system including an operating system comprising a runtime engine that is part of the operating system, the user interface comprising:
a template selection area displaying one or more templates for at least one widget for use within a unified interest layer, the unified interest layer comprising a web view defined in a development environment and is executed by the runtime engine;
an attribute area displaying a set of predetermined attributes for the widget; and
a preview area displaying the widget in the unified interest layer, the previous area visually distinguished from and concurrently displayed with the attribute area.

12. The computer program of claim 11, the user interface further comprising:
an executable process that responds to author input in the attribute area to update the widget displayed in the preview area.

13. The computer program of claim 11, wherein the predetermined attributes are selected from the group comprising theme, color, shape, sidedness, and expandability.

14. The computer program of claim 11, further comprising an executable process that installs the widget in the unified interest layer.

15. The computer program of claim 11, further comprising an executable process that distributes the widget for installation in a second unified interest layer.

16. The computer program of claim 11, wherein the widget comprises one selected from the group consisting of:
a calendar widget;
a calculator widget;
a music player widget;
an address book widget;
a notes widget;
a stock quote widget;
a weather widget;
a traffic widget;
a package tracking widget;
a contact manager widget; and
a clock widget.

17. The computer program of claim 11, further comprising an executable process that detects a first trigger event for activating the unified interest layer, and, responsive to the first trigger event, the executable process temporarily inactivates a user interface and displays the unified interest layer comprising a plurality of widgets.

18. A computer-implemented method of editing a widget to be used in a computer system including an operating system comprising a runtime engine that is part of the operating system, the method executed by a computer and comprising:
displaying a set of objects included in the widget;
receiving author input editing at least one of the set of objects, wherein the author input comprises dragging and dropping the at least one of the set of objects within the widget; and
displaying, within a dashboard layer, the widget incorporating the author input, wherein the dashboard layer comprises a web view defined in a development environment and is executed by the runtime engine.

19. The method of claim 18, wherein receiving author input comprises receiving author input selecting a theme, and wherein the widget incorporates at least one attribute associated with the selected theme.

20. The method of claim 18, wherein the set of editable objects include at least one selected from the group consisting of buttons and controls.

21. The method of claim 18, further comprising:
displaying a set of additional objects that can be added to the widget;
receiving author input adding at least one of the set of additional objects; and
displaying within the dashboard layer, the widget incorporating the author input.

22. The method of claim 18, further comprising detecting a first trigger event for activating the dashboard layer, and, responsive to the first trigger event, temporarily inactivating a user interface and displaying the dashboard layer comprising a plurality of widgets.

23. The method of claim 18, further comprising installing the widget in the dashboard layer.

24. The method of claim 18, further comprising distributing the widget for installation in a second dashboard layer.

25. The method of claim 18, wherein the widget comprises one selected from the group consisting of:
a calendar widget;
a calculator widget;
a music player widget;
an address book widget;
a notes widget;
a stock quote widget;
a weather widget;
a traffic widget;
a package tracking widget;
a contact manager widget; and
a clock widget.

26. A computer readable memory storing a computer program executable by a processor, the computer program producing a user interface of a widget authorship application in a computer system including an operating system comprising a runtime engine that is part of the operating system, the user interface comprising:
a widget display area for displaying a widget for use within a dashboard layer, the dashboard layer comprising a web view defined in a development environment and is executed by the runtime engine;
a contents area, visually distinguished from and concurrently displayed with the widget display area, for editing at least one object included in the widget; and
a library area, visually distinguished from and concurrently displayed with the widget area and the contents area, for adding at least one additional object to the widget.

27. The computer program of claim 26, further comprising an executable process that installs the widget in the dashboard layer.

28. The computer program of claim 26, further comprising an executable process that distributes the widget for installation in a second dashboard layer.

29. The computer program of claim 26, wherein the widget comprises one selected from the group consisting of:
a calendar widget;
a calculator widget;

a music player widget;
an address book widget;
a notes widget;
a stock quote widget;
a weather widget;
a traffic widget;
a package tracking widget;
a contact manager widget; and
a clock widget.

30. The computer program of claim 26, further comprising an executable process that detects a first trigger event for activating the dashboard layer, and, responsive to the first trigger event, the executable process temporarily inactivates a user interface and displays the dashboard layer comprising a plurality of widgets.

31. A system for creating a widget from a template, the widget to be used in a computer system including an operating system comprising a runtime engine that is part of the operating system, the system comprising:
 a display device, for displaying one or more templates for the widget and for displaying a set of predetermined attributes for the widget; and
 an input device, coupled to the display, for receiving first author input selecting a template from the one or more templates as a basis for the widget and for receiving second author input selecting one or more predetermined attributes from the set of predetermined attributes; and
 wherein the display device displays the widget incorporating the one or more predetermined attributes, wherein the widget is displayed within a unified interest layer comprising a web view defined in a development environment and is executed by the runtime engine.

32. The system of claim 31, wherein the input device receives author input selecting a theme, and wherein the widget incorporates at least one attribute associated with the selected theme.

33. The system of claim 31, wherein the input device receives a first trigger event for activating the unified interest layer, and, responsive to the first trigger event, the display device displays an inactivated user interface and displays the unified interest layer comprising a plurality of widgets.

34. The system of claim 31, wherein the widget comprises one selected from the group consisting of:
 a calendar widget;
 a calculator widget;
 a music player widget;
 an address book widget;
 a notes widget;
 a stock quote widget;
 a weather widget;
 a traffic widget;
 a package tracking widget;
 a contact manager widget; and
 a clock widget.

35. A system for producing a user interface of a widget authorship application in a computer system including an operating system comprising a runtime engine that is part of the operating system, the system comprising:
 a computer-readable memory having computer program instructions tangibly embodied therein, the computer program instructions producing the user interface of the widget authorship application, the user interface comprising:
 a template selection area displaying one or more templates for at least one widget for use within a unified interest layer, the unified interest layer comprising a web view defined in a development environment and is executed by the runtime engine;
 an attribute area displaying a set of predetermined attributes for the widget; and
 a preview area displaying the widget in the unified interest layer, the preview area visually distinguished from and concurrently displayed with the attribute area.

36. The system of claim 35, the computer program instructions further comprising:
 an executable process that responds to author input in the attribute area to update the widget displayed in the preview area.

37. The user interface of claim 35, wherein the widget comprises one selected from the group consisting of:
 a calendar widget;
 a calculator widget;
 a music player widget;
 an address book widget;
 a notes widget;
 a stock quote widget;
 a weather widget;
 a traffic widget;
 a package tracking widget;
 a contact manager widget; and
 a clock widget.

38. The system of claim 35, the computer program instructions further comprising an executable process that detects a first trigger event for activating the unified interest layer, and, responsive to the first trigger event, the executable process temporarily inactivates a user interface and displays the unified interest layer comprising a plurality of layer widgets.

39. A system of editing a widget to be used in a computer system including an operating system comprising a runtime engine that is part of the operating system, the system comprising:
 a display device, for displaying a set of objects included in the widget; and
 an input device, coupled to the display device, for receiving author input editing at least one of the set of objects, wherein the author input comprises dragging and dropping the at least one of the set of objects within the widget;
 wherein the display device displays, within a dashboard layer, the widget incorporating the author input, wherein the dashboard layer comprises a web view defined in a development environment and is executed by the runtime engine.

40. The system of claim 39, wherein the input device receives author input selecting a theme, and wherein the widget incorporates at least one attribute associated with the selected theme.

41. The system of claim 39, wherein the input device receives a first trigger event for activating the dashboard layer, and, responsive to the first trigger event, the display device displays an inactivated user interface and displays the dashboard layer comprising a plurality of layer widgets.

42. The system of claim 39, wherein the widget comprises one selected from the group consisting of:
 a calendar widget;
 a calculator widget;
 a music player widget;
 an address book widget;
 a notes widget;
 a stock quote widget;
 a weather widget;
 a traffic widget;

a package tracking widget;
a contact manager widget; and
a clock widget.

43. A system for producing a user interface of a widget authorship application in a computer system including an operating system comprising a runtime engine that is part of the operating system, the system comprising:
   a computer-readable memory having computer program instructions tangibly embodied therein, the computer program instructions producing the user interface of the widget authorship application, the user interface comprising:
   widget display area for displaying a widget for use within a dashboard layer, the dashboard layer comprising a web view defined in a development environment and is executed by the runtime engine;
   a contents area, visually distinguished from and concurrently displayed with the widget display area, for editing at least one object included in the widget; and
   a library area, visually distinguished from and concurrently displayed with the widget area and the contents area, for adding at least one additional object to the widget.

44. The user interface of claim 43, wherein the widget comprises one selected from the group consisting of:
   a calendar widget;
   a calculator widget;
   a music player widget;
   an address book widget;
   a notes widget;
   a stock quote widget;
   a weather widget;
   a traffic widget;
   a package tracking widget;
   a contact manager widget; and
   a clock widget.

45. The computer program instructions of claim 43, further comprising an executable process that detects a first trigger event for activating the dashboard layer, and, responsive to the first trigger event, the executable process temporarily inactivates a user interface and displays the dashboard layer comprising a plurality of widgets.

46. An authoring tool for creating a widget from a template, the widget to be used in a computer system including an operating system comprising a runtime engine that is part of the operating system, comprising:
   a display area, for displaying one or more templates for the widget and for displaying a set of predetermined attributes for the widget;
   an input device, for receiving first author input selecting a template from the one or more templates as a basis for the widget and for receiving second author input selecting one or more predetermined attributes from the set of predetermined attributes; and
   a processor, for displaying, within a unified interest layer, the widget incorporating the one or more predetermined attributes, wherein the unified interest layer comprises a web view defined in a development environment and is executed by the runtime engine.

47. A widget for use in a computer system including an operating system comprising a runtime engine that is part of the operating system, the widget comprising:
   a computer-readable memory having computer program instructions tangibly embodied therein, the computer program instructions comprising instructions for:
   displaying one or more templates for the widget;
   receiving first author input selecting a template from the one or more templates as a basis for the widget;
   displaying a set of predetermined attributes for the widget;
   receiving second author input selecting one or more predetermined attributes from the set of predetermined attributes; and
   wherein the widget is displayed within a unified interest layer that comprises a web view defined in a development environment and is executed by the runtime engine, and wherein the displayed widget incorporates the one or more predetermined attributes.

48. A computer-implemented method of creating a widget from a template, the widget to be used in a computer system, the method executed by a computer and comprising:
   displaying one or more templates for the widget;
   receiving first author input selecting a template from the one or more templates as a basis for the widget;
   displaying a set of predetermined attributes for the widget;
   receiving second author input selecting one or more predetermined attributes from the set of predetermined attributes; and
   displaying, within a unified interest layer, the widget incorporating the one or more predetermined attributes, wherein the unified interest layer is separate from a desktop of the computer system.

49. A computer-implemented method of editing a widget to be used in a computer system, the method executed by a computer and comprising:
   displaying a set of objects included in the widget;
   receiving author input editing at least one of the set of objects, wherein the author input comprises dragging and dropping the at least one of the set of objects within the widget; and
   displaying, within a unified interest layer, the widget incorporating the author input, wherein the unified interest layer is separate from a desktop of the computer system.

50. A computer readable memory storing a computer program executable by a processor, the computer program for producing a user interface of a widget authorship application in a computer system, the user interface comprising:
   a widget display area for displaying a widget for use within a dashboard layer that is separate from a desktop of the computer system;
   a contents area, visually distinguished from and concurrently displayed with the widget display area, for editing at least one object included in the widget; and
   a library area, visually distinguished from and concurrently displayed with the widget area and the contents area, for adding at least one additional object to the widget.

* * * * *

UNITED STATES PATENT AND TRADEMARK OFFICE
CERTIFICATE OF CORRECTION

PATENT NO. : 7,546,543 B2
APPLICATION NO. : 11/145577
DATED : June 9, 2009
INVENTOR(S) : John Louch et al.

It is certified that error appears in the above-identified patent and that said Letters Patent is hereby corrected as shown below:

Cover Page under "Related U.S. Application Data"

insert --CIP of Application No. 10/877,968 filed June 25, 2004,--

Signed and Sealed this

First Day of September, 2009

David J. Kappos
*Director of the United States Patent and Trademark Office*